(12) United States Patent
Behrooz et al.

(10) Patent No.: US 11,153,499 B2
(45) Date of Patent: Oct. 19, 2021

(54) RAPID, HIGH DYNAMIC RANGE IMAGE ACQUISITION WITH A CHARGE-COUPLED DEVICE (CCD) CAMERA

(71) Applicant: PerkinElmer Health Sciences, Inc., Waltham, MA (US)

(72) Inventors: Ali Behrooz, Waltham, MA (US); William Hurley, Providence, RI (US); Ilias Faqir, Holliston, MA (US)

(73) Assignee: PerkinElmer Health Sciences, Inc., Waltham, MA (US)

( * ) Notice: Subject to any disclaimer, the term of this patent is extended or adjusted under 35 U.S.C. 154(b) by 394 days.

(21) Appl. No.: 16/163,094

(22) Filed: Oct. 17, 2018

(65) Prior Publication Data
US 2019/0124247 A1  Apr. 25, 2019

Related U.S. Application Data

(63) Continuation-in-part of application No. 15/654,442, filed on Jul. 19, 2017.
(Continued)

(51) Int. Cl.
*H04N 5/235* (2006.01)
*H04N 5/225* (2006.01)
(Continued)

(52) U.S. Cl.
CPC ............ *H04N 5/2352* (2013.01); *G06T 5/50* (2013.01); *H04N 5/2256* (2013.01);
(Continued)

(58) Field of Classification Search
CPC .. H04N 5/2352; H04N 5/2256; H04N 5/2353; H04N 5/2354; H04N 5/32;
(Continued)

(56) References Cited

U.S. PATENT DOCUMENTS 5,307,096 A *  4/1994  Baroth .................. A61B 3/107
                                                        351/212
7,905,597 B2 *  3/2011  Tsukada ................ A61B 3/102
                                                        351/206
(Continued)

FOREIGN PATENT DOCUMENTS

CN          101095610 A     1/2008
CN          106454141 A     2/2017
(Continued)

OTHER PUBLICATIONS

Oct. 11, 2018—(WO) International Search Report and Written Opinon—App PCT/US2018/042723.
(Continued)

*Primary Examiner* — Michael E Teitelbaum
(74) *Attorney, Agent, or Firm* — Banner & Witcoff, Ltd.

(57) ABSTRACT

Presented herein are systems and methods that provide for fast image acquisition with a CCD camera for tomographic imaging by synchronizing illumination with the image acquisition sequence of the CCD camera. The systems and methods described herein allow images to be acquired with a CCD camera using short image acquisition times that would otherwise result in the introduction of severe artifacts into the acquired images. This unique capability is achieved by selectively illuminating the one or more object(s) to be imaged during specific phases of the CCD camera that are used to acquire an image. Reducing the time required to acquire artifact-free images in this manner allows for rapid imaging with a CCD camera. This capability is of particular relevance to tomographic imaging approaches, in which multiple images of one or more objects are acquired and used to produce a single tomographic image.

20 Claims, 14 Drawing Sheets

Related U.S. Application Data

(60) Provisional application No. 62/574,043, filed on Oct. 18, 2017.

(51) Int. Cl.
   *H04N 5/32* (2006.01)
   *H04N 5/355* (2011.01)
   *G06T 5/50* (2006.01)

(52) U.S. Cl.
   CPC ......... *H04N 5/2353* (2013.01); *H04N 5/2354* (2013.01); *H04N 5/32* (2013.01); *H04N 5/35581* (2013.01); *G06T 2207/10144* (2013.01); *G06T 2207/20208* (2013.01); *H04N 5/2355* (2013.01)

(58) Field of Classification Search
   CPC .... H04N 5/35581; H04N 5/2355; G06T 5/50; G06T 2207/10144; G06T 2207/20208
   See application file for complete search history.

(56) References Cited

U.S. PATENT DOCUMENTS

| | | |
|---|---|---|
| 2003/0105195 A1 | 6/2003 | Holcomb et al. |
| 2004/0010375 A1 | 1/2004 | Schomacker et al. |
| 2004/0089817 A1 | 5/2004 | Long et al. |
| 2006/0062202 A1 | 3/2006 | Oesterling et al. |
| 2007/0189664 A1 | 8/2007 | Andersen et al. |
| 2007/0206192 A1 | 9/2007 | Fomitchov et al. |
| 2007/0274580 A1 | 11/2007 | Ntziachristos et al. |
| 2009/0018451 A1 | 1/2009 | Bai et al. |
| 2009/0021746 A1 | 1/2009 | Toida et al. |
| 2009/0133167 A1 | 5/2009 | Yakushevska et al. |
| 2009/0149705 A1* | 6/2009 | Tani ............... H04N 5/3532 600/109 |
| 2010/0078576 A1 | 4/2010 | Ntziachristos et al. |
| 2011/0096967 A1 | 4/2011 | Oda et al. |
| 2013/0015370 A1 | 1/2013 | Damaskinos et al. |
| 2014/0029013 A1 | 1/2014 | Yoshii et al. |
| 2015/0346483 A1 | 12/2015 | Ehrmann |
| 2016/0147081 A1 | 5/2016 | Kilcher et al. |
| 2016/0290927 A1 | 10/2016 | Buczkowski et al. |

FOREIGN PATENT DOCUMENTS

| | | |
|---|---|---|
| DE | 102004034978 A1 | 2/2006 |
| EP | 1797818 A2 | 6/2007 |
| EP | 03165903 A1 | 5/2017 |
| JP | 10-300443 A | 11/1998 |
| JP | H10300443 A | 11/1998 |
| JP | 11-326188 A | 11/1999 |
| JP | 2007-528500 A | 10/2007 |
| JP | 2008-196970 A | 8/2008 |
| JP | 2013-156286 A | 8/2013 |
| JP | 2014-025701 A | 2/2014 |
| WO | 2004/001402 A1 | 12/2003 |
| WO | 2008132325 A2 | 11/2008 |

OTHER PUBLICATIONS

Jan. 31, 2020—U.S. Non-final Office Action—U.S. Appl. No. 15/654,442.
Klaser, Jacob. "Lab III Laser Beam Properties". MSU ECE, East Lansing, MI, 2008. (Year: 2008).
Aug. 3, 2020—U.S. Office Action—U.S. Appl. No. 15/654,442.
Apr. 4, 2019—(WO) International Search Report and Written Opinion—App PCT/US2018/056451.

* cited by examiner

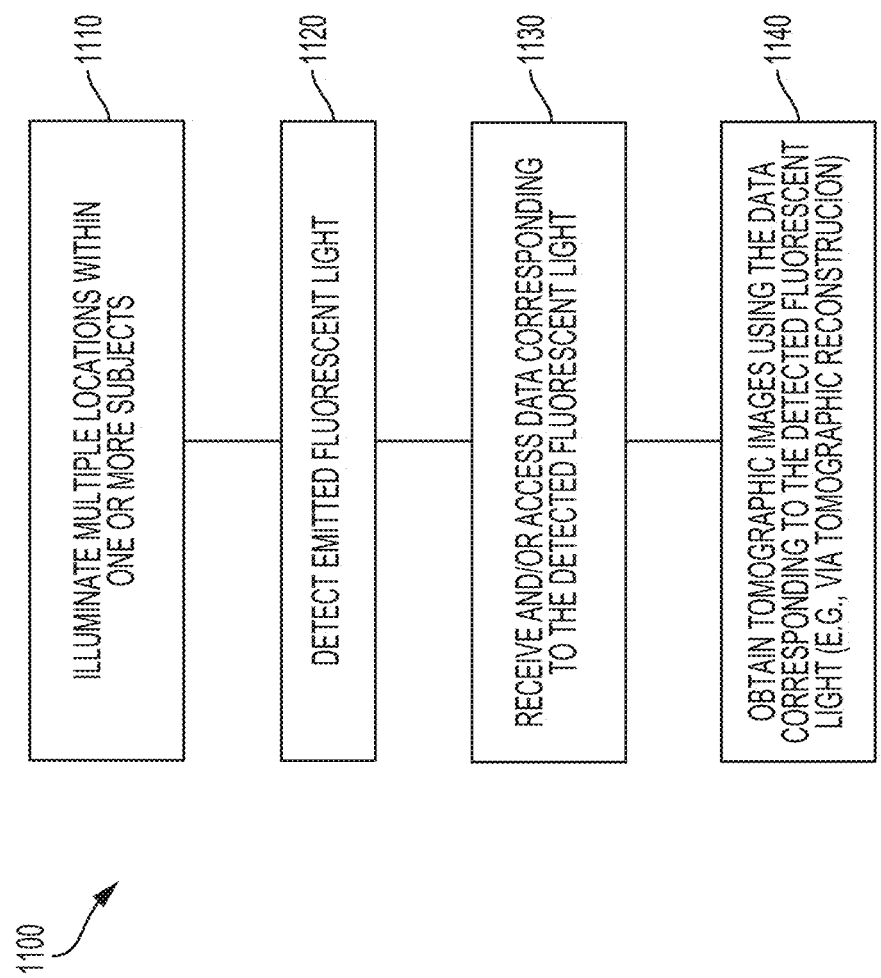

RAPID, HIGH DYNAMIC RANGE IMAGE ACQUISITION WITH A CHARGE-COUPLED DEVICE (CCD) CAMERA

RELATED APPLICATIONS

This application claims priority to U.S. Provisional Application No. 62/574,043 filed Oct. 18, 2017, the entire disclosure of which is hereby incorporated herein by reference. This application is also a Continuation-In-Part of U.S. patent application Ser. No. 15/654,442, which was filed on Jul. 19, 2017, the entire disclosure of which is hereby incorporated herein by reference.

FIELD

Generally, aspects described herein relate to systems and methods for imaging. More particularly, aspects described relate to systems and methods for rapid image acquisition with a CCD camera.

BACKGROUND

In vivo imaging of small animals is performed by a large community of investigators in various fields, e.g., oncology, infectious disease, and drug discovery. There is a wide array of technologies directed to in vivo imaging of animals—for example, bioluminescence, fluorescence, X-ray microcomputed tomography, and multimodal imaging technologies.

Many imaging modalities are tomographic approaches. Tomography is based on detection of light transmitted through or emanating from a sample to obtain (e.g., reconstruct) 3D images or infer the 3D distribution of optical properties of the sample under study. For example, tomographic imaging can be used to reconstruct a 3D map of tissue absorption within a region of interest of a subject under study. In other applications, tomographic imaging is used to generate a 3D map of the spatial distribution of a probe, such as a fluorescent emitter, that is present in the region of interest. Tomographic imaging thus allows reconstruction of detailed 3D images of internal structures of objects, and 3D distribution of a probe within a region of interest of a subject, in a non-invasive fashion.

Optical tomographic imaging can provide valuable information, relevant to analysis of biological, physiological, and functional processes within a subject under study that cannot be obtained from non-optical imaging techniques such as micro-CT or magnetic resonance imaging (MRI). For example, maps of tissue absorption at optical wavelengths are capable of providing biological functional information related to hemoglobin concentration and tissue oxygenation state, which can be used to detect certain types of tumors. In addition, optical absorption additionally provides improved contrast for localizing certain organs, such as the heart, in comparison with X-ray imaging or MRI techniques.

Optical tomography can also be used to map the spatial distribution of an administered or endogenous light emitting probe, such as a fluorescent or bioluminescent probe. For example, fluorescent probes absorb light propagating inside of an object and emit light at a longer wavelength (lower energy) than the absorbed light inside of the object, allowing non-invasive, in vivo investigation of functional and molecular signatures in whole tissues of animals and humans. Fluorescence optical tomography systems thereby allow for molecular imaging, which can be used to visually indicate molecular abnormalities that are the basis of a disease, rather than just imaging the anatomical structures in the area of suspected molecular abnormalities, as with conventional imaging approaches. Specific imaging of molecular targets provides earlier detection and characterization of a disease, as well as earlier and direct molecular assessment of treatment efficacy. An illustrative fluorescence optical tomography system is described in U.S. Patent Application Publication No. US2004/0015062, the text of which is incorporated by reference herein, in its entirety.

Fluorescence tomographic imaging typically utilizes multiple images of object(s) to be imaged to create a tomographic representation of the object(s). For example, in fluorescence tomographic imaging, multiple locations within an object to be imaged are illuminated with excitation light. In fluorescence imaging applications, fluorescent species that are within a given location illuminated by the excitation light absorb the excitation light and emit fluorescent light. For each illumination location, a corresponding fluorescence image is acquired by detecting emitted fluorescent light. The multiple fluorescence images, each corresponding to a particular illumination location, are processed using tomographic reconstruction techniques to obtain a tomographic image that represents a distribution of fluorescent species within the object(s).

Effectively imaging a particular region of an object requires illuminating a sufficient number and density of locations within the object(s) and acquiring corresponding images to be used for tomographic reconstruction.

Accordingly, there exists a need for improved systems and methods for tomographic imaging (e.g., fluorescence tomographic imaging) that are capable of rapidly acquiring multiple images of object(s) to be used for tomographic reconstruction. Such systems and methods are of particular relevance to in vivo small animal tomographic imaging.

SUMMARY

Presented herein are systems and methods that provide for fast image acquisition with a CCD camera for tomographic imaging by synchronizing illumination with the image acquisition sequence of the CCD camera. The systems and methods described herein allow images to be acquired with a CCD camera using short image acquisition times that would otherwise result in the introduction of severe artifacts into the acquired images. This unique capability is achieved by selectively illuminating the one or more object(s) to be imaged during specific phases of the CCD camera that are used to acquire an image. Reducing the time required to acquire artifact-free images in this manner allows for rapid imaging with a CCD camera. This capability is of particular relevance to tomographic imaging approaches, in which multiple images of one or more objects are acquired and used to produce a single tomographic image.

Also presented herein are approaches for high dynamic range (HDR) imaging with a CCD camera that avoid (e.g., reduce; e.g., eliminate) blooming artifacts that typically accompany saturated image pixels. HDR imaging improves dynamic range by acquiring, rather than a single image, an HDR image set comprising short exposure and long exposure images. The long exposure image is acquired using a long duration exposure, such that low intensity signals can be accurately captured. However, the long duration exposure results in a large number of image pixels of the long exposure image being saturated. Blooming artifacts accordingly degrade the long exposure images of HDR image sets, and hinder HDR imaging with a CCD camera. By providing approaches for HDR imaging that avoid (e.g., reduce; e.g., eliminate) blooming artifacts, the systems and methods described herein allow for the increased dynamic range provided by HDR imaging to be taken advantage of in imaging applications that utilize CCD cameras.

Some aspects of the present disclosure are directed to a method for synchronizing illumination of one or more object(s) to be imaged with a global exposure phase of a CCD camera for rapid image acquisition by the CCD camera, the method comprising: (a) directing a beam of illumination light emitted from an output of an illumination source to a source galvanometer mirror, wherein the source galvanometer mirror is operable to rotate through a plurality of angles; (b) automatically adjusting the source galvanometer mirror for alignment at a plurality of rotation angles comprising a first rotation angle and a second rotation angle, wherein, at the first rotation angle, the source galvanometer mirror is aligned to reflect the beam of illumination light to direct it to one or more object(s) to be imaged thereby illuminating the one or more object(s), and at the second rotation angle, the source galvanometer mirror is aligned to reflect the beam of illumination light to direct it away from the one or more object(s) to be imaged such that the one or more object(s) is/are not illuminated; and (c) acquiring one or more images with the CCD camera, wherein: the CCD camera is aligned and operable to (i) detect light (e.g., fluorescent light and/or bioluminescent light) emitted from the one or more object(s) (e.g., from within the one or more object(s), and/or from a surface of the one or more object(s)) as a result of illumination of the one or more object(s) by the beam of illumination light and/or (ii) detect illumination light transmitted through or reflected by the one or more object(s), and acquiring each of the one or more images comprises: (A) responsive to a first trigger signal indicating a start of a global exposure phase of the CCD camera, rotating the source galvanometer mirror to the first rotational angle such that during the global exposure phase of the CCD camera the one or more object(s) is/are illuminated with the beam of illumination light; and (B) responsive to a second trigger signal indicating an end of the global exposure phase of the CCD camera, rotating the galvanometer mirror to the second rotational angle such that when the CCD camera is not in the global exposure phase, the one or more object(s) is/are not illuminated with the beam of illumination light, thereby synchronizing illumination of the one or more object(s) with the global exposure phase of the CCD camera for rapid image acquisition by the CCD camera.

In some embodiments, a duration of the global exposure phase of the CCD camera (e.g., the global exposure time) for each of the one or more acquired images is less than or approximately equal to 400 ms (e.g., less than or approximately equal to 200 ms; e.g., less than or approximately equal to 100 ms; e.g., less than or approximately equal to 50 ms).

In some embodiments, a duration of the global exposure phase of the CCD camera is less than 10 times a shutter delay time of the CCD camera (e.g., less than 5 times the shutter delay time; e.g., less than 2 times the shutter delay time; e.g., less than the shutter delay time).

In some embodiments, a duration of the global exposure phase of the CCD camera is less than 10 times a read-out time of the CCD camera (e.g., less than 5 times the read-out time; e.g., less than 2 times the readout time; e.g., less than the read-out time).

In some embodiments, the CCD camera comprises at least 256 by 256 detector pixels (e.g., at least 1000 by 1000 detector pixels; e.g., at least 4000 by 4000 detector pixels).

In some embodiments, a size of a sensor array of the CCD camera is greater than or approximately equal to ½ inch along at least a first and/or a second dimension (e.g., at least ½ inch by at least ½ inch; e.g., greater than or approximately equal to 1 inch along at least a first and/or a second dimension; e.g., at least 1 inch by at least 1 inch).

In some embodiments, a field of view of the CCD camera is greater than or approximately equal to 100 mm along at least a first and/or a second dimension (e.g., 100 to 200 mm×100 to 200 mm).

In some embodiments, an output power of the illumination source is greater than or approximately equal to 100 mW (e.g., greater than or approximately equal to 200 mW; e.g., greater than or approximately equal to 300 mW).

In some embodiments, a settling time of the illumination source is greater than or approximately equal to 1 second (e.g., 2 seconds; e.g., 5 seconds).

In some embodiments, a light level at a sensor array of the CCD camera when the CCD camera is not in a global exposure phase (e.g., when a CCD shutter of the CCD is opening and/or closing; e.g., during a read-out phase of the CCD camera) is less than or approximately equal to a noise floor of the CCD camera [e.g., a maximal power across each detector pixel of the sensor array is less than or approximately equal to a value corresponding to (e.g., a power that produces a signal equal to) a read noise].

In some embodiments, acquiring each of the one or more images in step (c) comprises providing, by a first processor of a computing device, an image acquisition signal to the CCD camera to initiate the global exposure phase of the CCD camera (e.g., the image acquisition signal comprising a nominal exposure time that sets a duration of the global exposure phase of the CCD camera).

In some embodiments, automatically adjusting the source galvanometer mirror in step (b) comprises providing, by a source galvanometer controller module (e.g., a microcontroller; e.g., an electronic circuit), a rotational signal (e.g., an electronic signal; e.g., a time-varying voltage; e.g., a time-varying current) to the source galvanometer mirror wherein variation of a value (e.g., a voltage amplitude; e.g., a current amplitude) of the rotational signal varies the rotational angle of the source galvanometer mirror, such that when the rotational signal has a first rotational signal value the source galvanometer mirror is rotated to the first rotational angle and when the rotational signal has a second rotational signal value the source galvanometer mirror is rotated to the second rotational angle; at substep (A) of step (c), the source galvanometer controller module receives the first trigger signal and, responsive to receipt of the first trigger signal, adjusts the value of the rotational signal to the first rotational signal value, thereby rotating the source galvanometer mirror to the first rotational angle; and at substep (B) of step (c), the source galvanometer controller module receives the second trigger signal and, responsive to receipt of the second trigger signal, adjusts the value of the rotational signal to the second rotational signal value, thereby rotating the source galvanometer mirror to the second rotational angle.

In some embodiments, automatically adjusting the source galvanometer mirror in step (b) comprises: receiving, by the source galvanometer controller module, a CCD output signal (e.g., an electronic signal; e.g., a time-varying voltage; e.g., a time-varying current) from the CCD camera [e.g., wherein variation the CCD output signal is indicative of whether the CCD camera is in the global exposure phase (e.g., wherein the CCD output signal has a first output signal value when the CCD camera is not in the global exposure and has a second output signal value when the CCD camera is in the global exposure phase)]; and adjusting, by the source galvanometer controller module, the value of the rotational signal based on a value of the received CCD output signal (e.g., such that when the CCD output signal has the first output signal value the source galvanometer controller module adjusts the rotational signal to the first rotational signal value and when the CCD output signal value is the second output signal value the source galvanometer controller module adjusts the rotational signal to the second rotational signal value); the first trigger signal corresponds to a first variation in the CCD output signal (e.g., a transition in the value of the received CCD output signal from the first output signal value to the second output signal value); and the second trigger signal corresponds to a second variation in the CCD output signal (e.g., a transition in the value of the received CCD output signal from the first output signal value to the second output signal value).

In some embodiments, the source galvanometer mirror and the illumination source are housed within a source housing and wherein the source galvanometer mirror is aligned such that: (i) at the first rotational angle, the beam of illumination light is reflected by the source galvanometer mirror, through an exit port of the source housing and (ii) at the second rotational angle, the beam of illumination light is directed to a beam dump within the source housing.

In some embodiments, the illumination source, the source galvanometer mirror, the one or more object(s), and the CCD camera are housed within an optical system housing that is substantially opaque to ambient light, thereby limiting the amount of ambient light incident on a sensor array of the CCD camera.

In some embodiments, automatically opening and closing a laser shutter positioned in a path of the beam of illumination light from the illumination source to the one or more object(s), wherein when the laser shutter is open, the beam of illuminating light is allowed to pass through the laser shutter, and when the laser shutter is closed, the beam of illumination light is blocked by the laser shutter; at substep (A) of step (c), responsive to the first trigger signal indicating the start of the global exposure phase of the CCD camera, opening the laser shutter at substantially the same time when rotating the source galvanometer mirror to the first rotational angle; and at substep (B) of step (c), responsive to the second trigger signal indicating the end of the global exposure phase of the CCD camera, closing the laser shutter at substantially the same time when rotating the source galvanometer mirror to the second rotational angle.

In some embodiments, automatically opening and closing the laser shutter comprises providing, by a source laser shutter controller module (e.g., a microcontroller; e.g., an electronic circuit), a laser shutter signal (e.g., an electronic signal; e.g., a time-varying voltage; e.g., a time-varying current) to the laser shutter, wherein variation of a value (e.g., a voltage amplitude; e.g., a current amplitude) of the laser shutter signal causes opening and/or closing of the laser shutter, such that when the laser shutter signal has a first laser shutter signal value the laser shutter is open and when the laser shutter signal has a second laser shutter signal value the laser shutter is closed; at substep (A) of step (c), the laser shutter controller module receives the first trigger signal and, responsive to receipt of the first trigger signal, adjusts the value of the laser shutter signal to the first laser shutter signal value, thereby opening the laser shutter; and at substep (B) of step (c), the laser shutter controller module receives the second trigger signal and, responsive to receipt of the second trigger signal, adjusts the value of the laser shutter signal to the second laser shutter signal value, thereby closing the laser shutter.

In some embodiments, automatically opening and closing the laser shutter comprises: receiving, by the laser shutter controller module, the CCD output signal (e.g., an electronic signal; e.g., a time-varying voltage; e.g., a time-varying current) from the CCD camera [e.g., wherein variation of the CCD output signal is indicative of whether the CCD camera is in the global exposure phase (e.g., wherein the CCD output signal has a first output signal value when the CCD camera is not in the global exposure and has a second output signal value when the CCD camera is in the global exposure phase)]; and adjusting, by the laser shutter controller module, the value of the laser shutter signal based on the value of the received CCD output signal (e.g., such that when the CCD output signal has the first output signal value the laser shutter controller module adjusts the laser shutter signal to the first laser shutter signal value and when the CCD output signal value has the second output signal value the laser shutter controller module adjusts the laser shutter signal to the second laser shutter signal value).

In some embodiments, the source galvanometer mirror and illumination source are housed within a source housing and wherein the source galvanometer mirror is aligned such that: (i) at the first rotational angle, the beam of illumination light is reflected by the galvanometer mirror, through an exit port of the source housing and (ii) at the second rotational angle, the beam of illumination light is directed to a beam dump within the source housing; and the laser shutter is positioned at (e.g., in front of and in close proximity to) the exit port such that when the laser shutter is closed the beam of illumination light is prevented from passing through the exit port.

In some embodiments, acquiring the one or more images in step (c) comprises acquiring one or more high dynamic range (HDR) image sets, each HDR image set corresponding to a specific illumination location or a set of one or more illumination locations on the one or more object(s) and comprising a short exposure image and a long exposure image, wherein, for each HDR image set: the short exposure image is acquired by detecting emitted light and/or illumination light transmitted through or reflected by the one or more object(s) during a short duration global exposure phase of the CCD (e.g., wherein the short duration global exposure phase is sufficiently short such that the acquired short exposure image does not comprise any saturated image pixels), the long exposure image is acquired by detecting emitted light and/or illumination light transmitted through or reflected by the one or more object(s) during a long duration global exposure phase of the CCD, the long duration global exposure phase of the CCD lasting longer than the short duration global exposure phase, and both the short exposure image and long exposure image of the given HDR image set are acquired by detecting emitted light and/or illumination light transmitted through or reflected by the object as a result of illumination of the one or more object(s) by the beam of illumination light at a same specific illumination location or set of illumination locations to which the HDR image set corresponds.

In some embodiments, the method comprises: directing the beam of illumination light to a plurality of illumination locations on the one or more object(s); at step (c), acquiring a plurality of images with the CCD camera, each image corresponding to a particular set of one or more illumination locations of the plurality of illumination locations (e.g., wherein each image corresponds to a distinct illumination location; e.g., wherein each image is a member of one of a plurality of HDR image sets, and each HDR image set corresponds to distinct illumination location; e.g., wherein each image corresponds to a particular set of illumination locations comprising one illumination location per object to be imaged) and representing (i) detected emitted light from the one or more object(s) as a result of illumination of the one or more object(s) at the corresponding particular set of one or more illumination location(s) and/or (ii) detected illumination light transmitted through or reflected by the one or more object(s) following illumination of the one or more object(s) at the corresponding set of one or more illumination location(s); receiving and/or accessing, by a processor of a computing device, data corresponding to the plurality of acquired images; and creating (e.g., computing), by the processor, one or more tomographic image(s) of the one or more object(s) using the data corresponding to the plurality of acquired images.

In some embodiments, the method comprises using a galvanometer optical scanner to direct the beam of illumination light to the plurality of illumination locations on the one or more object(s).

In some embodiments, the plurality of acquired images comprises at least 100 images (e.g., 50 fluorescence images and 50 excitation images), which may be acquired in at time less than or approximately equal to 200 ms (e.g., less than or approximately equal to 150 ms; e.g., less than or approximately equal to 120 ms).

Another aspect of the present disclosure is directed to a method for synchronizing illumination of one or more object(s) with a global exposure phase of a CCD camera for rapid image acquisition by the CCD camera, the method comprising: (a) directing a beam of illumination light emitted from an output of an illumination source through a laser shutter, to the one or more object(s) to be imaged; (b) automatically opening and closing the laser shutter, such that when the laser shutter is open, the beam of illumination light allowed to pass through the laser shutter, thereby illuminating the one or more object(s), and when the laser shutter is closed, it blocks the beam of illumination light, thereby preventing the one or more object(s) from being illuminated with the beam of illumination light; and (c) acquiring one or more images with the CCD camera, wherein: the CCD camera is aligned and operable to detect (i) light (e.g., fluorescent light and/or bioluminescent light) emitted from the one or more object(s) (e.g., from within the one or more object(s), and/or from a surface of the one or more object(s)) as a result of illumination of the one or more object(s) by the beam of illumination light and/or (ii) detect illumination light transmitted through or reflected by the one or more object(s), and acquiring each of the one or more images comprises: (A) responsive to a first trigger signal indicating a start of the global exposure phase of the CCD camera, opening the laser shutter such that during the global exposure phase of the CCD camera the one or more object(s) is/are illuminated with the beam of illumination light; and (B) responsive to a second trigger signal indicating an end of the global exposure phase of the CCD camera, closing the laser shutter such that when the CCD camera is not in the global exposure phase the one or more object(s) is/are not illuminated with the beam of illumination light, thereby synchronizing illumination of the one or more object(s) with the global exposure phase of the CCD camera for rapid image acquisition by the CCD camera.

In some embodiments, a duration of the global exposure phase of the CCD camera (e.g., the global exposure time) for each of the one or more acquired images is less than or approximately equal to 400 ms (e.g., less than or approximately equal to 200 ms; e.g., less than or approximately equal to 100 ms; e.g., less than or approximately equal to 50 ms).

In some embodiments, a duration of the global exposure phase of the CCD camera is less than 10 times a shutter delay time of the CCD camera (e.g., less than 5 times the shutter delay time; e.g., less than 2 times the shutter delay time; e.g., less than the shutter delay time).

In some embodiments, a duration of the global exposure phase of the CCD camera is less than 10 times a read-out time of the CCD camera (e.g., less than 5 times the read-out time; e.g., less than 2 times the readout time; e.g., less than the read-out time).

In some embodiments, the CCD camera comprises at least 256 by 256 detector pixels (e.g., at least 1000 by 1000 detector pixels; e.g., at least 4000 by 4000 detector pixels).

In some embodiments, a size of a sensor array of the CCD camera is greater than or approximately equal to ½ inch along at least a first and/or a second dimension (e.g., at least ½ inch by at least ½ inch; e.g., greater than or approximately equal to 1 inch along at least a first and/or a second dimension; e.g., at least 1 inch by at least 1 inch).

In some embodiments, a field of view of the CCD camera is greater than or approximately equal to 100 mm along at least a first and/or a second dimension (e.g., 100 to 200 mm×100 to 200 mm).

In some embodiments, an output power of the illumination source is greater than or approximately equal to 100 mW (e.g., greater than or approximately equal to 200 mW; e.g., greater than or approximately equal to 300 mW).

In some embodiments, a settling time of the illumination source is greater than or approximately equal to 1 second (e.g., 2 seconds; e.g., 5 seconds).

In some embodiments, a light level at a sensor array of the CCD camera when the CCD camera is not in a global exposure phase (e.g., when a CCD shutter of the CCD is opening and/or closing; e.g., during a read-out phase of the CCD camera) is less than or approximately equal to a noise floor of the CCD camera [e.g., a maximal power across each detector pixel of the sensor array is less than or approximately equal to a value corresponding to (e.g., a power that produces a signal equal to) a read noise].

In some embodiments, acquiring each of the one or more images in step (c) comprises providing, by a first processor of a computing device, an image acquisition signal to the CCD camera to initiate the global exposure phase of the CCD camera (e.g., the image acquisition signal comprising a nominal exposure time that sets a duration of the global exposure phase of the CCD camera).

In some embodiments, automatically opening and closing the laser shutter in step (b) comprises providing, by a laser shutter controller module (e.g., a microcontroller; e.g., an electronic circuit), a laser shutter signal (e.g., an electronic signal; e.g., a time-varying voltage; e.g., a time-varying current) to the laser shutter wherein variation of a value (e.g., a voltage amplitude; e.g., a current amplitude) of the laser shutter signal opens and closes the laser shutter, such that when the laser shutter signal has a first laser shutter signal value the laser shutter is open and when the laser shutter signal has a second laser shutter signal value the laser shutter is closed; at substep (A) of step (c), the laser shutter controller module receives the first trigger signal and, responsive to receipt of the first trigger signal, adjusts the value of the laser shutter signal to the first laser shutter signal value, thereby opening the laser shutter; and at substep (B) of step (c), the laser shutter controller module receives the second trigger signal and, responsive to receipt of the second trigger signal, adjusts the value of the laser shutter signal to the second laser shutter signal value, thereby closing the laser shutter.

In some embodiments, automatically opening and closing the laser shutter in step (b) comprises: receiving, by the laser shutter controller module, a CCD output signal (e.g., an electronic signal; e.g., a time-varying voltage; e.g., a time-varying current) from the CCD camera [e.g., wherein variation the CCD output signal is indicative of whether the CCD camera is in the global exposure phase (e.g., wherein the CCD output signal has a first output signal value when the CCD camera is not in the global exposure and has a second output signal value when the CCD camera is in the global exposure phase)]; and adjusting, by the laser shutter controller module, the value of the laser shutter signal based on a value of the received CCD output signal (e.g., such that when the CCD output signal has the first output signal value the laser shutter controller module adjusts the laser shutter signal to the first laser shutter signal value and when the CCD output signal value has the second output signal value the laser shutter controller module adjusts the laser shutter signal to the second laser shutter signal value); the first trigger signal corresponds to a first variation in the CCD output signal (e.g., a transition in the value of the received CCD output signal from the first output signal value to the second output signal value); and the second trigger signal corresponds to a second variation in the CCD output signal (e.g., a transition in the value of the received CCD output signal from the first output signal value to the second output signal value).

In some embodiments, the illumination source is housed within a source housing, the beam of illumination light is directed to an exit port of the source housing, and the laser shutter is positioned at (e.g., in front of and in close proximity to) the exit port such that when the laser shutter is closed the beam of illumination light is prevented from passing through the exit port.

In some embodiments, the illumination source, the laser shutter, the one or more object(s), and the CCD camera are housed within an optical system housing that is substantially opaque to ambient light, thereby limiting the amount of ambient light incident on a sensor array of the CCD camera.

In some embodiments, the method comprises: automatically adjusting a source galvanometer mirror that is positioned in a path of the beam of illumination light from the illumination source for alignment at a plurality of rotation angles comprising a first rotation angle and a second rotation angle, wherein, at the first rotation angle, the source galvanometer mirror is aligned to reflect the beam of illumination light to direct it to one or more object(s) to be imaged thereby illuminating the one or more object(s), and at the second rotation angle, the source galvanometer mirror is aligned to reflect the beam of illumination light to direct it away from the one or more object(s) to be imaged such that the one or more object(s) is/are not illuminated; at substep (A) of step (c), responsive to the first trigger signal indicating the start of the global exposure phase of the CCD camera, rotating the source galvanometer mirror to the first rotational angle at substantially the same time when opening the laser shutter; and at substep (B) of step (c), responsive to the second trigger signal indicating the end of the global exposure phase of the CCD camera, rotating the source galvanometer mirror to the second rotational angle at substantially the same time when closing the laser shutter.

In some embodiments, automatically adjusting the source galvanometer mirror comprises providing, by a source galvanometer controller module (e.g., a microcontroller; e.g., an electronic circuit), a rotational signal (e.g., an electronic signal; e.g., a time-varying voltage; e.g., a time-varying current) to the source galvanometer mirror wherein variation of a value (e.g., a voltage amplitude; e.g., a current amplitude) rotational signal varies the rotational angle of the source galvanometer mirror, such that when the rotational signal has a first rotational signal value the source galvanometer mirror is rotated to the first rotational angle and when the rotational signal has a second rotational signal value the source galvanometer mirror is rotated to the second rotational angle; at substep (A) of step (c), the source galvanometer controller module receives the first trigger signal and, responsive to receipt of the first trigger signal, adjusts the value of the rotational signal to the first rotational signal value, thereby rotating the source galvanometer mirror to the first rotational angle; and at substep (B) of step (c), the source galvanometer controller module receives the second trigger signal and, responsive to receipt of the second trigger signal, adjusts the value of the rotational signal to the second rotational signal value, thereby rotating the source galvanometer mirror to the second rotational angle.

In some embodiments, automatically adjusting the source galvanometer mirror comprises: receiving, by the source galvanometer controller module, a CCD output signal (e.g., an electronic signal; e.g., a time-varying voltage; e.g., a time-varying current) from the CCD camera [e.g., wherein variation the CCD output signal is indicative of whether the CCD camera is in the global exposure phase (e.g., wherein the CCD output signal has a first output signal value when the CCD camera is not in the global exposure and has a second output signal value when the CCD camera is in the global exposure phase)]; and adjusting, by the source galvanometer controller module, the value of the rotational signal based on a value of the received CCD output signal (e.g., such that when the CCD output signal has the first output signal value the source galvanometer controller module adjusts the rotational signal to the first rotational signal value and when the CCD output signal value is the second output signal value the source galvanometer controller module adjusts the rotational signal to the second rotational signal value).

In some embodiments, the source galvanometer mirror and illumination source are housed within a source housing and wherein the source galvanometer mirror is aligned such that: (i) at the first rotational angle, the beam of illumination light is reflected by the galvanometer mirror, through an exit port of the source housing and (ii) at the second rotational angle, the beam of illumination light is directed to a beam dump within the source housing; and the laser shutter is positioned at (e.g., in front of and in close proximity to) the exit port such that when the laser shutter is closed the beam of illumination light is prevented from passing through the exit port.

In some embodiments, acquiring the one or more images in step (c) comprises acquiring one or more high dynamic range (HDR) image sets, each HDR image set corresponding to a specific illumination location or set of one or more illumination locations on the one or more object(s) and comprising a short exposure image and a long exposure image, wherein, for a given HDR image set: the short exposure image is acquired by detecting emitted light and/or illumination light transmitted through or reflected by the one or more object(s) during a short duration global exposure phase of the CCD (e.g., wherein the short duration global exposure phase is sufficiently short such that the acquired short exposure image does not comprise any saturated image pixels), the long exposure image is acquired by detecting emitted light and/or illumination light transmitted through or reflected by the one or more object(s) during a long duration global exposure phase of the CCD, the long duration global exposure phase of the CCD lasting longer than the short duration global exposure phase, and both the short exposure image and long exposure image of the given HDR image set are acquired by detecting emitted light and/or illumination light transmitted through or reflected by the object as a result of illumination of the one or more object(s) by the beam of illumination light at a same specific illumination location or set of illumination locations to which the HDR image set corresponds.

In some embodiments, the method comprises: directing the beam of illumination light to a plurality of illumination locations on the one or more object(s); at step (c), acquiring a plurality of images with the CCD camera, each image corresponding to a particular set of one or more illumination locations of the plurality of illumination locations (e.g., wherein each image corresponds to a distinct illumination location; e.g., wherein each image is a member of one of a plurality of HDR image sets, and each HDR image set corresponds to distinct illumination location; e.g., wherein each image corresponds to a particular set of illumination locations comprising one illumination location per object to be imaged) and representing (i) detected emitted light from the one or more object(s) as a result of illumination of the one or more object(s) at the corresponding particular set of one or more illumination location(s) and/or (ii) detected illumination light transmitted through or reflected by the one or more object(s) following illumination of the one or more object(s) at the corresponding particular set of one or more illumination location(s); receiving and/or accessing, by a processor of a computing device, data corresponding to the plurality of acquired images; and creating (e.g., computing), by the processor, one or more tomographic image(s) of the one or more object(s) using the data corresponding to the plurality of acquired images.

In some embodiments, the method comprises using a galvanometer optical scanner to direct the beam of illumination light to the plurality of illumination locations on the one or more object(s).

In some embodiments, the plurality of acquired images comprises at least 100 images (e.g., 50 fluorescence images and 50 excitation images), which may be acquired in at time less than or approximately equal to 200 ms (e.g., less than or approximately equal to 150 ms; e.g., less than or approximately equal to 120 ms).

Another aspect of the present disclosure is directed to a system for synchronizing illumination of one or more object(s) to be imaged with a global exposure phase of a CCD camera for rapid image acquisition by the CCD camera, the system comprising: (a) an illumination source aligned and operable to emit a beam of illumination light from its output and direct the beam of illumination light to a source galvanometer mirror; (b) a source galvanometer mirror operable to rotate through a plurality of angles and aligned to: (i) at a first rotational angle, reflect the beam of illumination light to direct it to the one or more object(s), and (ii) at a second rotation angle, reflect the beam of illumination light to direct it away from the one or more object(s), such that when the source galvanometer mirror is rotated to the first rotational angle, the one or more object(s) is/are illuminated with the beam of illumination light and when the source galvanometer mirror is rotated to the second rotational angle, the one or more object(s) is/are not illuminated with the beam of illumination light; and (c) a CCD camera aligned and operable to acquire one or more images of the one or more object(s), by (i) detecting light (e.g., fluorescent light and/or bioluminescent light) emitted from the one or more object(s) (e.g., from within the one or more object(s), and/or from a surface of the one or more object(s)) as a result of illumination of the one or more object(s) by the beam of illumination light and/or (ii) detecting illumination light transmitted through or reflected by the one or more object(s); (d) a source galvanometer controller module (e.g., a microcontroller; e.g., an electronic circuit) operable to: (A) responsive to a first trigger signal indicating a start of the global exposure phase of the CCD camera, cause rotation of the source galvanometer mirror to the first rotational angle such that during the global exposure stage of the CCD camera the one or more object(s) is/are illuminated with the beam of illumination light; and (B) responsive to a second trigger signal indicating an end of the global exposure phase of the CCD camera, cause rotation of the source galvanometer mirror to the second rotational angle such that when the CCD camera is not in the global exposure phase the one or more object(s) is/are not illuminated with the beam of illumination light; (e) a processor; and (f) a memory having instructions stored thereon, wherein the instructions, when executed by the processor, cause the processor to: receive and/or access data corresponding to one or more images acquired by the CCD camera; and obtain (e.g., compute) one or more tomographic image(s) of the one or more object(s) using the data corresponding to the acquired images.

In some embodiments, a duration of the global exposure phase of the CCD camera (e.g., the global exposure time) for each of the one or more acquired images is less than or approximately equal to 400 ms (e.g., less than or approximately equal to 200 ms; e.g., less than or approximately equal to 100 ms; e.g., less than or approximately equal to 50 ms).

In some embodiments, a duration of the global exposure phase of the CCD camera is less than 10 times a shutter delay time of the CCD camera (e.g., less than 5 times the shutter delay time; e.g., less than 2 times the shutter delay time; e.g., less than the shutter delay time).

In some embodiments, a duration of the global exposure phase of the CCD camera is less than 10 times a read-out time of the CCD camera (e.g., less than 5 times the read-out time; e.g., less than 2 times the readout time; e.g., less than the read-out time).

In some embodiments, the CCD camera comprises at least 256 by 256 detector pixels (e.g., at least 1000 by 1000 detector pixels; e.g., at least 4000 by 4000 detector pixels).

In some embodiments, a size of a sensor array of the CCD camera is greater than or approximately equal to ½ inch along at least a first and/or a second dimension (e.g., at least ½ inch by at least ½ inch; e.g., greater than or approximately equal to 1 inch along at least a first and/or a second dimension; e.g., at least 1 inch by at least 1 inch).

In some embodiments, a field of view of the CCD camera is greater than or approximately equal to 100 mm along at least a first and/or a second dimension (e.g., 100 to 200 mm×100 to 200 mm).

In some embodiments, an output power of the illumination source is greater than or approximately equal to 100 mW (e.g., greater than or approximately equal to 200 mW; e.g., greater than or approximately equal to 300 mW).

In some embodiments, a settling time of the illumination source is greater than or approximately equal to 1 second (e.g., 2 seconds; e.g., 5 seconds).

In some embodiments, a light level at a sensor array of the CCD camera when the CCD camera is not in a global exposure phase (e.g., when a CCD shutter of the CCD is opening and/or closing; e.g., during a read-out phase of the CCD camera) is less than or approximately equal to a noise floor of the CCD camera [e.g., a maximal power across each detector pixel of the sensor array is less than or approximately equal to a value corresponding to (e.g., a power that produces a signal equal to) a read noise].

In some embodiments, the CCD camera is operable to acquire each of the one or more images by receiving an image acquisition signal to initiate its global exposure phase (e.g., the image acquisition signal comprising a nominal exposure time that sets a duration of the global exposure phase of the CCD camera)(e.g., the system comprising a first processor of a computing device operable to provide the image acquisition signal to the CCD camera).

In some embodiments, the source galvanometer controller module is operable to: provide a rotational signal (e.g., an electronic signal; e.g., a time-varying voltage; e.g., a time-varying current) to the source galvanometer mirror, wherein variation of a value (e.g., a voltage amplitude; e.g., a current amplitude) of the rotational signal varies the rotational angle of the source galvanometer mirror, such that when the rotational signal has a first rotational signal value the source galvanometer mirror is rotated to the first rotational angle and when the rotational signal has a second rotational signal value the source galvanometer mirror is rotated to the second rotational angle; receive the first trigger signal and, responsive to receipt of the first trigger signal, adjust the value of the rotational signal to the first rotational signal value, thereby causing rotation of the source galvanometer mirror to the first rotational angle; and receive the second trigger signal and, responsive to receipt of the second trigger signal, adjust the value of the rotational signal to the second rotational signal value, thereby causing rotation of the source galvanometer mirror to the second rotational angle.

In some embodiments, the source galvanometer controller model is operable to: receive a CCD output signal (e.g., an electronic signal; e.g., a time-varying voltage; e.g., a time-varying current) from the CCD camera [e.g., wherein variation the CCD output signal is indicative of whether the CCD camera is in the global exposure phase (e.g., wherein the CCD output signal has a first output signal value when the CCD camera is not in the global exposure and has a second output signal value when the CCD camera is in the global exposure phase)]; and adjust the value of the rotational signal based on a value of the received CCD output signal (e.g., such that when the CCD output signal has the first output signal value the source galvanometer controller module adjusts the rotational signal to the first rotational signal value and when the CCD output signal value is the second output signal value the source galvanometer controller module adjusts the rotational signal to the second rotational signal value); the first trigger signal corresponds to a first variation in the CCD output signal (e.g., a transition in the value of the received CCD output signal from the first output signal value to the second output signal value); and the second trigger signal corresponds to a second variation in the CCD output signal (e.g., a transition in the value of the received CCD output signal from the first output signal value to the second output signal value).

In some embodiments, the system comprises a source housing within which the source galvanometer mirror and illumination source are housed, and wherein the source galvanometer mirror is aligned such that: (i) at the first rotational angle, the beam of illumination light is reflected by the source galvanometer mirror, through an exit port of the source housing and (ii) at the second rotational angle, the beam of illumination light is directed to a beam dump within the source housing.

In some embodiments, the system comprises an optical system housing within which the illumination source, the source galvanometer mirror, the one or more object(s), and the CCD camera are housed, wherein the optical system housing is substantially opaque to ambient light, thereby limiting the amount of ambient light incident on a sensor array of the CCD camera.

In some embodiments, the system comprises: a laser shutter positioned in a path of the beam of illumination light from the illumination source to the one or more object(s), wherein the laser shutter is operable to automatically open and close, such that when the laser shutter is open, the beam of illumination light allowed to pass through the laser shutter, thereby illuminating the one or more object(s), and when the laser shutter is closed, it blocks the beam of illumination light, thereby preventing the one or more object (s) from being illuminated with the beam of illumination light; and a laser shutter controller module operable to: responsive to the first trigger signal indicating the start of the global exposure phase of the CCD camera, cause opening the laser shutter at substantially the same time when rotating the source galvanometer mirror to the first rotational angle; and responsive to the second trigger signal indicating the end of the global exposure phase of the CCD camera, cause closing the laser shutter at substantially the same time when rotating the source galvanometer mirror to the second rotational angle.

In some embodiments, the laser shutter controller module is operable to: automatically open and close the laser shutter by providing a laser shutter signal (e.g., an electronic signal; e.g., a time-varying voltage; e.g., a time-varying current) to the laser shutter, wherein variation of a value (e.g., a voltage amplitude; e.g., a current amplitude) of the laser shutter signal causes opening and/or closing of the laser shutter, such that when the laser shutter signal has a first laser shutter signal value the laser shutter is open and when the laser shutter signal has a second laser shutter signal value the laser shutter is closed; receive the first trigger signal and, responsive to receipt of the first trigger signal, adjust the value of the laser shutter signal to the first laser shutter signal value, thereby opening the laser shutter; and receive the second trigger signal and, responsive to receipt of the second trigger signal, adjust the value of the laser shutter signal to the second laser shutter signal value, thereby closing the laser shutter.

In some embodiments, the laser shutter controller module is operable to: receive a CCD output signal (e.g., an electronic signal; e.g., a time-varying voltage; e.g., a time-varying current) from the CCD camera [e.g., wherein variation the CCD output signal is indicative of whether the CCD camera is in the global exposure phase (e.g., wherein the CCD output signal has a first output signal value when the CCD camera is not in the global exposure and has a second output signal value when the CCD camera is in the global exposure phase)]; and adjust the value of the laser shutter signal based on the value of the received CCD output signal (e.g., such that when the CCD output signal has the first output signal value the laser shutter controller module adjusts the laser shutter signal to the first laser shutter signal value and when the CCD output signal value has the second output signal value the laser shutter controller module adjusts the laser shutter signal to the second laser shutter signal value).

In some embodiments, the system comprises a source housing within which the source galvanometer mirror and illumination source are housed, and wherein: the source galvanometer mirror is aligned such that: (i) at the first rotational angle, the beam of illumination light is reflected by the galvanometer mirror, through an exit port of the source housing and (ii) at the second rotational angle, the beam of illumination light is directed to a beam dump within the source housing, and the laser shutter is positioned at (e.g., in front of and in close proximity to) the exit port such that when the laser shutter is closed the beam of illumination light is prevented from passing through the exit port.

In some embodiments, the CCD camera is operable to acquire one or more high dynamic range (HDR) image sets, each HDR image set corresponding to a specific illumination location or set of one or more illumination locations on the one or more object(s) and comprising a short exposure image and a long exposure image, wherein, for each HDR image set: the short exposure image is acquired by detecting emitted light and/or illumination light transmitted through or reflected by the one or more object(s) during a short duration global exposure phase of the CCD (e.g., wherein the short duration global exposure phase is sufficiently short such that the acquired short exposure image does not comprise any saturated image pixels), the long exposure image is acquired by detecting emitted light and/or illumination light transmitted through or reflected by the one or more object(s) during a long duration global exposure phase of the CCD, the long duration global exposure phase of the CCD lasting longer than the short duration global exposure phase, and both the short exposure image and long exposure image of the given HDR image set are acquired by detecting emitted light and/or illumination light transmitted through or reflected by the object as a result of illumination of the one or more object(s) by the beam of illumination light at a same specific illumination location or set of illumination locations to which the HDR image set corresponds.

In some embodiments, the system comprises a galvanometer optical scanner positioned in a path of the beam of illumination light from source galvanometer mirror to the one or more object(s) and operable to direct the beam of illumination light to a plurality of illumination locations on the one or more object(s), and wherein the one or more acquired images comprises a plurality of images, each corresponding to a particular set of one or more illumination locations of the plurality of illumination locations (e.g., wherein each image corresponds to a distinct illumination location; e.g., wherein each image is a member of one of a plurality of HDR image sets, and each HDR image set corresponds to distinct illumination location; e.g., wherein each image corresponds to a particular set of illumination locations comprising one illumination location per object to be imaged) and representing (i) detected emitted light from the one or more object(s) as a result of illumination of the one or more object(s) at the corresponding particular set of one or more illumination location(s) and/or (ii) detected illumination light transmitted through or reflected by the one or more object(s) following illumination of the one or more object(s) at the corresponding particular set of one or more illumination location(s).

In some embodiments, the plurality of acquired images comprises at least 100 images (e.g., 50 fluorescence images and 50 excitation images), which may be acquired in at time less than or approximately equal to 200 ms (e.g., less than or approximately equal to 150 ms; e.g., less than or approximately equal to 120 ms).

Another aspect of the present disclosure is directed to a system for synchronizing illumination of one or more object(s) to be imaged with a global exposure phase of a CCD camera for rapid image acquisition by a CCD camera, the system comprising: (a) an illumination source aligned and operable to emit a beam of illumination light from its output and direct the beam of illumination light through a laser shutter, to the one or more object(s); (b) the laser shutter, wherein the laser shutter is operable to automatically open and close, such that when the laser shutter is open, the beam of illumination light allowed to pass through the laser shutter, thereby illuminating the one or more object(s), and when the laser shutter is closed, it blocks the beam of illumination light, thereby preventing the one or more object(s) from being illuminated with the beam of illumination light; (c) a CCD camera aligned and operable to acquire one or more images of the one or more object(s), by (i) detecting emitted light (e.g., fluorescent light and/or bioluminescent light) emitted from the one or more object(s) (e.g., from within the one or more object(s), and/or from a surface of the one or more object(s)) as a result of illumination of the one or more object(s) by the beam of illumination light and/or (ii) detecting illumination light transmitted through or reflected by the one or more object(s); (d) a laser shutter controller module operable to: (A) responsive to a first trigger signal indicating a start of the global exposure phase of the CCD camera, cause opening of the laser shutter such that during the global exposure phase of the CCD camera the one or more object(s) is/are illuminated with the beam of illumination light; and (B) responsive to a second trigger signal indicating an end of the global exposure phase of the CCD camera, cause closing of the laser shutter such that when the CCD camera is not in the global exposure phase, the one or more object(s) is/are not illuminated with the beam of illumination light; (e) a processor; and (f) a memory having instructions stored thereon, wherein the instructions, when executed by the processor, cause the processor to: receive and/or access data corresponding to one or more images acquired by the CCD camera; and obtain (e.g., compute) one or more tomographic image(s) of the one or more object(s) using the data corresponding to the acquired images.

In some embodiments, a duration of the global exposure phase of the CCD camera (e.g., the global exposure time) for each of the one or more acquired images is less than or approximately equal to 400 ms (e.g., less than or approximately equal to 200 ms; e.g., less than or approximately equal to 100 ms; e.g., less than or approximately equal to 50 ms).

In some embodiments, a duration of the global exposure phase of the CCD camera is less than 10 times a shutter delay time of the CCD camera (e.g., less than 5 times the shutter delay time; e.g., less than 2 times the shutter delay time; e.g., less than the shutter delay time).

In some embodiments, a duration of the global exposure phase of the CCD camera is less than 10 times a read-out time of the CCD camera (e.g., less than 5 times the read-out time; e.g., less than 2 times the readout time; e.g., less than the read-out time).

In some embodiments, the CCD camera comprises at least 256 by 256 detector pixels (e.g., at least 1000 by 1000 detector pixels; e.g., at least 4000 by 4000 detector pixels).

In some embodiments, a size of a sensor array of the CCD camera is greater than or approximately equal to ½ inch along at least a first and/or a second dimension (e.g., at least ½ inch by at least ½ inch; e.g., greater than or approximately equal to 1 inch along at least a first and/or a second dimension; e.g., at least 1 inch by at least 1 inch).

In some embodiments, a field of view of the CCD camera is greater than or approximately equal to 100 mm along at least a first and/or a second dimension (e.g., 100 to 200 mm×100 to 200 mm).

In some embodiments, an output power of the illumination source is greater than or approximately equal to 100 mW (e.g., greater than or approximately equal to 200 mW; e.g., greater than or approximately equal to 300 mW).

In some embodiments, a settling time of the illumination source is greater than or approximately equal to 1 second (e.g., 2 seconds; e.g., 5 seconds).

In some embodiments, a light level at a sensor array of the CCD camera when the CCD camera is not in a global exposure phase (e.g., when a CCD shutter of the CCD is opening and/or closing; e.g., during a read-out phase of the CCD camera) is less than or approximately equal to a noise floor of the CCD camera [e.g., a maximal power across each detector pixel of the sensor array is less than or approximately equal to a value corresponding to (e.g., a power that produces a signal equal to) a read noise].

In some embodiments, the CCD camera is operable to acquire each of the one or more images by receiving an image acquisition signal to initiate its global exposure phase (e.g., the image acquisition signal comprising a nominal exposure time that sets a duration of the global exposure phase of the CCD camera)(e.g., the system comprising a first processor of a computing device operable to provide the image acquisition signal to the CCD camera).

In some embodiments, the laser shutter controller module is operable to: provide a laser shutter signal (e.g., an electronic signal; e.g., a time-varying voltage; e.g., a time-varying current) to the laser shutter, wherein variation of a value (e.g., a voltage amplitude; e.g., a current amplitude) of the laser shutter signal opens and closes the laser shutter, such that when the laser shutter signal has a first laser shutter signal value the laser shutter is open and when the laser shutter signal has a second laser shutter signal value the laser shutter is closed; receive the first trigger signal and, responsive to receipt of the first trigger signal, adjust the value of the laser shutter signal to the first laser shutter signal value, thereby opening the laser shutter; and receive the second trigger signal and, responsive to receipt of the second trigger signal, adjust the value of the laser shutter signal to the second laser shutter signal value, thereby closing the laser shutter.

In some embodiments, the laser shutter controller model is operable to: receive a CCD output signal (e.g., an electronic signal; e.g., a time-varying voltage; e.g., a time-varying current) from the CCD camera [e.g., wherein variation the CCD output signal is indicative of whether the CCD camera is in the global exposure phase (e.g., wherein the CCD output signal has a first output signal value when the CCD camera is not in the global exposure and has a second output signal value when the CCD camera is in the global exposure phase)]; and adjust the value of the laser shutter signal based on a value of the received CCD output signal (e.g., such that when the CCD output signal has the first output signal value the laser shutter controller module adjusts the laser shutter signal to the first laser shutter signal value and when the CCD output signal value has the second output signal value the laser shutter controller module adjusts the laser shutter signal to the second laser shutter signal value); the first trigger signal corresponds to a first variation in the CCD output signal (e.g., a transition in the value of the received CCD output signal from the first output signal value to the second output signal value); and the second trigger signal corresponds to a second variation in the CCD output signal (e.g., a transition in the value of the received CCD output signal from the first output signal value to the second output signal value).

In some embodiments, the system comprises a source housing within which the illumination source is housed, and wherein the beam of illumination light is directed to an exit port of the source housing, and the laser shutter is positioned at (e.g., in front of and in close proximity to) the exit port such that when the laser shutter is closed the beam of illumination light is prevented from passing through the exit port.

In some embodiments, the system comprises an optical system housing within which the illumination source, the laser shutter, the one or more object(s), and the CCD camera are housed, wherein the optical system housing is substantially opaque to ambient light, thereby limiting the amount of ambient light incident on a sensor array of the CCD camera.

In some embodiments, the system comprises: a source galvanometer mirror operable to rotate through a plurality of angles and aligned to: (i) at a first rotational angle, reflect the beam of illumination light to direct it to the one or more object(s), and (ii) at a second rotation angle, reflect the beam of illumination light to direct it away from the one or more object(s), such that when the source galvanometer mirror is rotated to the first rotational angle, the one or more object(s) is/are illuminated with the beam of illumination light and when the source galvanometer mirror is rotated to the second rotational angle, the one or more object(s) is/are not illuminated with the beam of illumination light; and a source galvanometer controller module operable to: responsive to the first trigger signal indicating the start of the global exposure phase of the CCD camera, cause rotation of the source galvanometer mirror to the first rotational angle at substantially the same time when opening the laser shutter; and responsive to the second trigger signal indicating the end of the global exposure phase of the CCD camera, cause rotation of the source galvanometer mirror to the second rotational angle at substantially the same time when closing the laser shutter.

In some embodiments, the source galvanometer controller module is operable to: automatically open and close the laser shutter by providing a rotational signal (e.g., an electronic signal; e.g., a time-varying voltage; e.g., a time-varying current) to the source galvanometer mirror, wherein variation of a value (e.g., a voltage amplitude; e.g., a current amplitude) rotational signal varies the rotational angle of the source galvanometer mirror, such that when the rotational signal has a first rotational signal value the source galvanometer mirror is rotated to the first rotational angle and when the rotational signal has a second rotational signal value the source galvanometer mirror is rotated to the second rotational angle; receive the first trigger signal and, responsive to receipt of the first trigger signal, adjust the value of the rotational signal to the first rotational signal value, thereby rotating the source galvanometer mirror to the first rotational angle; and receive the second trigger signal and, responsive to receipt of the second trigger signal, adjust the value of the rotational signal to the second rotational signal value, thereby rotating the source galvanometer mirror to the second rotational angle.

In some embodiments, the source galvanometer controller module is operable to: receive a CCD output signal (e.g., an electronic signal; e.g., a time-varying voltage; e.g., a time-varying current) from the CCD camera [e.g., wherein variation the CCD output signal is indicative of whether the CCD camera is in the global exposure phase (e.g., wherein the CCD output signal has a first output signal value when the CCD camera is not in the global exposure and has a second output signal value when the CCD camera is in the global exposure phase)]; and adjust the value of the rotational signal based on a value of the received CCD output signal (e.g., such that when the CCD output signal has the first output signal value the source galvanometer controller module adjusts the rotational signal to the first rotational signal value and when the CCD output signal value is the second output signal value the source galvanometer controller module adjusts the rotational signal to the second rotational signal value).

In some embodiments, the system comprises a source housing within which the source galvanometer mirror and illumination source are housed, wherein: the source galvanometer mirror is aligned such that: (i) at the first rotational angle, the beam of illumination light is reflected by the galvanometer mirror, through an exit port of the source housing and (ii) at the second rotational angle, the beam of illumination light is directed to a beam dump within the source housing, and the laser shutter is positioned at (e.g., in front of and in close proximity to) the exit port such that when the laser shutter is closed the beam of illumination light is prevented from passing through the exit port.

In some embodiments, the CCD camera is operable to acquire one or more high dynamic range (HDR) image sets, each HDR image set corresponding to a specific illumination location or set of one or more illumination locations on the one or more object(s) and comprising a short exposure image and a long exposure image, wherein, for each HDR image set: the short exposure image is acquired by detecting emitted light and/or illumination light transmitted through or reflected by the one or more object(s) during a short duration global exposure phase of the CCD (e.g., wherein the short duration global exposure phase is sufficiently short such that the acquired short exposure image does not comprise any saturated image pixels), the long exposure image is acquired by detecting emitted light and/or illumination light transmitted through or reflected by the one or more object(s) during a long duration global exposure phase of the CCD, the long duration global exposure phase of the CCD lasting longer than the short duration global exposure phase, and both the short exposure image and long exposure image of the HDR image set are acquired by detecting emitted light and/or illumination light transmitted through or reflected by the object as a result of illumination of the one or more object(s) by the beam of illumination light at a same specific illumination location or set of illumination locations to which the HDR image set corresponds.

In some embodiments, the system comprises a galvanometer optical scanner positioned in a path of the beam of illumination light from the source galvanometer mirror to the one or more object(s) and operable to direct the beam of illumination light to a plurality of illumination locations on the one or more object(s), and wherein the one or more acquired images comprises a plurality of images, each corresponding to a particular set of one or more illumination locations of the plurality of illumination locations (e.g., wherein each image corresponds to a distinct illumination location; e.g., wherein each image is a member of one of a plurality of HDR image sets, and each HDR image set corresponds to distinct illumination location; e.g., wherein each image corresponds to a particular set of illumination locations comprising one illumination location per object to be imaged) and representing (i) detected emitted light from the one or more object(s) as a result of illumination of the one or more object(s) at the corresponding particular set of one or more illumination location(s) and/or (ii) detected illumination light transmitted through or reflected by the one or more object(s) following illumination of the one or more object(s) at the corresponding particular set of one or more illumination location(s).

In some embodiments, the plurality of acquired images comprises at least 100 images (e.g., 50 fluorescence images and 50 excitation images), which may be acquired in at time less than or approximately equal to 200 ms (e.g., less than or approximately equal to 150 ms; e.g., less than or approximately equal to 120 ms).

Another aspect of the present disclosure is directed to a method for avoiding blooming artifacts when acquiring one or more high dynamic range (HDR) image set(s) with a CCD camera, each HDR image set comprising a short exposure image and a long exposure image, the method comprising: illuminating one or more object(s) at one or more illumination locations on the one or more object(s); and for each HDR image set of the one or more HDR image set(s): acquiring the short exposure image of the HDR image set by detecting (i) emitted light and/or (ii) illumination light transmitted through or reflected by one or more object(s) as a result of illumination of the one or more objects at a corresponding particular set of one or more illumination location(s) of the one or more illumination location(s), wherein the emitted light and/or illumination light is/are detected during a short duration exposure phase (e.g., a short duration global exposure phase) of the CCD camera (e.g., such that the short exposure image does not comprise a substantial number of (e.g., does not comprise any) saturated image pixels); acquiring the long exposure image of the HDR image set by: (a) detecting emitted light and/or illumination light transmitted through or reflected by the one or more object(s) as a result of illumination of the one or more object(s) at the corresponding particular set of one or more illumination location(s), wherein the emitted light and/or illumination light is/are detected during a long duration exposure phase (e.g., a long duration global exposure phase) of the CCD camera such that the long exposure image comprises one or more saturated image pixels; and (b) adjusting an on-chip binning level of the CCD camera such that each image pixel of the long exposure image corresponds to a group of binned detector pixels, each group of binned detector pixels having a full well capacity greater than that of an individual detector pixel, such that a full well capacity saturation limit of the CCD camera, based on the adjusted on-chip binning level, is greater that an A/D digitization saturation limit for the CCD camera; and (c) adjusting a duration of the long duration exposure phase such that one or more groups of binned detector pixels, each group corresponding to a saturated image pixel of the one or more saturated image pixels, are exposed for long enough to accumulate sufficient charge to exceed (i) the A/D digitization saturation limit, but neither (ii) the full well capacity saturation limit nor (iii) an output node capacity saturation limit of the CCD camera, thereby avoiding blooming artifacts.

In some embodiments, the method comprises, for each HDR image set, acquiring (i) the short exposure image and/or (ii) the long exposure image of the HDR image set by synchronizing illumination of the one or more object(s) with the global exposure phase of the CCD camera using any one of the methods of any one of the aspects or embodiments described herein.

Another aspect of the present disclosure is directed to a method for rapid 3D fluorescence tomographic imaging with a CCD camera by synchronizing illumination of one or more object(s) to be imaged with a global exposure phase of a CCD camera, the method comprising: (a) illuminating the one or more object(s) to be imaged with a beam of excitation light at a plurality of illumination locations on the one or more object(s); (b) acquiring, with the CCD camera, a plurality of images, each acquired image corresponding to a particular set of one or more of the illumination locations and obtained by (i) detecting fluorescent light emitted from the one or more object(s) as a result of illumination by the beam of excitation light at the corresponding particular set of one or more illumination locations and/or (ii) detecting excitation light transmitted through or reflected by the one or more object(s) following illumination of the one or more object(s) by the beam of excitation light at the corresponding particular set of one or more illumination locations, wherein step (b) is performed by synchronizing illumination of the one or more object(s) with the global exposure phase of the CCD camera such that, for each acquired image, (i) during the global exposure phase of the CCD camera the one or more object(s) is/are illuminated with the beam of excitation light, and (ii) when the CCD camera is not in the global exposure phase, the one or more object(s) is/are not illuminated with the beam of excitation light; (c) receiving and/or accessing, by a processor of a computing device, data corresponding to the plurality of acquired images; and (d) creating (e.g., computing) by the processor, one or more 3D tomographic image(s) of the one or more object(s) using the data corresponding to the plurality of acquired images.

In some embodiments, synchronizing illumination of the one or more object(s) with the global exposure phase of the CCD camera comprises switching on an excitation source from which the beam of excitation light is emitted when the CCD camera is in the global exposure phase and switching off the excitation source when the CCD camera is not in the global exposure phase [e.g., wherein acquiring each of the plurality of images comprises: (A) responsive to a first trigger signal indicating a start of a global exposure phase of the CCD camera, switching the excitation source on such that during the global exposure phase of the CCD camera the one or more object(s) is/are illuminated with the beam of illumination light; and (B) responsive to a second trigger signal indicating an end of the global exposure phase of the CCD camera, switching the excitation source off such that when the CCD camera is not in the global exposure phase, the one or more object(s) is/are not illuminated with the beam of illumination light, thereby synchronizing illumination of the one or more object(s) with the global exposure phase of the CCD camera for rapid image acquisition by the CCD camera].

In some embodiments, synchronizing illumination of the one or more object(s) with the global exposure phase of the CCD camera comprises performing any one of the methods of any of the aspects or embodiments described herein.

In some embodiments, the plurality of acquired images comprises a plurality of HDR image sets acquired using the methods of the aspects and embodiments described herein for avoiding blooming artifacts.

Another aspect of the present disclosure is directed to a system for rapid 3D fluorescence tomographic imaging with a CCD camera by synchronizing illumination of one or more object(s) to be imaged with a global exposure phase of a CCD camera, the system comprising: (a) an excitation source aligned and operable to emit a beam of excitation light from its output and direct the beam of excitation light to a plurality of illumination locations on the one or more object(s) to be imaged; (b) the CCD camera, wherein the CCD camera is aligned and operable to acquire a plurality of images each acquired image corresponding to a particular set of one or more illumination locations and each acquired image corresponding to a particular set of one or more illumination locations and obtained by (i) detecting fluorescent light emitted from the one or more object(s) as a result of illumination by the beam of excitation light at the corresponding particular set of one or more illumination locations and/or (ii) detecting excitation light transmitted through or reflected by the one or more object(s) following illumination of the one or more object(s) by the beam of excitation light at the corresponding particular set of one or more illumination locations; (c) one or more controller modules, each associated with one or more optical system components, wherein each controller module is operable to synchronize illumination of the one or more object(s) with the global exposure phase of the CCD camera such that, for each acquired image, (i) during the global exposure phase of the CCD camera, the one or more object(s) is/are illuminated with the beam of excitation light, and (ii) when the CCD camera is not in the global exposure phase, the one or more object(s) is/are not illuminated with the beam of excitation light; (d) a processor of a computing device; and (e) a memory having instructions stored thereon, wherein the instructions, when executed by the processor, cause the processor to: receive and/or access data corresponding to the plurality of acquired images; and create (e.g., compute) one or more 3D tomographic image(s) of the one or more object(s) using the data corresponding to the plurality of acquired images.

In some embodiments, the one or more controller modules comprises an excitation source controller module for which the one or more associated optical system components comprises the excitation source, and wherein the excitation source controller module is operable to synchronize illumination of the one or more object(s) with the global exposure phase of the CCD camera by switching the excitation source on when the CCD camera is in the global exposure phase and off when the CCD camera is not in the global exposure phase [e.g., the excitation source controller module is operable to: (A) responsive to a first trigger signal indicating a start of a global exposure phase of the CCD camera, cause switching on of the excitation source such that during the global exposure phase of the CCD camera the one or more object(s) is/are illuminated with the beam of illumination light; and (B) responsive to a second trigger signal indicating an end of the global exposure phase of the CCD camera, cause switching off of the excitation source such that when the CCD camera is not in the global exposure phase, the one or more object(s) is/are not illuminated with the beam of illumination light].

In some embodiments, at least one of the one or more controller modules comprises a source galvanometer controller module and the one or more associated optical system components comprises a source galvanometer mirror (e.g., a galvanometer controller module and a source galvanometer mirror of any one of the aspects and embodiments described herein).

In some embodiments, at least one of the one or more controller modules and associated optical system components comprises a laser shutter controller module and the one or more associated optical system components comprises a laser shutter (e.g., a laser shutter controller and laser shutter of any one of the aspects and embodiments described herein).

Embodiments described with respect to one or more aspects of the present disclosure may be, applied to another aspect of the present disclosure (e.g., features of embodiments described with respect to one independent claim, e.g., a method claim, are contemplated to be applicable to other embodiments of other independent claims, e.g., a system claim, and vice versa).

BRIEF DESCRIPTION OF THE FIGURES

The foregoing and other objects, aspects, features, and advantages of the present disclosure will become more apparent and better understood by referring to the following description taken in conjunction with the accompanying drawings, in which:

FIG. 11 is a block flow diagram of a process for obtaining a tomographic image of one or more objects via rapid scanning of a beam of excitation light, according to an illustrative embodiment.

Figure 1A:
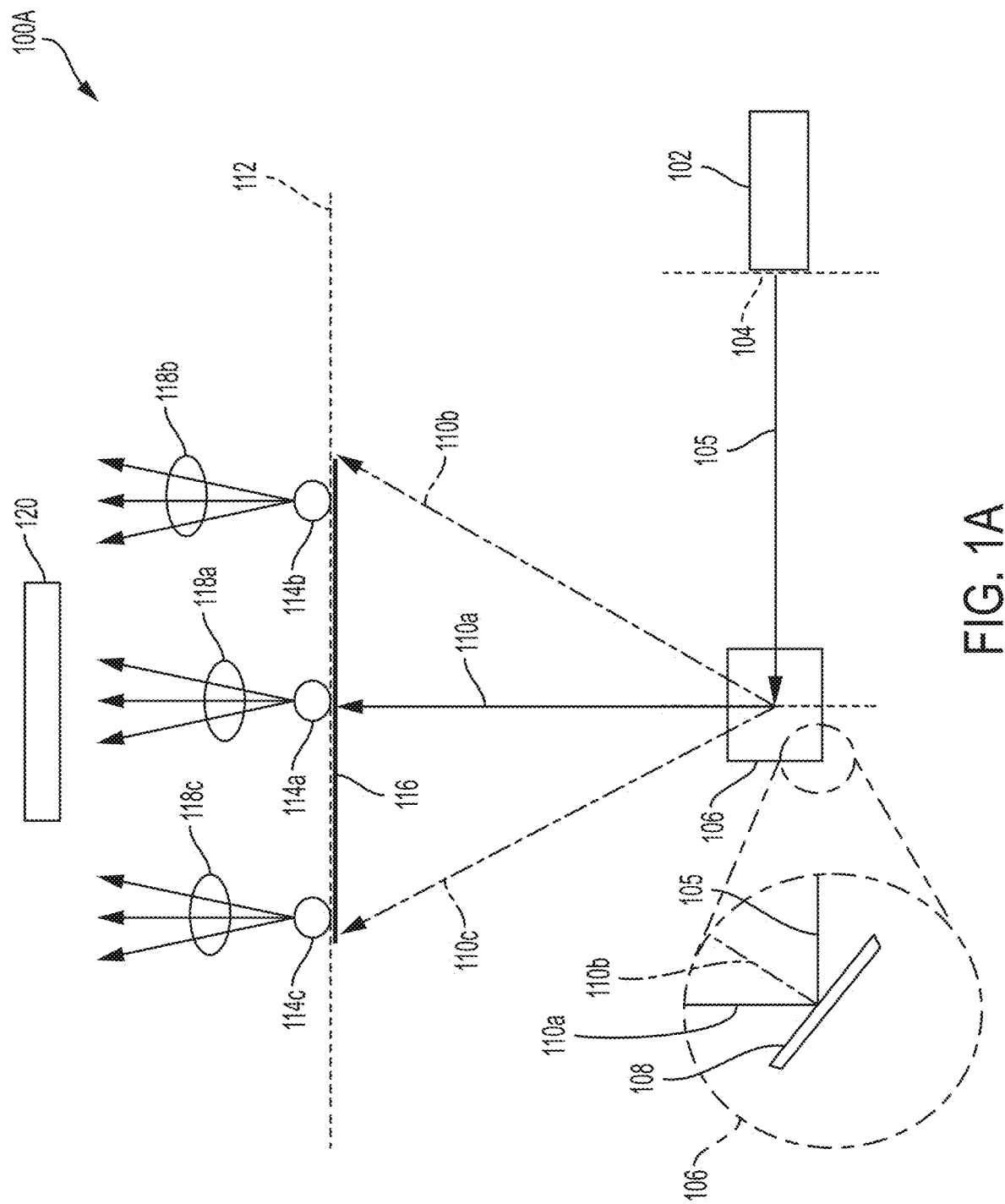
FIG. 1A is a schematic showing a layout of a system for rapidly scanning a beam of excitation light across a large field of view, according to an illustrative embodiment.

The features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements.

Definitions

Approximately: As used herein, the term "approximately" or "about," as applied to one or more values of interest, may refer to a value that is similar to a stated reference value. In some embodiments, the term "approximately" or "about" may refer to a range of values that fall within 25%, 20%, 19%, 18%, 17%, 16%, 15%, 14%, 13%, 12%, 11%, 10%, 9%, 8%, 7%, 6%, 5%, 4%, 3%, 2%, 1%, or less in either direction (greater than or less than) of the stated reference value unless otherwise stated or otherwise evident from the context and except where such number would exceed 100% of a possible value.

Image: As used herein, the term "image"—for example, a 3-D image of mammal—includes any visual representation, such as a photo, a video frame, streaming video, as well as any electronic, digital or mathematical analogue of a photo, video frame, or streaming video. Any apparatus described herein, in some embodiments, includes a display for displaying an image or any other result produced by the processor. Any method described herein, in some embodiments, includes a step of displaying an image or any other result produced via the method.

3-D, three-dimensional: As used herein, the terms "3-D" or "three-dimensional" with reference to an "image" means conveying information about three dimensions. A 3-D image may be rendered as a dataset in three dimensions and/or may be displayed as a set of two-dimensional representations, or as a three-dimensional representation. In some embodiments, a 3-D image is represented as voxel (e.g., volumetric pixel) data.

Map: As used herein, the term "map" is understood to mean a visual display, or any data representation that may be interpreted for visual display, which contains spatially-correlated information. For example, a three-dimensional map of a given volume may include a dataset of values of a given quantity that varies in three spatial dimensions throughout the volume. A three-dimensional map may be displayed in two-dimensions (e.g., on a two-dimensional screen, or on a two-dimensional printout).

Fluorescence image, emission image: As used herein, the terms "fluorescence image" and "emission image" are understood to mean an image acquired at a wavelength corresponding to an emission wavelength of a fluorescent agent or probe.

Excitation image: As used herein, the term "excitation image" is understood to mean an image acquired at a wavelength corresponding to a wavelength of excitation light emitted by an excitation source.

Electromagnetic radiation, radiation: As used herein, the terms "electromagnetic radiation" and "radiation" is understood to mean self-propagating waves in space of electric and magnetic components that oscillate at right angles to each other and to the direction of propagation, and are in phase with each other. Electromagnetic radiation includes: radio waves, microwaves, red, infrared, and near-infrared light, visible light, ultraviolet light, X-rays and gamma rays.

Optical path: As used herein, the term "optical path" may refer to the path that a beam of light travels as it propagates and is directed by various optical elements (e.g., lenses, mirrors, polarizers, beam-splitters, and the like) of an optical system. Optical elements may direct a beam of light by a variety of physical mechanisms, such as reflection, refraction, and the like. An optical path from a first point to a second point may refer to the path that a beam of light travels from the first point to the second point, accounting for direction (e.g., via reflection, refraction, and the like) by any optical elements in between the first and second points.

Optical path length, distance along an optical path: As used herein, the term "optical path length" may refer to the geometric length of the optical path a beam of light follows as it propagates between two points. Similarly, the term "distance", when referring to a distance along a particular optical path, may refer to the geometric distance that a beam of light travels when propagating along the particular optical path.

Detector: As used herein the term "detector" includes any detector of electromagnetic radiation including, but not limited to, CCD cameras, photomultiplier tubes, photodiodes, and avalanche photodiodes.

Focal Plane Array (FPA), sensor array: As used herein, the terms "Focal Plane Array", and "FPA" refer to any detector that that comprises a plurality of detector pixels and is operable to acquire an image (e.g., a 2D image) that represents a spatial variation in an amount (e.g., integrated power) across the different detector pixels of the FPA. In some embodiments, the detector pixels of an FPA are arranged as a two-dimensional matrix on a semiconductor chip, referred to herein as a "sensor array".

Local integration phase, local integration time: As used herein, the term "local integration phase", as in "a given detector pixel's local integration phase" may refer to a period of time during which a particular detector pixel accumulates signal (e.g., charge) in response to electromagnetic radiation incident on its surface.

In some embodiments, when an FPA is not in the process of acquiring an image, a keep-clean electronic signal is sent to its detector pixels. The keep-clean electronic signal prevents the detector pixels from accumulating signal (e.g., by continuously resetting the detector pixels to zero charge). When the FPA begins acquiring an image, the keep-clean signal is halted, and such that each detector pixel's local integration phase begins at the time it last received the keep-clean signal. In some embodiments, a sensor flush signal that removes any accumulated signal (e.g., charge) present on a detector pixel is sent to each detector pixel (e.g., zeros the detector pixel) and the beginning of image acquisition, and a given detector pixel's local integration phase begins following its receipt of the sensor flush signal. Accordingly, a given detector pixel's local integration phase may be initiated by the halting of a keep-clean signal and/or the receipt of a sensor flush signal. A given detector pixel's local integration phase ends when it is read-out.

As used herein, the term "local integration time", as in "a given detector pixel's local integration time" may refer to a duration of the given detector pixel's local integration phase.

Global integration phase, global integration time: As used herein, the term "global integration phase", when used in reference to a FPA detector (e.g., a CCD camera) may refer to a period of time when the FPA detector pixels' local integration phases overlap (e.g., the period of time when the FPA detector pixels are in their respective local integration phases). As used herein, the term "global integration time" may refer to a duration of the global integration phase.

Integration phase, integration time: As used herein, the term "integration phase", when used in reference to a FPA detector may refer to a period of time during which one or more detector pixels of the FPA detector are in a local integration phase. As used herein, the term "integration time" may refer to a duration of an integration phase.

Read-out phase, read-out time: As used herein, the term "read-out phase" may refer to a period of time during which signal (e.g., charge) accumulated by one or more detector pixels during their respective local integration phases is read-out (e.g., extracted) in order to produce, for each detector pixel that is read-out, an electronic signal representative (e.g., substantially proportional to) the accumulated charge for that detector pixel.

As used herein, the term "read-out time" may refer to a length, in time, of the read-out phase.

Local exposure phase, local exposure time: As used herein, the term "local exposure phase", when used in reference to a given detector pixel may refer to a period of time during which the given detector pixel is (i) in its local integration phase and (ii) capable of being illuminated by electromagnetic radiation.

For example, in some embodiments, a given FPA comprises a shutter that, when closed, covers one or more of the FPA's detector pixels and blocks electromagnetic radiation from illuminating the one or more detector pixels. Accordingly, a given detector pixel's local exposure phase begins at the later of (i) the beginning of the given detector pixel's local integration phase and (ii) when the given detector pixel is unblocked as the shutter opens. The given detector pixel's local exposure phase ends at the earlier of (i) the end of the given detector pixel's local integration phase (e.g., when it is read-out) and (ii) when the given detector pixel is blocked by closing of the shutter.

In some embodiments, the FPA shutter begins to open immediately following the beginning of the global integration phase and closes fully, such that detector pixels may be blocked, prior to the beginning of the read-out phase. In this manner, each detector pixel's local exposure phase begins once it is unblocked as the shutter opens and ends once it is blocked as the shutter closes.

In some embodiments, the FPA shutter is held completely open throughout the integration phase of the FPA detector, and each of the FPA's detector pixel's local exposure phases are the same as their local integration phases.

In some embodiments, a given FPA does not include a shutter or any other mechanism for blocking its detector pixels from external electromagnetic radiation, and each of the FPA's detector pixel's local exposure phases are the same as their local integration phases.

As used herein, the term "local exposure time" may refer to a duration of a local exposure phase.

Global exposure phase, global exposure time: As used herein, the term "global exposure phase", when used in reference to a FPA detector (e.g., a CCD camera) may refer to a period of time when the FPA detector pixels' local exposure phases may overlap (e.g., the period of time when the FPA detector pixels may be in their respective local exposure phases. As used herein, the term "global exposure time" may refer to a duration of the global exposure phase.

Exposure phase, exposure window, exposure time: As used herein, the terms "exposure phase", and "exposure window", when used in reference to a FPA detector may refer to a period of time during which one or more detector pixels of the FPA detector are in a local exposure phase. As used herein, the term "exposure time" may refer to a duration of an exposure phase.

Nominal exposure time: As used herein, the term "nominal exposure time", when used in reference to a FPA may refer to a value of a setting of the FPA that corresponds to a portion (e.g., up to the entirety) of the FPA's exposure time and is used by the FPA to set specific times at which to initiate its integration phase, opening and closing of its shutter, and read-out phase. The particular portion of the FPA's exposure time to which the nominal exposure time corresponds is dependent upon and may vary with the particular FPA type (e.g., manufacturer, model) used.

CCD camera, CCD: As used herein, the terms "CCD camera" and "CCD" refer to any FPA which does not read-out its detector pixels simultaneously. CCD camera may refer, for example, to standard CCD cameras, as well as intensified CCD cameras (ICCDs). CCD camera may refer to other FPAs that do not read-out their detector pixels simultaneously.

Galvanometer optical scanner: As used herein, the term "galvanometer optical scanner" may refer to an optical system component comprising one or more rotating galvanometer mirrors. A galvanometer optical scanner allows a beam of light to be scanned across a plurality of locations in a target plane a given distance away from the galvanometer optical scanner. This is achieved by directing a beam of light to the galvanometer optical scanner along an appropriately aligned optical path. The beam of light directed into the galvanometer optical scanner is reflected by the one or more galvanometer mirrors in succession and directed outwards, towards the target plane, in a direction defined by one or more optical scan angles. Typically, each optical scan angle is associated with a particular galvanometer mirror and determined by an angle at which the associated galvanometer mirror reflects the beam of light. Rotating a given galvanometer mirror varies the angle at which it reflects the beam of light, and thus varies the associated optical scan angle. Accordingly, rotating the galvanometer mirrors of the galvanometer optical scanner varies the one or more optical scan angles and, thus, the direction in which the beam of light is directed outwards from the galvanometer optical scanner. As a given galvanometer mirror is rotated, its associated optical scan angle is varied, and a location at which it intersects the target plane is varied along a particular direction.

In some embodiments, a galvanometer optical scanner comprising a single galvanometer mirror, which can be used to scan a beam of light through a plurality of locations along a particular direction in a target plane. Rotation of the galvanometer mirror thus scans the beam of light across a one-dimensional scan region (e.g., a line) of the object plane.

In some embodiments, a galvanometer optical scanner comprises two rotating galvanometer mirrors such that a beam of light can be scanned through a plurality of locations along two directions. Rotating the two galvanometer mirrors together thus allows a beam of light to be raster scanned across a two-dimensional region of the target plane. In some embodiments, the galvanometer mirrors are aligned such that a first galvanometer mirror varies a first optical scan angle in a first direction and a second galvanometer mirror varies a second optical scan angle in a second direction that is substantially orthogonal to the first direction. Variation of the first optical scan angle (e.g., via rotation of the first galvanometer mirror) varies a position at which the beam of light directed outwards from the galvanometer optical scanner intersects the target plane in a first direction. Variation of the second optical scan angle (e.g., via rotation of the second galvanometer mirror) varies a position at which the beam of light directed outwards from the galvanometer optical scanner intersects the target plane in a second direction. Accordingly, the first and second galvanometer mirrors can be rotated together to raster scan a beam of light across a two dimensional scan region of the target plane.

As used herein, directing a beam of light "to a galvanometer optical scanner" is understood to mean directed the beam of light along an appropriately aligned optical path to the galvanometer optical scanner such that it is incident on, and reflected by each of the one or more galvanometer mirrors that the galvanometer optical scanner comprises. As used herein, a distance to a galvanometer optical scanner (e.g., along a particular optical path, from a particular location) is understood to mean a distance to a first galvanometer mirror on which the beam of light incident. As used herein, a distance from a galvanometer optical scanner (e.g., along a particular optical path, to a particular location) is understood to mean a distance from the first galvanometer mirror on which a beam of light directed to the galvanometer optical scanner is incident, including distance traveled as it is reflected by any other mirrors that the galvanometer optical scanner comprises.

Forward model: As used herein, the term "forward model" is understood to mean a physical model of light propagation (e.g., photon transport) in a given medium from a source to a detector.

Tomographic image: As used herein, the term "tomographic image" may refer, for example, to an optical tomographic image, an x-ray tomographic image, a tomographic image generated by magnetic resonance, positron emission tomography (PET), magnetic resonance, (MR) single photon emission computed tomography (SPECT), and/or ultrasound, and any combination of these.

Diffuse medium, diffusive medium: As used herein, the terms "diffuse medium" and "diffusive medium" are used interchangeably and are understood to mean media where waves suffer multiple scattering events with small particles (the scatterers) within an otherwise homogeneous medium, randomizing their phase; in this case it is the average wave intensity that is studied. The average wave intensity will follow the diffusion equation, behaving in itself as a "diffuse wave" and interacting with surfaces and boundaries.

Object plane: As used herein, the term "object plane" may refer to an idealized two-dimensional imaging plane of an optical imaging system at, or in proximity to which, one or more objects (e.g., subjects) to be image are located.

Excitation source: As used herein, the term "excitation source" may refer to a light source such as a laser that is used to provide light to an optical system for optical excitation of fluorescence. In some embodiments, the excitation source emits a beam of excitation light from an output of the excitation source. Excitation light from the excitation source may then be provided to the optical system by directing the beam of excitation light from the output of the excitation source to various optical components (e.g., optics, mirrors, galvanometer optical scanners, and the like) of the optical system.

Illumination source: As used herein, the term "illumination source" may refer to any light source, such as a laser, that is used to provide light to an optical system for imaging. In some embodiments, the illumination source is an excitation source.

Image forming light: As used herein, the term "image forming light" may refer to light that is produced from or modified by (e.g., partially absorbed, scattered, reflected, transmitted through) an interaction between illumination light and one or more object(s) to be imaged, such that by detection of image forming light can be used to obtain an image of the one or more object(s) to be imaged.

For example, in some embodiments, the illumination light is excitation light and the image forming light is fluorescent light emitted from within the one or more object(s) to be imaged as a result of excitation of one or more fluorescent species within the one or more object(s). In some embodiments, the illumination light is excitation light and the image forming light is excitation light having been reflected by and/or transmitted through the one or more object(s) to be imaged.

Optic: As used herein, the term "optic" may refer to a collection of one or more optical elements that is used to shape a beam of light using one or more lenses. When various parameter of optics (e.g., focusing optics; e.g., collimating optics), such as focal length, clear aperture, and the like are described herein, they are understood to refer to a property of the optic—that is, a net effect of the optical elements that the optic comprises, rather than a property of any one of the individual elements of the optic.

Spot size: As used herein, the term "spot size" may refer to a measure of a diameter of a beam of light measured at a particular position and in an orthogonal plane that is substantially orthogonal to the direction of propagation of the beam of light. In some embodiments, spot size may refer to a measure of diameter of the beam of light corresponding to a distance measured along a line within the orthogonal plane between a first and second location along the line where a signal representing the intensity of the beam of light (e.g., as detected by a detector) falls to below a predefined fraction of the maximal intensity (e.g., half the maximal intensity; e.g., $1/e^2$ of the maximal intensity) of the beam of light. For example, spot size may correspond to a full-width at half maximum measured along a particular line in the orthogonal plane (e.g., line along an x-axis; e.g., a line alone a y-axis). In some embodiments, spot size may refer to a measure of the diameter of the beam of light corresponding to a function of two or more distances each measured along a different line within the orthogonal plane as described above. For example, spot size may be measured as a maximum value of a first distance, measured along a first line within the orthogonal plane and a second distance, measured along a second line within the orthogonal plane. In some embodiments the second line is orthogonal to first line.

Subject: As used herein, the term "subject" may refer to an individual that is imaged. In some embodiments, the subject is a human. In some embodiments, the subject is a small animal.

Small animal: As used herein, a "small animal" may refer to small mammals that can be imaged with a microCT and/or micro-MR imager. In some embodiments, "small animal" may refer to mice, rats, voles, rabbits, hamsters, and similarly-sized animals.

Settling time: As used herein, the term "settling time" may refer to one or both of (i) and (ii) as follows: (i) a time from when an illumination source (e.g., a laser) is turned on to when its output power reaches a stable value, for example such that the output power fluctuations are minimal, and/or below a specified amount (e.g., below an root-mean-squared percentage variation specified by the laser manufacturer) and (ii) a time from when the illumination source is turned off to when its output power reaches approximately zero or falls below a threshold output power. The threshold output power may correspond to an output power that is below a noise floor of a detector using in an optical system that uses the illumination source for illumination. For example, in an optical system using a CCD camera as a detector, the threshold output power may correspond to an output power that produces a signal that is approximately equal to or just below a read noise of the CCD detector. In this case, signal produced at the CCD detector by light from the illumination source will be lower than the read noise of the CCD detector.

DETAILED DESCRIPTION

It is contemplated that systems, architectures, devices, methods, and processes of the present disclosure encompass variations and adaptations developed using information from the embodiments described herein. Adaptation and/or modification of the systems, architectures, devices, methods, and processes described herein may be performed, as contemplated by this description.

Throughout the description, where articles, devices, systems, and architectures are described as having, including, or comprising specific components, or where processes and methods are described as having, including, or comprising specific steps, it is contemplated that, additionally, there are articles, devices, systems, and architectures of the present disclosure that consist essentially of, or consist of, the recited components, and that there are processes and methods according to the present disclosure that consist essentially of, or consist of, the recited processing steps.

It should be understood that the order of steps or order for performing certain action is immaterial so long as the present disclosure remains operable. Moreover, two or more steps or actions may be conducted simultaneously.

The mention herein of any publication, for example, in the Background section, is not an admission that the publication serves as prior art with respect to any of the claims presented herein. The Background section is presented for purposes of clarity and is not meant as a description of prior art with respect to any claim.

Documents are incorporated herein by reference as noted. Where there is any discrepancy in the meaning of a particular term, the meaning provided in the Definition section above is controlling.

Headers are provided for the convenience of the reader— the presence and/or placement of a header is not intended to limit the scope of the subject matter described herein.

Described herein are systems and methods that facilitate fast tomographic imaging over a wide field of view. In particular, in some embodiments, the systems and methods described herein allow for one or more images to be acquired with a CCD camera by synchronizing illumination with the phases of the image acquisition sequence of the CCD camera. In particular, as will be described in the following, by selectively illuminating one or more object(s) (e.g., subject(s); e.g., small animal(s)) to be imaged during specific phases (e.g., a global exposure phase) of the image acquisition sequence, the synchronized illumination allow for high-sensitivity, artifact free images to be acquired in short time frames. The ability to rapidly acquire images with a CCD is of particular relevance to optical tomographic imaging applications, in which multiple images of one or more object(s) are acquired in order to produce a single tomographic representation of the object(s).

A. Imaging with a CCD Camera

FIG. 1A shows a schematic of an example optical system 100A, used for optical tomographic imaging of one or more object(s) 114a, 114b, 114c positioned across an object plane 112. In the example optical system 100, an illumination source 102 emits a beam of illumination light from its output 104. The illumination source 102 and its output 104 are aligned to direct the beam of illumination light towards the object plane 112 where the one or more object(s) to be imaged are positioned, thereby illuminating the one or more object(s). Following illumination, image forming light 118a, 118b, 118c (e.g., fluorescent light, e.g., excitation light having been reflected by or transmitted through the one or more object(s) to be imaged) from the one or more object(s) is detected by a detector 120 in order to acquire images of the one or more object(s).

The example optical system 100 shown in FIG. 1 is an optical tomographic imaging system that utilizes a galvanometer optical scanner 106 to scan the beam of illumination light across a scan region 116 of the object plane 112. Thus, the galvanometer optical scanner 106 may be used to scan a beam of excitation light across multiple locations of an object plane. Light directed along an optical path 105 to the galvanometer optical scanner is reflected by one or more rotating galvanometer mirror(s) 108 of the galvanometer optical scanner. As the galvanometer mirrors of the galvanometer optical scanner are rotated, light is reflected at various angles, and directed along corresponding optical paths (e.g., 110a, 110b, 110c) towards the scan region. The beam of illumination light is thereby directed to a plurality of excitation locations within the scan region 116. This allows the one or more object(s) to be imaged 114a, 114b, 114c to be illuminated at a plurality of illumination locations. When a given object is illuminated at a particular illumination location, image forming light resulting from illumination of the given object at the particular illumination location is detected by the detector 120. In some embodiments, the detector is a focal plane array (FPA) detector that acquires one or more image(s) of the one or more object(s). The acquired images are used to create one or more tomographic image(s) of the one or more object(s) 114a, 114b, 114c. Approaches for fluorescence optical tomographic imaging with a galvanometer optical scanner 106 are described in U.S. patent application Ser. No. 15/654,442, filed Jul. 19, 2017, the contents of which are hereby incorporated by reference in their entirety.

For example, as described in U.S. application Ser. No. 15/654,442, for each excitation location, one or more corresponding image(s) (e.g., an emission image and/or an excitation image) of the one or more object(s) are acquired. The plurality of images of the one or more object(s) are then used to create one or more tomographic images of the one or more object(s).

Furthermore, as described in U.S. application Ser. No. 15/654,442, the beam scanning approaches described above may utilize a galvanometer optical scanner 106 comprising two galvanometer mirrors that are aligned so as to scan the beam of excitation light in two orthogonal directions across the object plane. A first galvanometer mirror may scan the beam of excitation light along an associated first direction across the object plane (e.g., an x-direction). A second galvanometer mirror may scan the beam of excitation light along an associated second direction across the object plane (e.g., a y-direction). In some embodiments, rotation of the first and second galvanometer mirrors together raster scans the beam of excitation light across a two-dimensional scan region of the object plane. In some embodiments, the size of the scan region is determined by the maximal rotational angles of the first and second galvanometer mirrors and the distance from the galvanometer optical scanner 106 to the object plane 112.

U.S. application Ser. No. 15/654,442 also describes a multiplexed imaging approach, wherein the galvanometer optical scanner 106 directs the beam of illumination light (e.g., excitation light) to multiple excitation locations during an exposure window of the detector 120 used to acquire an image.

By virtue of the ability to rapidly scan the beam of excitation light using the beam scanning approach described herein, each fluorescence emission image is associated with multiple excitation locations. Thus, in the multiplexed approach, the discrete excitation locations can be arranged in sets, with each set comprising multiple excitation locations. Rather than raster scan the beam of excitation light from excitation location to excitation location in a sequential fashion (e.g., directing the beam of excitation light to a first excitation location, then an adjacent excitation location, and so on), the beam of excitation light is scanned in a set-wise fashion. The galvanometer optical scanner scans the beam of excitation light through the discrete excitation locations one set at a time, directing the beam of excitation light to each discrete excitation location within a given set before proceeding on to a next set.

In some embodiments, the fast scanning capability of the galvanometer optical scanner allows the beam of excitation light to be directed to each of the discrete excitation locations of a set, one after the other, during a time period corresponding to an exposure window of the one or more detectors. Each fluorescence emission image represents fluorescent light detected by the one or more detector, over a period of time corresponding to the exposure window. By scanning the beam of excitation light to multiple excitation locations during the exposure window of the one or more detectors, a fluorescence image associated with the set of excitation locations is recorded. Each fluorescence emission recorded in this manner is thus associated with a set of excitation locations and represents detected fluorescent light emitted in response to illuminating one or the one or more subjects by directing the beam of excitation light to each excitation location of the associated set.

In some embodiments, this approach can be used reduce the amount of time and number of fluorescence emission images needed to obtain tomographic images of multiple subjects. As discussed above, each subject is associated with a portion of the excitation locations within the scan region.

Thus, in the multiplexed approach, the acquired image may represent detected image forming light resulting from illumination of the one or more object(s) when the beam of illumination light is directed to the multiple excitation locations, and accordingly, corresponds to a set of excitation locations (e.g., a specific plurality of excitation location). A plurality of images can be acquired in this manner, each image corresponding to a specific, distinct set of excitation locations. As described in U.S. application Ser. No. 15/654,442, in some embodiments, this multiplexed imaging approach increases the speed at which a tomographic images of multiple objects can be obtained.

In some embodiments, the speed at which tomographic images can be obtained can be increased by reducing the time required to acquire each of the plurality of images used for tomographic reconstruction. Reducing the time for acquiring images used in tomographic reconstruction is particularly relevant for approaches that allow illumination beams to be rapidly scanned and thereby rapidly illuminate a plurality of illumination locations on one or more object(s) to be imaged, such as the galvanometer optical scanning approach described in U.S. application Ser. No. 15/654,442. In such imaging systems, the beam of illumination light can be scanned fast enough that the time required to acquire an image represents a bottleneck. In imaging systems that take longer to position a beam of illumination light from one location to a next, the time required to obtain a tomographic image is determined primarily by the time required to position the beam of illumination light. Accordingly, in imaging systems that cannot rapidly illuminate various locations, image acquisition time is less of a concern, and was not considered previously.

In some embodiments, image acquisition with an FPA detector comprises two phases—an exposure phase and a read-out phase, and the time required to acquire a given image is determined by the duration of each of these phases of the image acquisition sequence. FPA detectors comprise a plurality of detector pixels, typically arranged as a two-dimensional matrix, referred to herein as a sensor array. During an FPA detector's exposure phase, the detector pixels of the FPA sensor array are exposed to light and accumulate signal (e.g., charge) in response to light incident on their surface.

After a set time, the signal (e.g., charge) accumulated by each detector pixel is read-out during a read-out phase to produce an image. The acquired image comprises a plurality of image pixels, each corresponding to one or more detector pixels and having an intensity value representative of the signal read-out from the one or more corresponding detector pixels. For example, in some embodiments, each image pixel corresponds to a distinct detector pixel and has an intensity value representative of (e.g., substantially proportional to) the signal accumulated by that detector pixel. In some embodiments, detector pixels are binned such that each image pixel corresponds to a distinct set of two or more adjacent detector pixels (e.g., each image pixel corresponds to a two-by-two block of detector pixels, or a four-by-four block of detector pixels, or other size block of detector pixels).

An important challenge for rapid, high-sensitivity image acquisition is presented by the fact that, while exposure and read-out are often considered in regard to a FPA detector as a whole, the sensor array of an FPA comprises a plurality of detector pixels each of which has its own local exposure phase during which it is (i) exposed to light and (ii) allowed to accumulate signal (e.g., charge) in response to light incident on its surface. In particular, in some embodiments, when image acquisition is initiated for an FPA detector, the detector pixels are zeroed and set to a state in which they are operable to accumulate signal in response to incident light. The zeroing of a given detector pixel and setting it to a state in which it is operable to accumulate signal in response to incident light begins the given detector pixel's local integration phase.

During the detector pixel's local integration phase, light incident on the surface of the detector pixel causes accumulation of signal (e.g., charge). After a certain period of time, the local integration phase of the detector pixel ends and signal accumulated by the detector pixel is read-out. The total signal accumulated by the detector pixel, and, accordingly, the intensity of an image pixel to which it corresponds, is a function of the amount of light incident on its surface during its local integration phase. If the detector pixel is exposed throughout its local phase, then its local integration phase is the same as its local exposure phase.

In an idealized FPA detector, the detector pixels' local integration phases begin and end simultaneously, such that each detector pixel accumulates signal over the same period of time, and variations in intensity of image pixels of an acquired image are determined essentially entirely by spatial variations of image forming light across the FPA sensor array.

CMOS cameras are a particular type of FPA detector that approximately achieve this idealized functionality. In particular, in CMOS cameras, the detector pixels' local integration phases begin simultaneously, and the detector pixels are read-out simultaneously. Accordingly, for a CMOS camera, the local integration phases of the detector pixels overlap completely with a global integration phase, in which each detector pixel is in its respective local integration phase. CMOS cameras achieve this functionality by incorporating additional circuitry for each detector pixel directly into the sensor array. The additional circuitry, however, limits the sensitivity of CMOS cameras. For example, the added circuitry generates heat on the sensor array, which produces a background signal that interferes with a desired signal from each detector pixel that is representative of detected light. Accordingly, for certain imaging applications, such as low light imaging, CMOS cameras may not have adequate sensitivity and/or require long exposure times to collect an adequate amount of light to produce a desired signal above background.

CCD cameras provide higher sensitivity than CMOS cameras and are more appropriate for low light imaging applications. CCD cameras typically do not include the additional circuitry for each detector pixel that CMOS cameras do, and, accordingly, do not suffer from the high levels of background that limit the sensitivity of CMOS cameras.

Unlike CMOS cameras, CCD cameras, however, do not address each detector pixel individually and cannot read-out the detector pixels of the sensor array simultaneously. Instead, CCD cameras perform read-out in a column-wise or row-wise fashion. That is, detector pixels are read-out one column or row at a time, such that detector pixels of a first column or row are read-out before detector pixels of a second column or row are read-out, and so on. Accordingly, when an image is acquired with a CCD camera, detector pixels in different columns or rows have different local integration times, depending on the order in which their respective columns or rows are read-out.

As a result, when an image is acquired with a CCD camera using a particular global exposure time, not all detector pixels will have local exposure times that are the same as the global exposure time. In particular, once the read-out phase of the CCD is initiated, while a first column or row is read-out immediately, other columns or rows will remain in their integration phases until they are read-out.

For example, while a first column of detector pixels is being read-out, the other columns of detector pixels remain in their local integration phases and continue to accumulate signal (e.g., charge). Accordingly, the difference in local integration times between detector pixels in a first column to be read-out and detector pixels in a last column to be read-out depends on a read-out time, which corresponds to a total time required to read-out each column of detector pixels in the sensor array of the CCD camera. If the sensor array of the CCD is exposed, e.g., not blocked from receiving light (e.g., by a shutter), during the read-out phase, the local integration times for detector pixels of different columns will be different. Accordingly, detector pixels in columns that are read-out later will have a longer period of time over which to accumulate signal. Intensity values of image pixels of an acquired image will, accordingly, not only reflect spatial variations in the amount of light incident across the sensor array, as they are intended to, but will also reflect differences in local integration times of the various detector pixels to which they correspond. The unintended variations in intensity values of image pixels that result from differences in local integration times of different detector pixels are artifacts that degrade the accuracy with which the acquired image captures the true spatial variation in the amount of light incident across the sensor array.

Typically, read-out occurs in a column-by-column fashion from one end of the sensor array to the other, such that the local integration time of a given detector pixel increases with column number across the sensor array. This difference in local integration times for detector pixels in different columns produces a gradient artifact in an acquired image, wherein an approximately linear increase in intensity from one end to the other of an acquired image is superimposed on the desired spatial variations in image pixel intensity that are represent the true image.

The severity of the gradient artifact depends on how large the read-time is in comparison with the global integration time. For example, the CCD camera's global integration time is ten times as large as its read-time, then the difference in the local integration times, and accordingly, local exposure times between the first and last columns of detector pixels to be read-out will be approximately ten percent at most. Accordingly, true variations in intensity resulting from features to be imaged will dominate over the gradient artifact. On the other hand, if the global integration time for the CCD camera is similar to or approximately the same as the read-time, then the last column of detector pixels to be read-out will have an local integration time that is approximately one and half to two times as large as the local integration time of the first column of detector pixels to be read-out. In this case, the gradient artifact produced by differences in the local integration times of the different detector pixels will be significant.

Accordingly, the severity of such gradient artifacts can be minimized by using global integration times that are substantially larger than the read-time of the CCD. While such an approach allows for accurate, artifact-free imaging with a CCD, it requires long global integration times, and, accordingly, does not allow for rapid image acquisition.

In some embodiments, a shutter is used to relax the above described requirement that a global integration time used to acquire an image be significantly (e.g., approximately ten times) larger than the read-time of the CCD, such that images can be acquired using shorter (e.g., less than ten times as large as the read-time). In particular, a CCD camera may use a mechanical shutter that, when closed, blocks outside illumination from reaching the sensor array. The shutter may be closed shortly before or as read-out begins, such that during the read-out phase of the CCD camera, the shutter prevents illumination of the detector pixels of the sensor array of the CCD. Accordingly, when an image is acquired with a CCD camera using a shutter, the shutter is opened as the local integration phases of the detector pixels are initiated, and closed before, or just as read-out begins. In some embodiments, the CCD shutter begins opening after each pixel has begun its integration phase, such that each pixel is in its integration phase when the shutter begins opening. In some embodiments, the CCD shutter begins to close prior to the beginning of the read-out phase, such that the CCD shutter is completely closed before read-out begins.

In this manner, the local exposure times for each detector pixel are determined primarily by the opening and closing of the CCD shutter, rather than the read-time of the CCD. In particular, if the CCD shutter is fully closed during the read-out phase of the CCD camera, then the detector pixels are not exposed during the read-out phase. Accordingly, even though certain detector pixels will have longer local integration times than others, they will not accumulate additional signal during the portions of their local integration phases that occur after other detector pixels have ended their respective local integration phases and are being read-out. Accordingly, use of a CCD shutter addresses artifacts produced by the sequential, column-wise read-out of detector pixels.

However, a CCD shutter may not achieve uniform local exposure times for the detector pixels. Even though use of CCD shutter ends the local exposure phases of the detector pixels before read-out, it takes a non-trivial, finite amount of time to open and close, and thus begins and ends exposure of different detector pixels at different times.

In particular, since the CCD shutter opens and closes by sliding across the sensor array, different columns of detector pixels are exposed for different amounts of time. For example, as the CCD shutter opens, a first column of detector pixels at a first end of the sensor array is immediately available for illumination by electromagnetic radiation, while a last column of detector pixels is prevented from being illuminated until the CCD shutter is completely open. Similarly, as the CCD shutter closes, the last column of detector pixels is immediately blocked from outside illumination, while the first column at the opposite end of the sensor remains exposed until the CCD shutter is completely closed. Accordingly, just as with read-out time, the time it takes the CCD shutter to open and/or close—the CCD shutter delay causes different detector pixels to have different local exposure times, and can produce similar gradient artifacts.

Although CCD shutter delay times are typically shorter than read-out times, CCD shutter delay imposes a similar lower limit on exposure times for CCD cameras. In particular, in some embodiments, artifact free image acquisition with a CCD camera typically requires that images are acquired using global exposure times that are approximately ten times larger than the CCD shutter delay. For example, for a typical CCD shutter delay of approximately 40 ms, a typical global exposure time of at least approximately 400 ms must be used. Accordingly, for imaging applications that require fast imaging with a CCD camera, approaches that overcome the lower bound to exposure times imposed by CCD shutter delay and/or read-out times are required.

The approaches described herein address the limitations on imaging speed that CCD shutter delay and read-out time place on CCD cameras. They allow for CCD cameras to acquire images at speeds comparable to, and exceeding those of fast sCMOS cameras. Accordingly, the systems and methods described herein allow for imaging systems to take advantage of the sensitivity advantages of CCD cameras, and image at fast speeds previously only possible with less sensitive CMOS cameras.

In some embodiments, a beam of excitation light with an appropriate shape is achieved via a beam shaping optic. For example, turning to FIG. 1B, an example of a layout of an optical system 100b utilizing beam shaping optics is shown. In some embodiments, a beam shaping optic 122 is positioned in the optical path (105a and 105b together) from the excitation source to the galvanometer optical scanner. The beam shaping optic 122 is positioned a distance, 151, from the output 104 of the excitation source, and a distance, $d_o^{(2)}$ (152) from the galvanometer optical scanner. In this manner, the beam of excitation light emitted by the excitation source 102 travels along an optical path 105a from the output 104 of the excitation source to the beam shaping optic 122 and along an optical path 105b from the beam shaping optic 122 to the galvanometer optical scanner 106.

The beam shaping optic may be used to produce a collimated or focused beam of excitation light. In particular, in some embodiments, the beam shaping optic is a collimating optic aligned such that after passing through the collimating optic, the beam of excitation light maintains a substantially fixed size, diverging slowly, as it travels (i) towards the galvanometer optical scanner and (ii) from the galvanometer optical scanner to the object plane. In some embodiments, the beam shaping optic is a focusing optic, wherein the focusing optic is aligned such that after passing through the focusing optic, the beam of excitation light converges as it travels (i) towards the galvanometer optical scanner and (ii) from the galvanometer optical scanner to the object plane [e.g., such that a spot size (e.g., diameter) of the beam of excitation light at the object plane is smaller than an initial size (e.g., diameter) of the beam of excitation light at the focusing optic].

Parameters (e.g., focal lengths) of the beam shaping optic (e.g., a collimating optic, e.g., a focusing optic) and its position in the optical system (e.g., along the optical path from the output of the excitation source to the galvanometer optical scanner) are determined such that a collimated or focused beam of excitation light with appropriate properties is produced when the beam of excitation light passes through the beam shaping optic.

Properties of the beams of excitation light produced via use of a beam shaping optic are similar to those described above with respect to beams of excitation light that are output with desired shapes directly from the excitation source. As described in the following, however, working distances and initial beam diameter are measured with respect to the position of the beam shaping optic 122, as opposed to the output 104 of the excitation source 102.

In some embodiments, similar to beams of excitation light shaped directly by the excitation source, a size of the galvanometer mirrors of the galvanometer optical scanner 106 sets, in part, an initial beam diameter of the beam of excitation light. Where a beam shaping optic is used, the initial beam diameter is measured at the position of the beam shaping optic 122. In particular, the initial beam diameter at the beam, along with a distance, $d_o^{(2)}$ (152), along an optical path 105b from the beam shaping optic to the galvanometer optical scanner 106 is set such that the spot size of the beam of excitation light at the galvanometer optical scanner 106 is smaller than the size, $w_{galvo}$ (162), of the galvanometer mirrors of the galvanometer optical scanner 106. In some embodiments, the size of the galvanometer mirrors of the galvanometer optical scanner can accept a beam of excitation light having a spot size from 3 to 5 mm in diameter.

In some embodiments, the beam shaping optic is used to produce an appropriately shaped beam of excitation light (e.g., after its passage through the beam shaping optic) such that its spot size at locations within the scan region is below a minimum desired spot size, even as the beam of excitation light is scanned through the scan region. As discussed above, in some embodiments the minimum spot size within the scan region is determined by a scattering length of the media in which imaging is to be performed. Accordingly, in some embodiments, for imaging in diffuse media such as tissue, the beam of excitation light is shaped to achieve a spot size of below 1 mm in diameter at locations within the scan region. In some embodiments, the beam of excitation light is shaped to achieve a spot size of approximately 0.5 mm at locations within the scan region. Where a beam shaping optic is used to produce a collimated or focused beam of excitation light, working distance is measured along an optical path from the beam shaping optic to the galvanometer optical scanner and from the galvanometer optical scanner to the object plane. As the beam of excitation light is scanned across the scan region, the working distance from the beam shaping optic to the object plane varies.

B. Synchronized Illumination Approaches

The systems and methods describe herein achieve this unique functionality by synchronizing illumination with the global exposure phase of the CCD camera, such that one or more object(s) to be imaged are selectively illuminated when the CCD sensor array is fully exposed and each detector pixel of the sensor array is in its local exposure phase. When the CCD sensor is not fully exposed (e.g., when the CCD shutter is opening and/or closing; e.g., when the CCD camera is in a read-out phase), the approaches described herein prevent illumination of the object(s) to be imaged.

In this manner, the synchronized illumination approaches described herein substantially reduce and/or eliminate image artifacts that result from differences in local exposure times for different detector pixels by preventing illumination of the one or more object(s) to be image and, accordingly, preventing image forming light from being produced and/or reaching the CCD sensor array. The systems and methods described herein may also utilize various housings to prevent other light, such as stray light and ambient light, from reaching the CCD sensor array, thereby minimizing the amount of light of any kind that reaches the CCD sensor array when it is not fully exposed.

In some embodiments, the approaches described herein allow the average power of light at the CCD sensor array to be kept below a noise floor of the CCD camera when the CCD camera is not in a global exposure phase. For example, light levels at the CCD camera sensor array can be held below those which would produce a single corresponding the read noise of the CCD camera. In some embodiments, as will be described in the following the light levels at the CCD sensor array can be reduced sufficiently to obviate the need for the CCD shutter to close prior to or during the read-out phase.

By minimizing the amount of light reaching the CCD sensor array when it is not fully exposed, negligible signal is accumulated by detector pixels during portions of their local exposure phases that differ from (e.g., fall outside of) the global exposure phase. Accordingly, even though local exposure times for various detector pixels may differ as a result of CCD shutter delay and/or read-time, image artifacts produced by these differences are negligible. This allows for artifact free, high sensitivity imaging using CCD exposure times (e.g., global exposure times; e.g., nominal exposure times) that are well below the CCD shutter delay limit and/or read-time limits that are required for accurate (e.g., artifact free) imaging with previous systems and methods that do not utilize the synchronized illumination approaches described herein.

Providing synchronized illumination in the fashion described above is non-trivial. In some embodiments, for specific illumination sources, it may be possible to synchronize illumination with the CCD camera's global exposure phase by rapidly switching the illumination source 102 on and off using a controller module. However, the ability to provide synchronized illumination in this manner depends the availability of an appropriate illumination source. Tomographic imaging applications may require illumination sources that emit light at particular wavelengths, and/or at particular levels of output power. In many cases, illumination sources that satisfy requirements of a particular tomographic imaging application (e.g., in terms of output wavelength and/or output power) and also can be turned on and off at sufficient speeds may simply not exist (or may be prohibitively expensive). In particular, many illumination sources cannot be turned on and off at appropriate speeds. Moreover, once turned on, illumination sources often take time to settle before they produce a stable beam of illumination light. During the settling period, immediately after an illumination source is turned on and before the it settles, the beam of illumination light typically fluctuates significantly in power. Accordingly, imaging with illumination provided by an illumination source immediately after it is turned on, while still settling, results in low quality, noisy images. This is especially true for laser sources, which are used in optical tomographic imaging applications, and wherein higher powered lasers are needed to deliver adequate power for imaging deep in tissue. Similarly, many illumination sources do not turn off instantaneously, but instead there is also a settling time delay before the output power to reach a sufficiently low value (e.g., approximately zero; e.g., a value below that which would produce a detector signal corresponding to the noise floor of the detector). Typical on/off delays and settling times for common laser sources are on the order of a few seconds.

Modulators such as choppers also cannot be used to synchronize illumination with a global exposure phase of a CCD camera. Modulators provide periodic illumination by periodically blocking and unblocking a beam of illumination light in a periodic fashion. Producing illumination that varies periodically does not allow for synchronizing illumination with a particular phase of a CCD camera as the blocking and unblocking of the beam of illumination occurs at periodic intervals, rather than being responsive to what phase of the image acquisition sequence the CCD camera is in. Accordingly, a modulator approach does not account for the fact that times when a CCD camera is in a global exposure phase and when it is not are different, and cannot be used if different global exposure times are used for different images, e.g., as is required for high dynamic range (HDR) imaging.

Figure 2A:
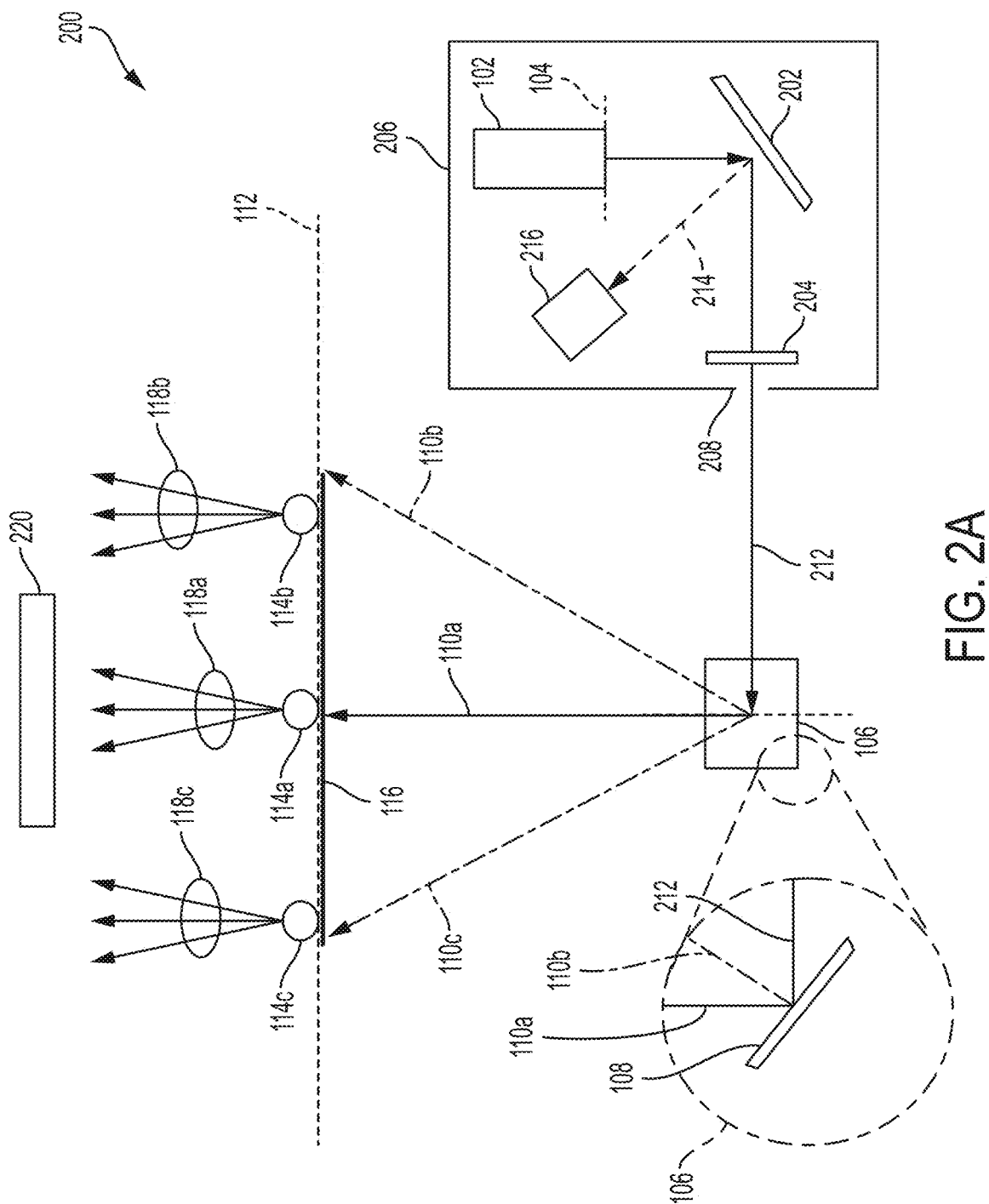
FIG. 2A is a schematic showing a layout of a system for synchronizing illumination with the image acquisition sequence of a CCD camera, according to an illustrative embodiment.

As described in the following, the systems and methods described herein provide two approaches that address the challenge of synchronizing illumination with a global exposure phase of a CCD camera, and allow for synchronization of illumination with a global exposure phase of the CCD camera even if the illumination source cannot be switched on and off at sufficient speeds. These two approaches are based on (i) use of a rotating galvanometer mirror system and (ii) use of a laser shutter system. The two approaches may be used separately or in combination. FIG. 2 shows a schematic of an example optical tomographic imaging system 200 that illustrates the rotating galvanometer mirror approach and the laser shutter approach for synchronizing illumination with a global exposure phase of a CCD camera 220.

B.i Illumination Control Via a Rotating (Source) Galvanometer Mirror

In the example optical tomographic imaging system 200 shown in FIG. 2, an illumination source 102 is aligned and operable to direct a beam of illumination light from its output 104 to a source galvanometer mirror 202. The source galvanometer mirror 202 is a rotating galvanometer mirror and is operable to rotate through a plurality of angles.

In some embodiments, the source galvanometer mirror 202 is aligned such that (i) at a first rotational angle, it directs (e.g., via reflection) the beam of illumination light to the one or more object(s) to be imaged 114a, 114b, 114c, and (ii) at a second rotational angle, it directs (e.g., via reflection) the beam of illumination light away from the one or more object(s) to be imaged 114a, 114c.

For example, in the optical system 200 shown in FIG. 2, the source galvanometer mirror 202 is aligned such that when it is rotated to the first rotational angle, it directs the beam of illumination light, via reflection, along an optical path 212 to a galvanometer optical scanner 106. The galvanometer optical scanner 106 provides for scanning of the beam of illumination light through a plurality of excitation locations within the scan region 116 in order to illuminate one or more object(s) to be imaged at a plurality of illumination locations.

In some embodiments, for example as shown in FIG. 2, the system includes a beam dump 216 positioned such that when the source galvanometer mirror 202 is rotated to the second rotational angle, the beam of illumination light is directed (e.g., along an optical path 214) to the beam dump 216. Directing the beam of illumination light to the beam dump 216 in this manner allows the beam dump 216 to absorb the majority of the beam of illumination light and reduces the amount of stray illumination light that may be scattered and reach the sensor array of the CCD camera when it is not in a global exposure phase.

Rotating galvanometer mirrors are typically operable to rotate between different angles within a few hundred micro seconds (µs) (e.g, 100 µs; e.g., 200 µs; e.g., 300 µs; e.g., 400 µs). Accordingly, the source galvanometer mirror 202 can be rotated between the first and second rotational angle to direct illumination to, or away from, respectively, the one or more object(s) to be imaged within times that are significantly shorter than the CCD shutter delay and/or read-time.

In some embodiments, the system comprises a source housing 206 that houses the source galvanometer mirror 202, the illumination source 102 and/or its output 104 (e.g., in some embodiments, the illumination source is a fiber coupled source, such that only a distal end of the fiber from which the beam of illumination light is emitted need be housed in the source housing 206), as well as, when included in the system, the beam dump 216. The source housing 206 comprises an exit port 208. The source galvanometer mirror 202 is aligned such that when it is rotated to the first rotational angle, the beam of illumination light is directed through the exit port 208, and to the one or more object(s) to be imaged. The source galvanometer mirror 202 is aligned such that when it is rotated to the second rotational angle, the beam of illumination light is directed away from the exit port 208, for example to the beam dump 216 within the source housing 206. The source housing 206 is substantially opaque to the illumination light and may include optical baffles to minimize stray illumination light from exiting the source housing 206 and reaching the CCD camera when the source galvanometer mirror 202 is rotated to the second rotational angle (e.g., to minimize stray illumination light from reaching the CCD sensor array when the CCD camera is not in a global exposure phase).

The system may also comprise an optical system housing that houses the illumination source 102 and/or its output 104 (e.g., in some embodiments, the illumination source is a fiber coupled source, such that only a distal end of the fiber from which the beam of illumination light is emitted need be housed in the source housing 206), the source galvanometer mirror 202, the one or more object(s) to be imaged 114a, 114b, 114c, and the CCD camera. The optical system housing is substantially opaque to light and substantially prevents ambient light from reaching the sensor array of the CCD camera. In this manner, using an optical system housing can further minimize any light, not just illumination light and stray light, from reaching the sensor array of the CCD camera when it is not fully exposed.

B.ii Illumination Control Via a Laser Shutter

In some embodiments, as shown in FIG. 2, the system 200 comprises a laser shutter 204 positioned in the optical path 212 of the beam of illumination light as it is directed to the one or more object(s) to be imaged 114a, 114b, 114c. The laser shutter 204 is operable to automatically open and close. When the laser shutter 204 is open, the beam of illumination light allowed to pass through the laser shutter 204, thereby illuminating the one or more object(s) 114a, 114b, 114c. When the laser shutter 204 is closed, it blocks the beam of illumination light, thereby preventing the one or more object(s) 114a, 114b, 114c from being illuminated with the beam of illumination light.

Accordingly, by opening and closing the laser shutter 204, illumination of the one or more object(s) with the beam of illumination light can be effectively switched on and off, respectively. Laser shutters are typically operable to open and close within a few ms (e.g, 1 ms; e.g., 1.5 ms; e.g., 2 ms). Accordingly, illumination can be switched on and off via opening and closing of the laser shutter 204 in significantly shorter times than the CCD shutter delay and/or read-time of the CCD camera.

A system utilizing a laser shutter to control illumination of one or more object(s) to be imaged may comprise a source housing 206 that houses the illumination source 102 and/or its output 104. The laser shutter 204 is positioned in close proximity to an exit port 208 of the source housing. For example, as shown in FIG. 2, the laser shutter 204 may be positioned directly in front of the exit port 208, such that when the laser shutter 204 is open the beam of illumination light is allowed to pass through the laser shutter 204, and then the exit port 208. The laser shutter may also be positioned directly at the exit port 208, or immediately after it, and similarly control illumination of the one or more object(s) to be imaged. In some embodiments, positioning the laser shutter 204 before the exit port 208 reduces the amount of stray light that may leave the source housing 206 and reach the CCD sensor array and/or the potential for stray light to leave the source housing 206 and reach the CCD sensor array in comparison with other positioning of the laser shutter 204.

In some embodiments, a system utilizing the laser shutter 204 comprises an optical system housing that houses the illumination source 102 and/or its output 104, the laser shutter 204, the one or more object(s) to be imaged 114a, 114b, 114c, and the CCD camera. As described above with respect to the source galvanometer mirror based approach for synchronizing illumination with a global exposure phase of the CCD camera, such an optical system housing can be used to minimize the amount of ambient light that reaches the sensor array of the CCD camera when it is not fully exposed.

B.iii Use of a Source Galvanometer Mirror and/or a Laser Shutter, Alone or in Combination The systems and methods described herein may use either the source galvanometer mirror 202 or the laser shutter 204 individually to control illumination of the one or more object(s). In some embodiments, both the source galvanometer mirror 202 and the laser shutter 204 are used in combination, as shown in FIG. 2.

For example, as shown in FIG. 2, the laser shutter 204 may be positioned after the source galvanometer mirror 202 to minimize the amount of unintended illumination light that reaches the sensor array of the CCD (e.g., via illumination of the one or more object(s) and/or scattering directly onto the sensor array) when the object(s) are not intended to be illuminated (e.g., when the CCD is not in a global exposure phase). Such an approach may be desirable when high powered lasers are used. Such high powered lasers can output beams of illumination light with powers up to on the order of several hundred mW (e.g., approximately 100 mW; e.g., greater than or approximately equal to 100 mW; e.g., greater than or approximately equal to 200 mW; e.g., greater than or approximately equal to 300 mW; e.g., greater than or approximately equal to 500 mW; e.g., greater than or approximately equal to 750 mW; e.g., approximately 1 W). Such high powered lasers can be focused to less than 1 mm spot sizes at a beam waist of the beam of illumination light.

In some embodiments, systems utilizing both a source galvanometer mirror 202 and a laser shutter 204 include a source housing 206 that houses the source galvanometer mirror 202, the laser shutter 204, the illumination source 102 and/or its output 104 and, when included in the system, the beam dump 216. The system may also comprise an optical system housing that houses the source galvanometer mirror 202, the laser shutter 204, the illumination source 102 and/or its output 104, the one or more object(s) to be imaged 114a, 114b, 114c, and the CCD camera.

B.iv Image Acquisition with Synchronized Illumination

The source galvanometer mirror and/or laser shutter allow illumination of the one or more object(s) to be controlled via rotation of the source galvanometer mirror 202 and/or automated opening and closing of the laser shutter 204. The illumination control provided by the source galvanometer mirror 202 and/or laser shutter 204 approaches described above can be used to synchronize illumination with a global exposure phase of the CCD during image acquisition.

Figure 4A:
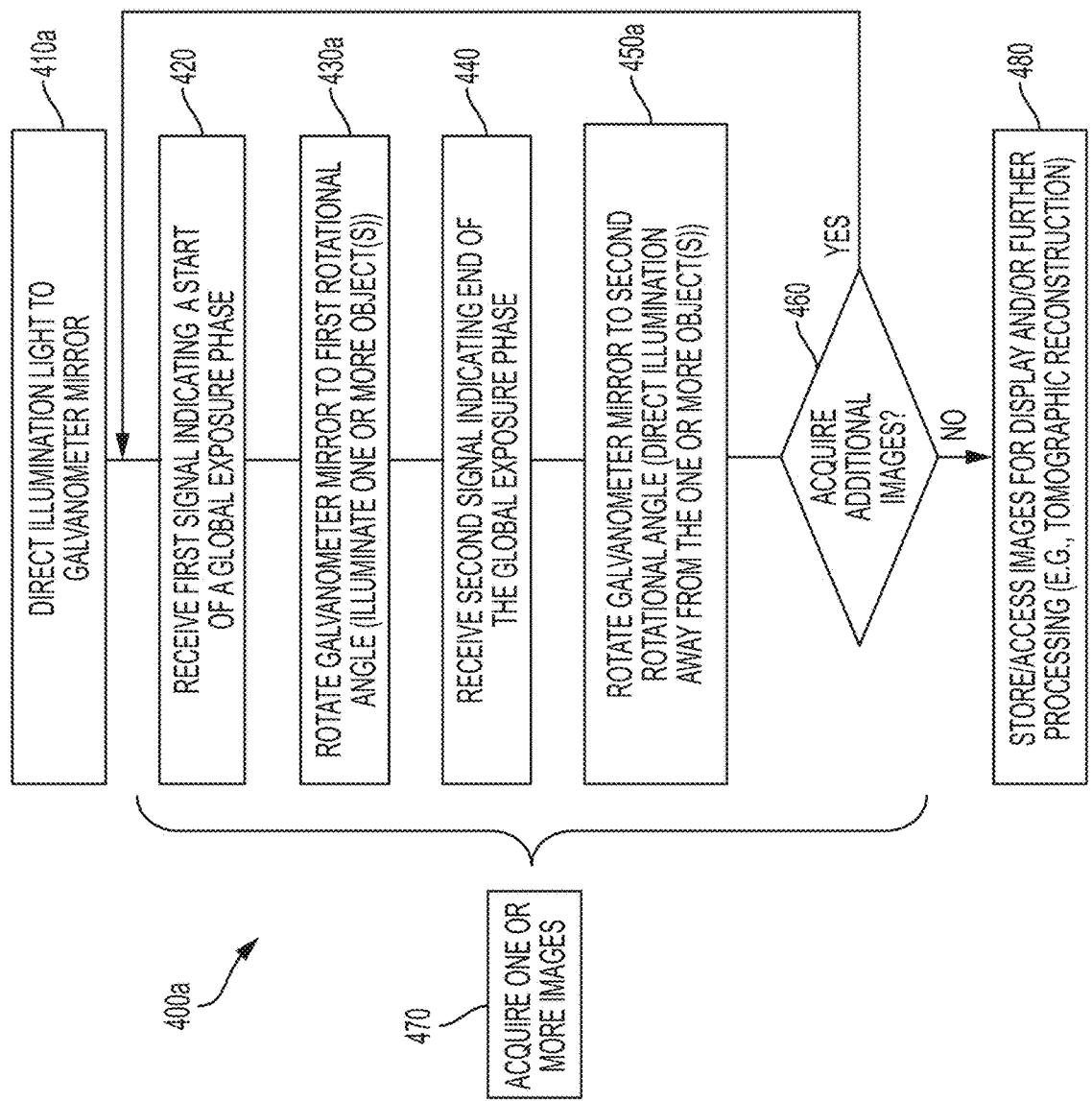
FIG. 4A is a block flow diagram of a process for using a rotating galvanometer mirror to synchronize illumination the image acquisition sequence of a CCD camera, according to an illustrative embodiment.

FIG. 4A shows an example process 400a for using the illumination control provided by the source galvanometer mirror 202 as described above to synchronize illumination of one or more object(s) with a global exposure phase of a CCD camera during image acquisition. As described above with respect to FIG. 2, the beam of illumination light is directed from an output 104 of an illumination source 102 to the source galvanometer mirror 202 (410a). During image acquisition, the source galvanometer mirror 202 is rotated between the first and second rotational angles to selectively illuminate the one or more object(s), or prevent their illumination, respectively, based on whether or not the CCD camera is in a global exposure phase.

In order to selectively illuminate the one or more object(s) when the CCD is in a global exposure phase, the source galvanometer mirror 202 is rotated between the first and second rotational angles in response to received signals that are indicative of the start and end of the CCD camera's global exposure phase, respectively.

In particular, in order to acquire a given image, a first trigger signal that is indicative of a start of a global exposure phase of the CCD camera is received (420) by a source galvanometer controller module. In response to the received first trigger signal, the source galvanometer mirror 202 is rotated to the first rotational angle (430a), thereby providing for illumination of the one or more object(s). The source galvanometer mirror 202 remains at the first rotational angle for the duration of the global exposure phase of the CCD camera (e.g., the global exposure time), until a second trigger signal, indicative of an end of the global exposure phase is received (440) by the source galvanometer controller module. In response to the second trigger signal, the source galvanometer mirror is rotated to the second rotational angle (450a), thereby directing illumination away from the one or more object(s), such that they are not illuminated.

A similar approach can be used to synchronize illumination of one or more object(s) with a global exposure phase of a CCD camera via the illumination control provided by the laser shutter 204.

Figure 4B:
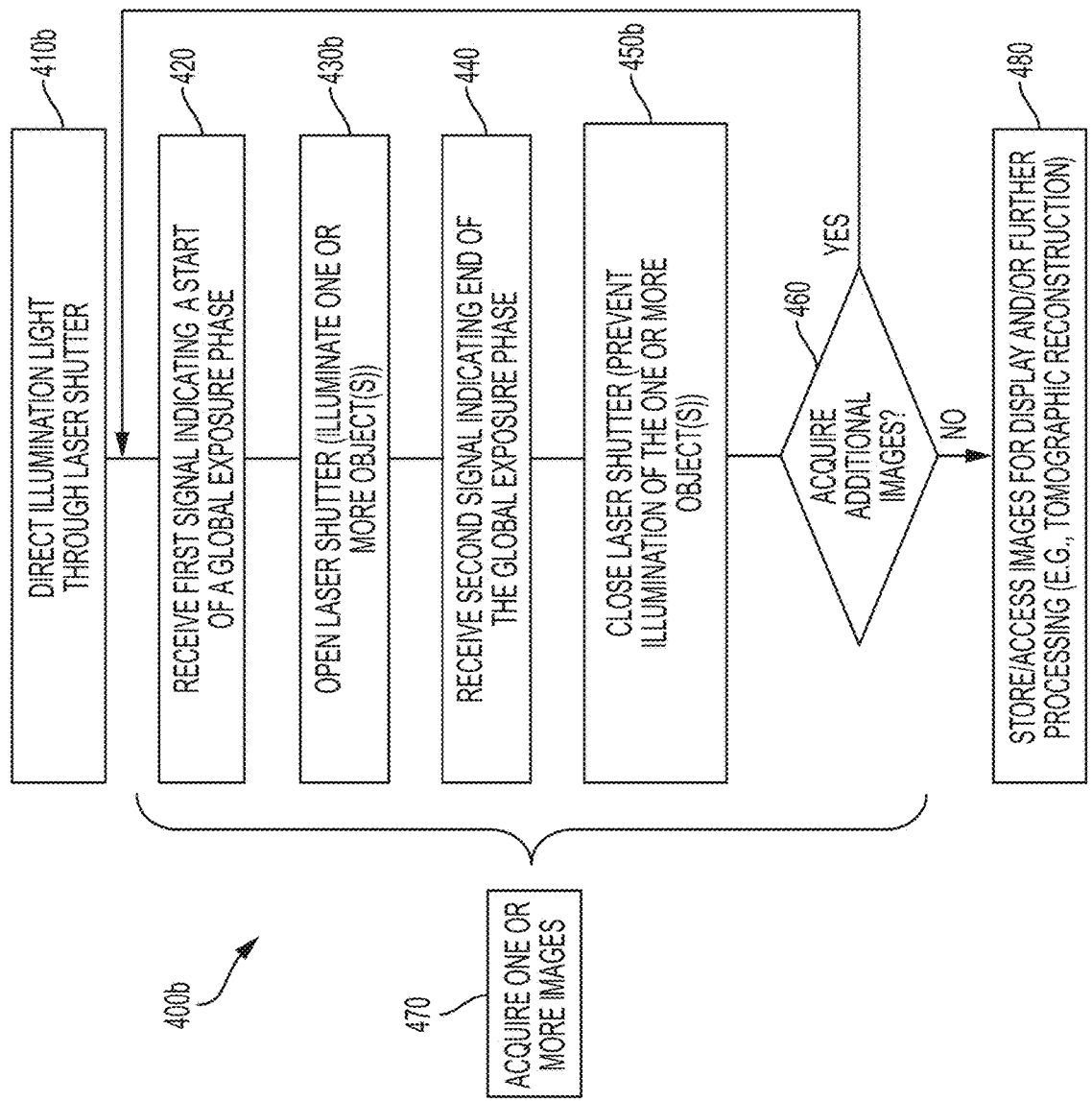
FIG. 4B is a block flow diagram of a process for using a laser shutter to synchronize illumination the image acquisition sequence of a CCD camera, according to an illustrative embodiment.

FIG. 4B shows an example process 400b for using the illumination control provided by the laser shutter 204 as described above to synchronize illumination of one or more object(s) with a global exposure phase of a CCD camera during image acquisition. As described above with respect to FIG. 2, the beam of illumination light is directed from an output 104 of an illumination source 102 through the laser shutter 204 (410b). During image acquisition, the laser shutter is opened and closed to selectively allow for, or prevent illumination of the one or more object(s), based on whether or not the CCD camera is in a global exposure phase.

In order to selectively illuminate the one or more object(s) when the CCD is in a global exposure phase, the laser shutter 204 is automatically opened and closed in response to received signals that are indicative of the start and end of the CCD camera's global exposure phase, respectively.

In particular, in order to acquire a given image, a first trigger signal that is indicative of a start of a global exposure phase of the CCD camera is received (420) by a laser shutter controller module. In response to the received first trigger signal, the laser shutter is opened, such that the beam of illumination light is allowed to pass through the laser shutter and illuminate the one or more object(s). The laser shutter 204 remains open for the duration of the global exposure phase of the CCD camera (e.g., the global exposure time), until a second trigger signal, indicative of an end of the global exposure phase is received (440) by the laser shutter controller module. In response to the second trigger signal, the laser shutter 204 is closed (450a), thereby blocking the beam of illumination light and preventing illumination of the one or more object(s).

In this manner, processes 400a and 400b can be used to acquire one or more images (470) of the one or more objects, performing steps 420, 430a and/or 430b, 440, and 450a and/or 450b for each acquired image. The steps are repeated as long as additional images are required (460), for example, for each excitation location or set of excitation locations of a scan performed by the galvanometer optical scanner 106. Once desired images are acquired, they may be stored and/or processed further, for example via tomographic reconstruction algorithms to create one or more tomographic images of the one or more object(s) (480).

Figure 3:
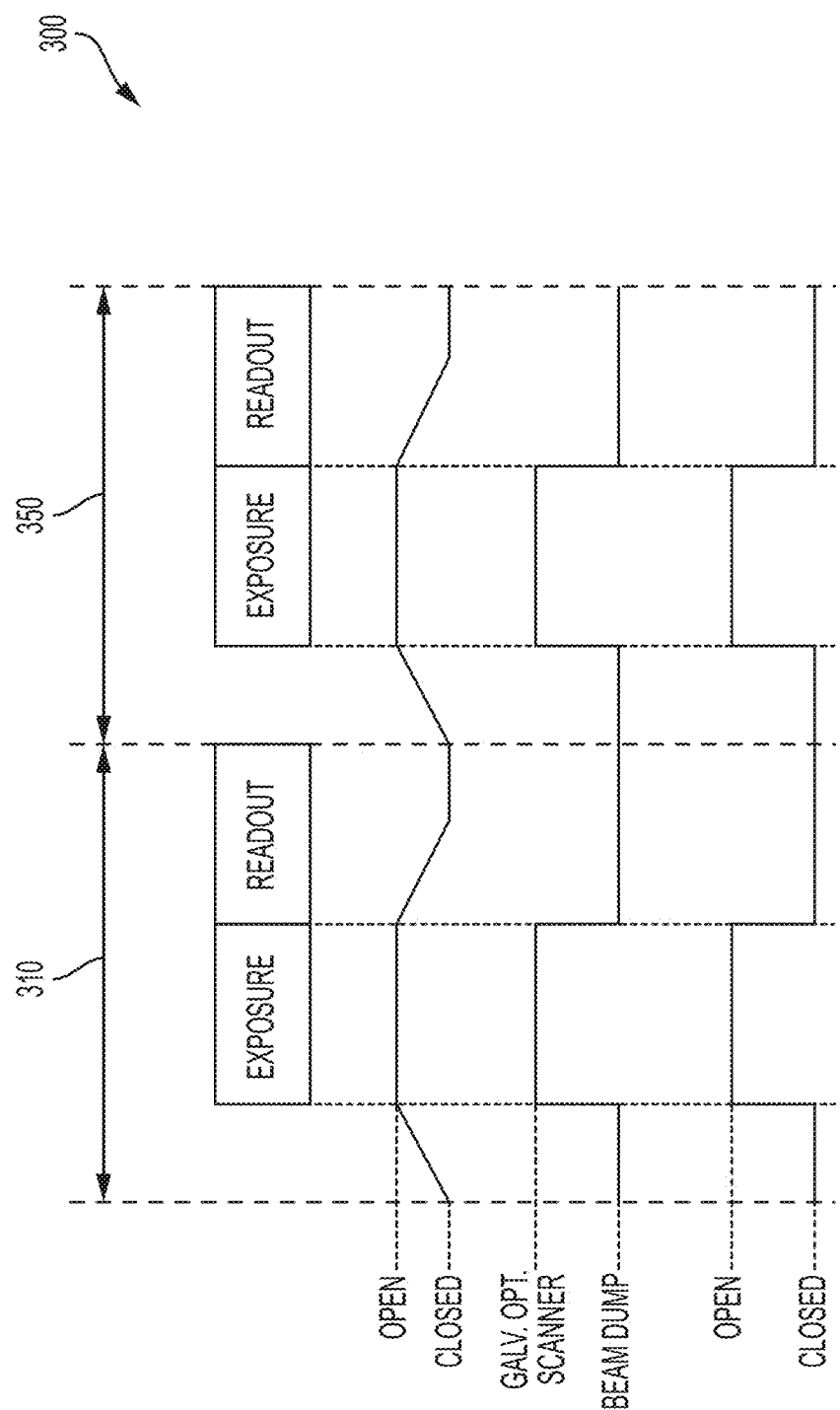
FIG. 3 is a schematic showing an timing diagram for synchronizing illumination with the image acquisition sequence of a CCD camera, according to an illustrative embodiment.

FIG. 3 shows an example timing diagram 300 for synchronizing the source galvanometer mirror 202 and laser shutter 204 with a global exposure phase of the CCD camera. The timing diagram 300 shows the phases of the image acquisition sequence for the CCD camera, positioning of the CCD shutter, positioning of a source galvanometer mirror, and positioning of a laser shutter during times corresponding to the acquisition of a first image 310 and a second image 350. As shown in FIG. 3, once acquisition of a first image is initiated, the CCD shutter opens, and the global exposure phase of the image acquisition sequence is reached, wherein the CCD sensor array is full exposed. The CCD shutter remains open for the duration of the global exposure phase, after which the read-out phase begins and the CCD shutter closes. Before image acquisition is initiated, the source galvanometer mirror 202 is rotated to the second rotational angle, directing the beam of illumination light away from the object(s) to be image and to, for example, a beam dump.

In some embodiments, the source galvanometer mirror does not rotate to the first rotational angle to direct the beam of illumination light to the object(s) to be imaged until the CCD shutter is completely open and the global exposure phase is reached. As shown in FIG. 3, once the CCD shutter is completely open, the source galvanometer rotates to the first rotational angle. The example timing diagram 300 relates to the optical tomographic imaging system 200 of FIG. 2, and indicates that when the source galvanometer mirror is rotated to the first rotational angle, it directs the beam of illumination light to a galvanometer optical scanner 106, which in turn directs the beam of illumination light to a location within a scan region 116. The source galvanometer mirror 202 remains rotated to the first rotational angle throughout the global exposure phase. Once the global exposure phase ends, and the CCD shutter begins to close, the source galvanometer mirror is rotated back to the second rotational angle, and directs the beam of illumination light to the beam dump 216. The source galvanometer mirror remains rotated to the second rotational angle until the CCD shutter completely opens a second time, and a second global exposure phase used to acquire a second image begins.

Similarly, in some embodiments, the laser shutter begins 204 the image acquisition sequence closed, opening once the CCD shutter is completely open and the global exposure phase begins. The laser shutter 204 remains open throughout the global exposure phase, and closes once the CCD shutter begins to close. The laser shutter 204 remains closed until the CCD shutter completely opens a second time, and a second global exposure phase used to acquire a second image begins.

Accordingly, by virtue of the illumination control provided by the source galvanometer mirror 202 and/or the laser shutter 204, during image acquisition the object(s) to be imaged are illuminated during the global exposure phase of the CCD camera, and prevented from being illuminated at other times, such as when the CCD shutter is in the process of opening and/or during read-out.

Notably, as discussed above and illustrated in FIG. 3, the source galvanometer and the laser shutter can switch between states that allow (e.g., rotation of the source galvanometer mirror to the first rotational angle; e.g., opening of the laser shutter) and prevent (e.g., rotation of the source galvanometer mirror to the second rotational angle; e.g., closing of the laser shutter) illumination of the object(s) far more rapidly than the CCD shutter can open and close. For example, while the CCD shutter can take approximately 40 ms to open and close, the source galvanometer mirror takes only a few hundred is to rotate from the first to second rotational angle and vice versa and the laser shutter can open and close in approximately 1.5 ms.

In the timing diagram 300 of FIG. 3, when a given image is acquired the read-out phase is shown to immediately follow the global exposure phase, and the CCD shutter is shown as closing during the read-out phase. Other timing configurations for the global exposure and read-out phases and CCD shutter timing are also possible, and the synchronized illumination approaches described herein can readily be used with these different configurations. For example, in some embodiments, the read-out phase may begin once the CCD shutter is completely closed, such that the period of time during which the CCD shutter is closing does not overlap with the read-out phase. As with the example described above with respect to FIG. 3, the source galvanometer and/or laser shutter can be used to control illumination of the one or more object(s) such that, when a given image is acquired, the object(s) are illuminated during the global exposure phase and are prevented from being illuminated when the CCD shutter is opening and closing, and during the read-out phase.

B.v Control Signals

Various approaches and control signals can be used to synchronize the rotation of the source galvanometer mirror and/or laser shutter in order to begin illumination of the one or more object(s) just as the global exposure phase begins, and prevent illumination as the global exposure phase ends.

Figure 2B:
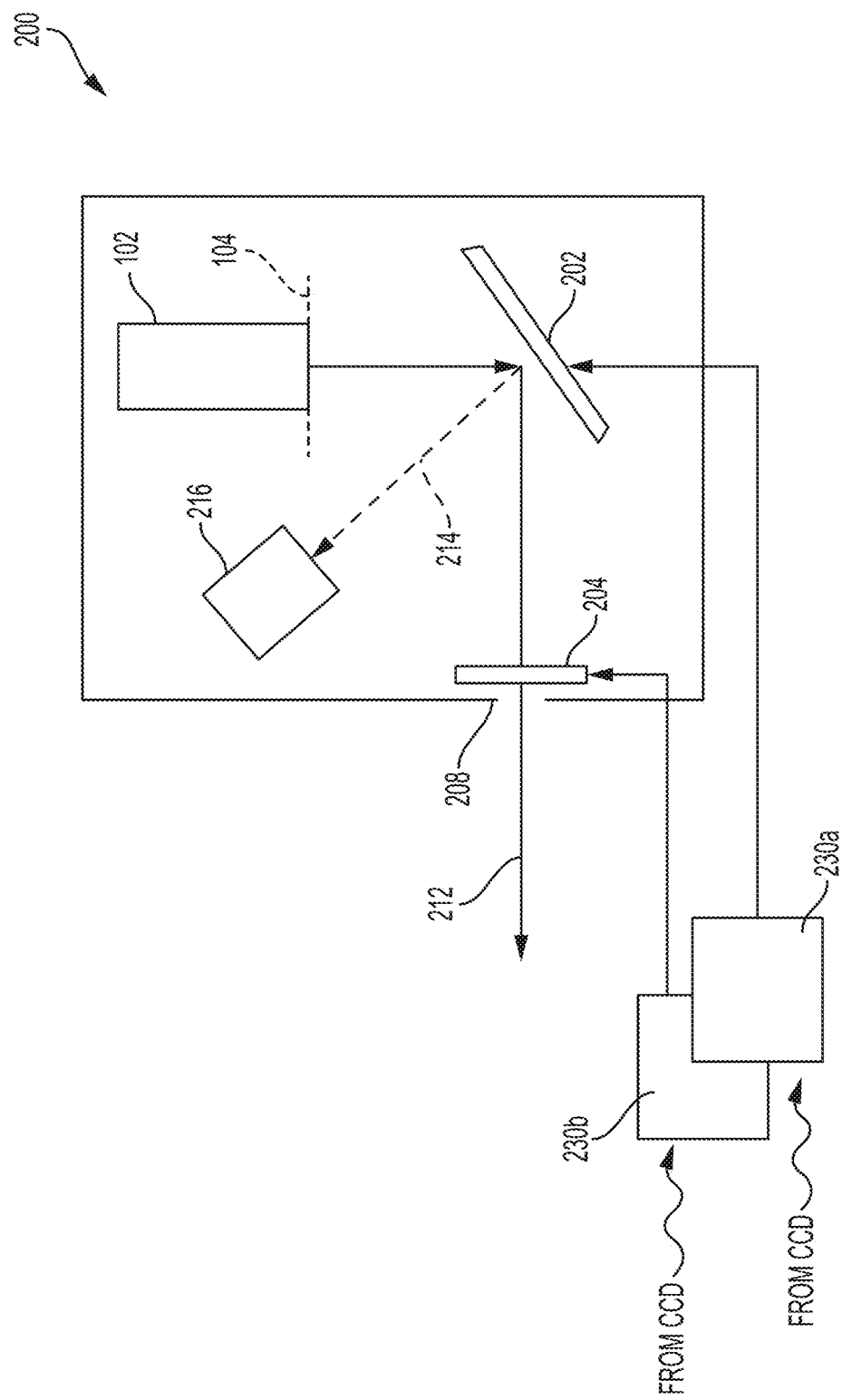
FIG. 2B is a schematic showing a portion of a system for synchronizing illumination with the image acquisition sequence of a CCD camera, according to an illustrative embodiment.

In some embodiments, as shown in FIG. 2B, the systems and methods described herein utilize a source galvanometer controller module 230a to automatically adjust the rotation of the source galvanometer mirror 202 between the first and second rotational angles. The source galvanometer controller module 230a automatically adjusts the source galvanometer mirror by providing a rotational signal (e.g., an electronic signal; e.g., a time-varying voltage; e.g., a time-varying current) to the source galvanometer mirror 202. By varying a value (e.g., a voltage amplitude; e.g., a current amplitude) of the rotational signal, the rotational angle of the source galvanometer mirror 202 can be varied, such that when the rotational signal has a first rotational signal value the source galvanometer mirror 202 is rotated to the first rotational angle and when the rotational signal has a second rotational signal value the source galvanometer mirror is rotated to the second rotational angle 202, In some embodiments, in accordance with the example process 400a shown in FIG. 4A, at step 420 the source galvanometer controller module 230a receives the first trigger signal indicative of the start of the global exposure phase of the CCD camera 220. In response to receipt of the first trigger signal, at step 430a the source galvanometer controller module 230a adjusts the value of the rotational signal to the first rotational signal value, thereby rotating the source galvanometer mirror to the first rotational angle. At step 440, the source galvanometer controller module 230a receives the second trigger signal that indicates the end of the global exposure phase. In response to receipt of the second trigger signal, at step 450a the source galvanometer controller module 230a adjusts the value of the rotational signal to the second rotational signal value, thereby rotating the source galvanometer mirror to the second rotational angle.

Similarly, a laser shutter controller module 230b may be used to automatically open and close the laser shutter 204. The laser shutter controller module 230a automatically opens and closes the laser shutter 204 by providing a laser shutter signal (e.g., an electronic signal; e.g., a time-varying voltage; e.g., a time-varying current) to the laser shutter 204. By varying a value (e.g., a voltage amplitude; e.g., a current amplitude) of the laser shutter signal, the laser shutter 204 can be automatically open and closed. For example, when the laser shutter signal has a first laser shutter signal value the laser shutter 204 is open and when the laser shutter signal has a second laser shutter signal value the laser shutter 204 is closed.

In some embodiments, in accordance with the example process 400b shown in FIG. 4B, at step 420 the laser shutter controller module 230b receives the first trigger signal indicative of the start of the global exposure phase of the CCD camera 220. In response to receipt of the first trigger signal, at step 430b the laser shutter controller module 230b adjusts the value of the laser shutter signal to the first laser shutter signal value, thereby opening the laser shutter 204. At step 440, the laser shutter controller module 230b receives the second trigger signal that indicates the end of the global exposure phase. In response to receipt of the second trigger signal, at step 450b the laser shutter controller module 230b adjusts the value of the laser shutter signal to the second laser shutter signal value, thereby closing the laser shutter.

The source galvanometer controller module 230a and the laser shutter controller module 230b may be implemented in a variety of fashions. In particular, in some embodiments, the source galvanometer controller module 230a and/or the laser shutter controller module 230b is/are implemented via microcontroller(s). In some embodiments, the source galvanometer controller module 230a and/or the laser shutter controller module 230b is/are implemented as dedicated electronic circuit(s). In some embodiments, for example wherein both the source galvanometer mirror 202 and the laser shutter 204 are used in combination, the source galvanometer controller module 230a and the laser shutter controller module 230b are implemented using a single microcontroller or a single electronic circuit.

In some embodiments, the first and second trigger signals are provided to the controller module(s) (e.g., the source galvanometer controller module 230a and/or the laser shutter controller module 230b) using a CCD output signal provided by the CCD camera. In some embodiments, the CCD output signal is an electronic signal, such as a voltage, which varies depending on which phase in the image acquisition sequence the CCD camera is in. Variation of the CCD output signal can thus be used as an indication of when the CCD camera is beginning and/or ending a global exposure phase, and, accordingly, to control the rotation of the source galvanometer mirror and/or state of the laser shutter. A variety of different CCD output signals may be provided by the CCD camera and used for controlling the rotation of the source galvanometer mirror and/or the state of the laser shutter, depending, for example, on the particular type of CCD camera used and other design considerations.

Figure 5:
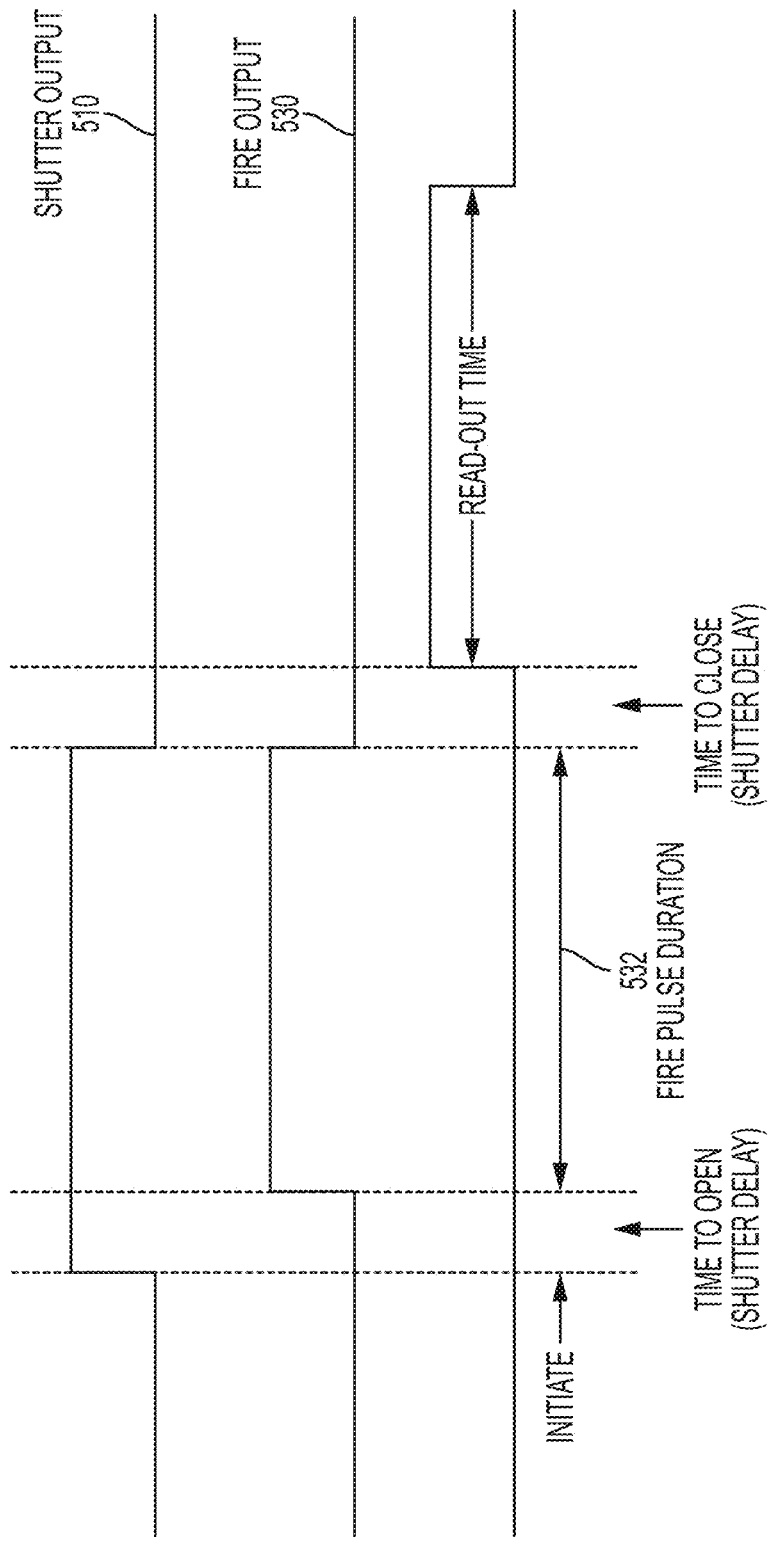
FIG. 5 is a schematic showing examples of CCD output signals that can be used for synchronizing illumination with the image acquisition sequence of a CCD camera, according to an illustrative embodiment.

FIG. 5 shows three example CCD output signals and their variation in time throughout the image acquisition sequence. A first example CCD output signal is a shutter output 510, which varies with the opening and closing of the CCD shutter. The shutter output 510 varies between a first level [e.g., a low voltage (e.g., below a low threshold such that it can be interpreted as a digital 0)] and a second level [e.g., a high voltage (e.g., above a high threshold such that it can be interpreted as a digital 1)]. As shown in FIG. 5, the shutter output 510 is initially at the first level, and rises to the second level once opening of the CCD shutter is initiated. The shutter output stays at the second level while the CCD shutter opens, and throughout the period of time when the CCD shutter is completely open and the CCD sensor array is fully exposed. The shutter output falls back to the first level once the closing of the CCD shutter begins, at the end of the global exposure phase, and remains there until the opening of the CCD shutter is initiated again, e.g., to acquire a next image.

A second example signal is referred to as a fire output 530. As with the shutter output 510, the fire output 530 varies between a first level [e.g., a low voltage (e.g., below a low threshold such that it can be interpreted as a digital 0)] and a second level [e.g., a high voltage (e.g., above a high threshold such that it can be interpreted as a digital 1)]. The fire output 530 is initially at the first level when image acquisition begins, and rises to the second level once the CCD shutter is completely open and falls back to the first level once the CCD shutter begins to close. The fire output 530 remains at the first level until the CCD shutter opens completely again, e.g., during a global exposure phase of the image acquisition sequence for acquiring a next image. Accordingly, the period of time when the fire output 530 is at the second level corresponds to the global exposure phase, and the duration of time when the fire output 530 is at the second level—the fire pulse duration 532 corresponds to the global exposure time.

Depending on the manner in which the various CCD output signals vary with the global exposure phase of the CCD camera, various approaches may be used to automatically control rotation of the source galvanometer mirror and/or opening and closing of the laser shutter.

In particular, in some embodiments, when variations in the CCD output signal occur at substantially the same time (e.g., at the same time) as when the CCD camera begins and ends its global exposure phase, appropriately scaled versions of the CCD output signal can be used as the rotational signal and/or the laser shutter signal. For example, if the CCD output signal received by the source galvanometer controller module is the fire output 530, the source galvanometer controller module may provide the rotational signal as a scaled version of the fire output 530 wherein the fire output is scaled such that the first level of the fire output 530 is scaled to be the same as the first rotational signal value and the second level of the fire output 530 is scaled to be the same as the second rotational signal value. Similarly, the laser shutter controller module may provide the laser shutter signal as a scaled version of the fire output 530 wherein the fire output is scaled such that the first level of the fire output 530 is scaled to be the same as the first laser shutter signal value and the second level of the fire output 530 is scaled to be the same as the second laser shutter signal value. In these cases, no delays or complex processing is required, and the source galvanometer controller module and/or laser shutter controller module can be implemented using minimal dedicated electronic circuitry (e.g., solely passive electronic components), though more complex electronics, such as a microcontroller can still be used. In terms of the processes 400a and 400b described above with respect to FIG. 4A and FIG. 4B, the first trigger signal corresponds to a transition of the fire output 530 from the first to the second level and the second trigger signal corresponds to a transition of the fire output 530 from the second level to the first level.

In some embodiments, variations in the CCD output signal occur at slightly different times than the beginning and/or end of the global exposure phase of the CCD camera. For example, the shutter output 510 shown in FIG. 5 transitions from a first level to a second level as soon as the CCD shutter begins to open, before the beginning of the global exposure phase. Since the global exposure phase begins a known time—the CCD shutter delay time after the transition of the shutter output 510 from the first level to the second level, this variation in the shutter output 510 can be used to indicate the beginning of the global exposure phase, but the delay between this transition of the shutter output 510 and the start of the global exposure phase must be accounted for by the source galvanometer controller module and/or the laser shutter controller module. For example, the source galvanometer controller module may receive the shutter output 510 and, after a time period corresponding to the CCD shutter delay, adjust the value of the rotational signal from the first rotational signal value to the second rotational signal value. Similarly, the laser shutter controller module may receive the shutter output 510 and, after a time period corresponding to the CCD shutter delay, adjust the value of the laser shutter signal from the first laser shutter signal value to the second laser shutter signal value. In terms of the processes 400a and 400b described above with respect to FIG. 4A and FIG. 4B, the first trigger signal corresponds to a transition of the shutter output 510 from the first to the second level and the second trigger signal corresponds to a transition of the shutter output 510 from the second level to the first level.

In some embodiments, the image acquisition process also includes providing an image acquisition signal to the CCD camera in order to initiate the acquisition of the one or more images. That is, in order to acquire an image, the image acquisition signal is sent to the CCD camera, causing the CCD camera to begin its image acquisition sequence (e.g., initializing its detector pixels; e.g., opening the CCD shutter). In some embodiments, the image acquisition signal comprises a nominal exposure time that sets the duration of the global exposure phase used to acquire the given image. The nominal exposure time corresponds to the actual input setting of the CCD camera, and its definition may vary depending on the particular CCD camera used (e.g., model and manufacturer). For a given CCD camera, the nominal exposure time has a fixed functional relationship to the global exposure time and, accordingly, a nominal exposure time that corresponds to a specific desired global exposure time can be determined and provided to the CCD camera to acquire an image using the specific, desired global exposure time.

For example, in some embodiments, the nominal exposure time for a first specific CCD camera is defined as the time from when the CCD shutter begins to open to the time when the CCD shutter begins to close. Accordingly, for this first specific CCD camera, the nominal exposure time corresponds to the global exposure time plus the CCD shutter delay. In another example, for a second specific CCD camera, the nominal exposure time may be defined as the time from when the CCD shutter is completely open to the time when the CCD shutter begins to close. Accordingly, for this second specific CCD camera, the nominal exposure time is the same as the global exposure time. Accordingly, for a given specific CCD camera, a nominal exposure time that corresponds to a specific desired global exposure time can readily be determined and provided to the CCD camera via the image acquisition signal. The nominal exposure time provided to the CCD camera can be varied from image to image, such that different images can be acquired using different length global exposure times. This approach is relevant for, for example, HDR imaging applications as described below in greater detail.

B.vi Image Acquisition without a CCD Shutter

In some embodiments, the approaches for synchronizing illumination with the imaging sequence of the CCD camera allow for images to be acquired without the use of a CCD shutter (e.g., the CCD shutter may be removed, or held completely open throughout the operation of the CCD). As described above, a CCD shutter can be used to eliminate or reduce the differences in the local exposure times of the detector pixels that result from the column-wise or row-wise fashion in which CCD read-out proceeds. The CCD shutter thereby relaxes the minimal exposure time that can be used to acquire images without introducing severe artifacts, since the CCD shutter delay is typically shorter than the CCD read-time.

In some embodiments, because the synchronized illumination approaches described herein prevent light from reaching the CCD sensor array during read-out, the CCD shutter is rendered redundant. In particular, in some embodiments, the CCD shutter can be removed, or held completely open throughout the operation of the CCD camera. In this case, the global exposure phase of the CCD camera is the same as its global integration phase, which begins once its detector pixels are initialized and begin their local integration phases, and ends once read-out starts. Accordingly, any of the approaches described herein can be used to provide illumination to the one or more object(s) to be imaged once the global integration phase begins, and prevent illumination of the one or more object(s) during the read-out phase of the CCD camera. In some embodiments, this approach allows for more rapid imaging since there is no need to wait for the CCD shutter to open completely before illuminating the one or more objects and/or close completely before preventing illumination of the one or more objects. That is, there is no delay between the global exposure phase and read-out phase.

C. Imaging Applications

The synchronized imaging approaches described herein are applicable to a variety of applications in which rapid, high-sensitivity image acquisition is desired. Such applications include, but are not limited to the high dynamic range (HDR) and optical tomographic imaging applications described below

C.i HDR Imaging

In some embodiments, the approaches described herein facilitate high-dynamic range (HDR) imaging. HDR imaging involves acquiring two images, one immediately after the other, such that both images represent substantially the same spatial variation in image forming light detected by the sensor array. The two images form an HDR image set. A first image of the HDR image set is a short exposure image and a second image of the HDR image set is a long exposure image. The short exposure image is acquired using a short global exposure time. In some embodiments, the short global exposure time is sufficiently short such that the short exposure image does not comprise any saturated image pixels. The long exposure image is acquired using a global exposure time that is longer than the short global exposure time, and the long exposure image may comprise image pixels that are saturated.

HDR imaging is advantageous since an HDR image set offers improved dynamic range over standard single acquisition images. However, since HDR imaging effectively doubles the number of acquired images, it can be more time consuming. Accordingly, the systems and methods for rapid image acquisition described herein offer the opportunity to take advantage of the high dynamic range offered by HDR image sets, while maintaining reasonable image acquisition times.

In some embodiments, HDR imaging can be used in optical tomographic imaging approaches, wherein HDR image sets are acquired as the one or more object(s) are illuminated at a plurality of illumination locations by the beam of illumination light such that for each illumination location or set of one or more illumination locations, a corresponding HDR image set is acquired.

The ability to take advantage of the high dynamic range offered by HDR imaging is particularly advantageous for fluorescence tomographic imaging. As described above, fluorescence tomographic imaging involves illuminating one or more object(s) to be imaged at a plurality of illumination locations. In some embodiments, a plurality of emission (e.g., fluorescence) images are acquired by detecting fluorescent light emitted from the one or more objects as a result of illuminating the one or more objects at the illumination locations. Excitation light images corresponding to detected excitation light transmitted through (e.g., as in a trans-illumination geometry) or reflected by the one or more objects following illumination at the plurality of illumination locations may also be acquired.

Due to the scattering or diffusive nature of light transport in biological tissue, the range of path lengths along which excitation and emission photons propagate in the object(s) to be imaged can vary over a wide range of lengths—from a few millimeters to a few of centimeters. Accordingly, the intensity range of excitation and fluorescence signals detectable on the animal can be wide. Improving the dynamic range of detection and imaging of the excitation and fluorescence signals increases the number of data points that can be used in an acquired image to represent the resultant wide intensity fluctuations of detected light. This, in turn, provides for a more accurate representation of the detected light, and improves the tomographic reconstructions that use such acquired images. Accordingly, in recent years, HDR imaging has become popular in CMOS-based sensors or cameras. Performing HDR imaging with a CCD camera, however, often results in blooming artifacts which degrade the quality of HDR images acquired with a CCD camera.

Dynamic range of an imaging detector is corresponds to the ratio of the highest detectable signal level (saturation level) and the minimum detectable signal level (floor level) within a single acquired image. Typically this ratio is converted to and represented as a number of bits by taking a base 2 logarithm (log 2) of the raw signal (e.g., a dynamic range ratio of 16000 is equivalent to 13.97=log 2(16000) bits). In a CCD, highest and minimum detectable signal levels are determined by a number of factors. The saturation level is determined by the well capacity, output node capacity, and upper limit of the A/D digitization of the CCD image sensor and read-out circuitry. The floor level is determined by the noise floor of the image sensor and lower limit of the A/D digitization of the CCD camera.

As described above, detector pixels accumulate charge in response to light illuminating their surface. Signal acquired by a particular detector pixel or group of detector pixels of a CCD camera can be quantified in terms of an amount of accumulated charge, in units of electrons (e−). Signal acquired by a particular detector pixel can also be represented in terms of digital units (DN), which correspond to the digital signal obtained by reading-out accumulated charge and performing A/D conversion and digitization of the accumulated charge. The conversion factor between units of electrons and digital units (DN) depends on the CCD gain. The CCD gain can be changed based on the mode in which the CCD is operating. For example, a CCD camera can be operated in a high-gain mode or a low-gain mode.

Saturation in a CCD camera can occur when any one of (i) the full well capacity, (ii) the output node capacity, or (iii) A/D digitization upper limit of the CCD camera is exceeded. The full well capacity of a CCD camera may refer to the full well capacity of its detector pixels—that is, the total capacity of an individual physical detector pixel of the CCD camera for accumulating charge (e.g., each detector pixel of the CCD having the same full well capacity). Full well capacity of a CCD camera is depends in part on the size of its detector pixels. For example, a typical full well capacity of a CCD camera is 100K e−. Saturation occurs when the total accumulated charge exceeds the full well capacity of the detector pixels of the CCD camera.

In some embodiments, on-chip binning can be used with a CCD camera to increase the full well capacity of the CCD camera. On-chip binning in CCDs combines detector pixels into larger binned pixels, such that each image pixel of an acquired image corresponds, not to a single detector pixel, but instead a group of binned detector pixels (e.g., a 2 by 2 array of adjacent detector pixels; e.g., a 4 by 4 array of adjacent detector pixels). Groups of binned detector pixels provide for greater full well capacity (e.g., corresponding to the product of the number of binned detector pixels and the full well capacity of an individual detector pixel). Accordingly, on-chip binning increases full well capacity, and allows greater accumulation of charge before saturation, by sacrificing image spatial resolution. For example, if a 2 by 2 binning is used on a 2K by 2K pixel CCD with a rated 100K e– full well capacity, the acquired image will be 1K-by-1K in size with a total full well capacity of 400K e–.

The output node capacity of a CCD camera also influences the saturation level. Output node capacity may refer to the total capacity of the off-chip storage or electronic nodes that are used for reading-out the accumulated charge from the detector pixels of the sensor array. In some embodiments, the output node has higher capacity than the full well capacity of the CCD when no on-chip binning is used (e.g., the un-binned full well capacity). At high on-chip binning levels (e.g., 4 by 4 binning), the output node capacity can be lower than the full well capacity. As with the full well capacity, if the amount of charge accumulated in an acquired image exceeds the output node capacity, saturation occurs.

Due to the serial nature of read-out in CCDs, saturation that occurs as a result of accumulated charge exceeding either the full well capacity or the output node capacity will produce blooming artifacts, which often take the form of vertical streaks in an acquired image. The potential for blooming artifacts to occur as a result of saturation is a significant difference between CMOS imagers and CCD cameras. As a result, performing HDR imaging in CCDs is non-trivial, and more challenging than with CMOS images since blooming artifacts must be avoided in the long exposure images of HDR image sets.

Saturation can also occur if the charge accumulated in an acquired image surpasses the A/D digitization upper limit of the CCD camera. The upper and lower limits of A/D digitization are determined based on the gain setting of the CCD camera and the total digitization bits allowed by the CCD camera. The gain setting of the CCD camera may be represented as a number of electrons per digital unit (e.g., e–/digital units; e.g., e–/DN). The total digitization bits allowed by a particular CCD camera varies from camera to camera. For example, various CCDs, such as 14-bit, 16-bit, and 32-bit CCD cameras may be used.

For example, in a 16-bit camera, the non-zero digital pixel values of an acquired image cannot fall outside the range of 1 to 65535 ($2^{16}$). Depending on the amount of charge accumulated by various detector pixels, and the gain setting of the CCD camera, an amount charge accumulated by certain detector pixels may correspond to a digitized signal level outside this range. Such pixels are thus saturated. For example, for a gain setting of 2 e–/DN, then any charge read-out above 131070 e– or below 2 e– would be outside the digitization range and hence outside the dynamic range. Notably, however, saturation that occurs in this manner—by exceeding the A/D digitization upper limit does produce blooming artifacts. Accordingly, if accumulated charge exceeds the A/D digitization upper limit, but is below the output node and full well capacity of the CCD camera, saturation will occur without causing blooming artifacts.

In some embodiments, the systems and methods described herein include using a HDR imaging approach wherein the CCD image acquisition settings, in particular, the on-chip binning, are adjusted such that saturation in the long exposure images of HDR image sets results from A/D digitization, and not from the amount of accumulated charge exceeding either of (i) the full well capacity of the CCD and (ii) the output node capacity of the CCD. That is, as described above, three saturation limits exist for a CCD camera. First, a full well capacity saturation limit of the CCD camera is determined by the full well capacity of the CCD camera as well as an on-chip binning setting. Second, an output node capacity saturation limit is determined by the output node capacity of the CCD camera. Third, an A/D digitization saturation limit is, as described above, determined by the A/D digitization upper limit for the CCD camera, as well as the gain setting. When CCD image acquisition settings are adjusted such that saturation results from exceeding the A/D digitization saturation limit, and neither the full well capacity saturation limit nor the output node capacity saturation limit, blooming artifacts are avoided and artifact free HDR imaging can be achieved with a CCD camera.

Figure 8:
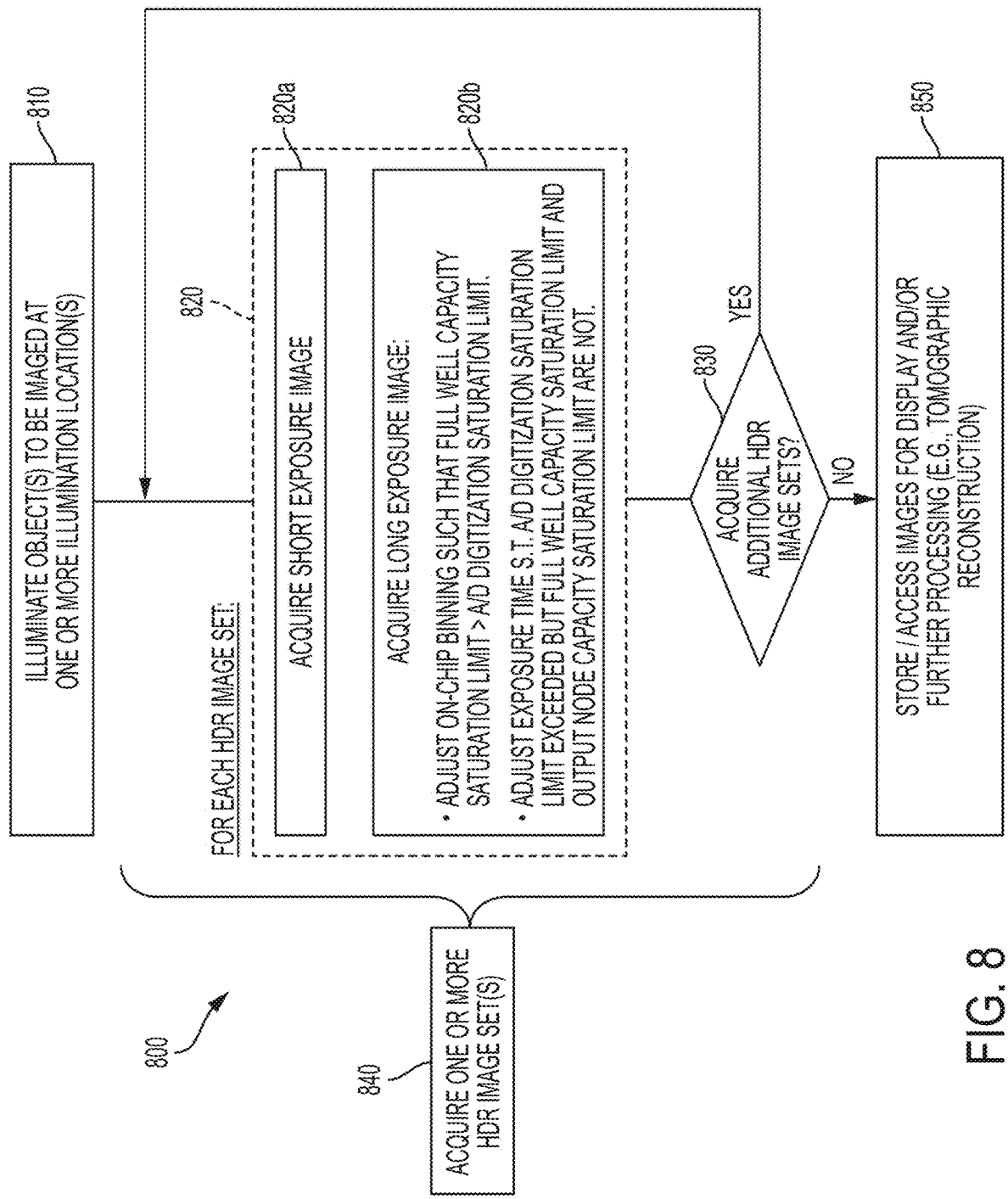
FIG. 8 is a block flow diagram of a process for avoiding blooming artifacts in HDR imaging with a CCD camera, according to an illustrative embodiment.

FIG. 8 shows an example process 800 for avoiding blooming artifacts when performing HDR imaging with a CCD camera. One or more object(s) to be imaged are illuminated at one or more illumination location(s) 810. One or more HDR image set(s) are acquired by detecting emitted light from the one or more object(s) as a result of illumination at the one or more illumination location(s). Such HDR image set(s) correspond to sets of emission image, such as fluorescent images. HDR image sets may also be acquired by detecting illumination light that is transmitted through or reflected by the one or more objects following illumination at the one or more illumination location(s). For example, in fluorescence optical tomography imaging applications, excitation light used to excite fluorescence from the one or more objects is often detected to acquire excitation images, in addition to excitation images that are acquired by detecting emitted fluorescent light. Each HDR image set is acquired 820 by acquiring a short exposure image 820*a* and a long exposure image 820*b*. As described above, the long exposure image is acquired by adjusting an on-chip binning for the CCD camera such that the full well capacity saturation limit based on the adjusted on-chip binning level exceeds the A/D digitization saturation limit 820*b*. In this manner, blooming artifacts in the long exposure image are avoided by selectively saturating the saturated image pixels by exposing the CCD detector pixels for long enough to exceed the A/D digitization saturation limit, but not the full well capacity saturation limit (e.g., and also not exceeding an output node capacity saturation limit of the CCD camera).

This approach for acquiring long and short exposure images to form an HDR image set can be repeated for as many HDR image sets as are required 830. One or more HDR image set(s) can be acquired 840 in this manner. Once HDR image sets are acquired, the HDR image sets can be stored and/or accessed for display and/or further processing, such as for use in creating 3D tomographic reconstructions 850.

C.ii Optical Tomographic Imaging

In some embodiments, the systems and methods described herein can be used to facilitate optical tomographic imaging of small animals. For example, the approaches for synchronizing illumination of one or more object(s) (e.g., subject(s); e.g., small animals) with a global exposure phase of a CCD camera can be used to increase the speed at which the multiple images that are used in tomographic reconstruction techniques to obtain tomographic images can be acquired. For example, in fluorescence optical tomography applications, the one or more object(s) are illuminated at a plurality of illumination locations, and for each illumination location, a corresponding emission image and, optionally, a corresponding excitation image can be acquired using the approaches described herein. In some embodiments, the systems and methods described herein are used in combination with the galvanometer optical scanning approach of U.S. application Ser. No. 15/654,442 and described above with respect to FIG. 1 and FIG. 2. In the galvanometer optical scanning approach, in some embodiments, emission and, optionally, excitation images can be acquired using the synchronized illumination approaches described herein for each excitation location in the scan region 116 to which the galvanometer optical scanner directs the beam of excitation light. In some embodiments, when a multiplexed approach, as described above and in detail in U.S. application Ser. No. 15/654,442, is used, emission and, optionally excitation images can be acquired using the synchronized illumination approaches described herein for each set of excitation locations to which the galvanometer optical scanner directs the beam of excitation light.

The rapid image acquisition capabilities provided by the systems and methods described herein are particularly relevant for imaging over a wide field of view, for example to image multiple small animals. Imaging over a wide field of view requires the use of large format CCD cameras that are capable of acquired images of the full field of view at adequate resolution. For example, in some embodiments, the field of view of the CCD camera is greater than or approximately equal to 100 mm (e.g., from 100 to 200 mm) along a first and/or second dimension. In some embodiments, large format CCD cameras used to image such large fields of view comprise at least 256 by 256 detector pixels, and have sensor arrays that measure greater than or approximately equal to ½ inch along a first and/or second dimension. In some embodiments, CCD cameras having 1000 by 1000 (1K by 1K) detector pixels are used. In some embodiments, CCD cameras having 2000 by 2000 (2K by 2K) detector pixels are used. In some embodiments, CCD cameras having sensor arrays measuring greater than or approximately equal to 1 inch along a first and/or second dimension.

For such large format CCD cameras, shutter delay and read-out times are significant, due to the large sensor array size and number of detector pixels it comprises. The ability to overcome limitations on minimal global exposure times imposed by CCD shutter delay and read-out times provided by the systems and methods described herein is thus significant. For example, in some embodiments, the approaches described herein allow each image of a tomographic scan to be acquired in a few tens of milliseconds In some embodiments, as shown in the Examples below, 100 images or more (e.g., 50 emission images and 50 excitation images) are acquired in a tomographic scan, at least some of which are acquired in a time less than or approximately equal to 200 ms (e.g., less than or approximately equal to 150 ms; e.g., less than or approximately equal to 120 ms).

Figure 9:
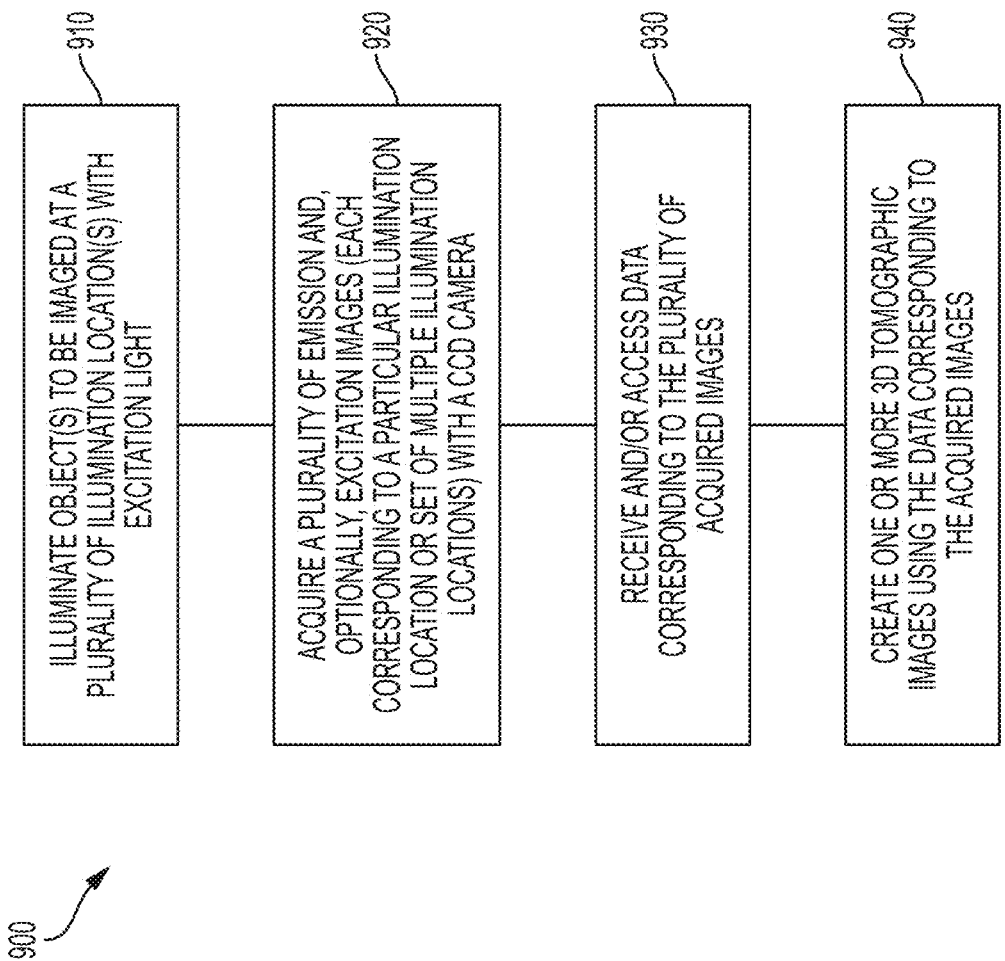
FIG. 9 is a block flow diagram of a process for 3D fluorescence tomographic imaging using synchronized illumination with a CCD camera, according to an illustrative embodiment.

FIG. 9 shows an example process 900 for performing fluorescence optical tomography with a CCD camera, using the synchronized illumination approaches described herein. One or more object(s) to be imaged are illuminated at a plurality of illumination locations with excitation light for exciting fluorescence (e.g., within, or at the surface of the one or more object(s)) 910. A plurality of emission images are acquired by detecting emitted fluorescent light from the one or more objects using the CCD camera and the synchronized illumination approaches described herein 920. As described above, each emission image corresponds to a particular illumination location or a particular set of multiple illumination locations (e.g., as in the multiplexed approach described above) and is obtained by detecting fluorescent light emitted from the one or more object(s) as a result of illumination at the corresponding particular illumination or set of illumination locations. In some embodiments, excitation images for each particular illumination location or set of illumination locations are also acquired by detecting excitation light that is transmitted through (e.g., as in a trans-illumination geometry) or reflected by (e.g., as in an epi-illumination geometry) the one or more objects. Data corresponding to the plurality of acquired images (e.g., emission and, optionally, excitation images) is received and/or accessed by a processor of a computing device 930, and used to create one or more 3D tomographic images of the one or more object(s) 940.

C.iii Other Imaging Applications

In some embodiments, the illumination synchronization approaches described herein can be used in a variety of other imaging applications, in general in any application where an illumination source of light can be synchronized with a CCD camera's global exposure phase to achieve fast CCD-based imaging. Such applications include, but are not limited to as microscopy, spectroscopy, and the like. The approaches described herein are of particular relevant to biological imaging applications, such as in-vivo imaging of small animals, where rapid image acquisition is important.

D. Examples

Examples 1, 2, and 3 are computational examples that provide example analysis of imaging speeds for fluorescence optical tomographic imaging of three mice using the optical systems that employ a galvanometer optical scanner to rapidly scan a beam of excitation light in order to illuminate a plurality of locations on the three mice. As discussed above, the galvanometer optical scanner based approach is described in detail in U.S. application Ser. No. 15/654,442. The Examples compute the total time required to obtain tomographic images of the three mice, including the time required to acquire fluorescence and excitation images used in creating the tomographic images via tomographic reconstruction. The computational time of the tomographic reconstruction process is excluded from the analysis. The computational analysis is performed using parameters of example (real) CCD and sCMOS cameras. Examples 1 and 2 compare tomographic imaging speeds for CCD and sCMOS cameras using global exposure times for the CCD camera that are determined by the above described CCD shutter delay and read-out time limits. Accordingly, these examples correspond to systems that do not implement the synchronized illumination approaches described herein. Example 3 compares tomographic imaging speeds for two CCD cameras using global exposure times that are below the above described shutter delay and read-time limits, and, accordingly are representative of systems utilizing the synchronized illumination approaches described herein.

Example 4 demonstrates the HDR imaging approach for avoiding blooming artifacts with a CCD camera, as described in section C.i above.

Example 1

Example 1 is a computational model that compares the times required to obtain a tomographic image of three mice using (i) an iKon-LR large format CCD camera and (ii) a Zyla 5.5 sCMOS camera. The computational analysis assumes that each mouse is scanned at 50 points at an object-lane resolution of approximately 300 microns ($\mu$m).

The CCD global exposure times are limited by the CCD shutter delay, which is 40 ms. Accordingly, a global exposure time of 400 ms is used for the CCD camera. The rate of the CCD read-out is 5 MHz. The computation assumes HDR imaging is required. For the sCMOS camera, global exposure times of 300 ms and 30 ms are used for the long and short duration HDR images, respectively.

Table 1 shows the results of the computational model. Table 1 shows the total time for obtaining tomographic images of the three mice to be approximately 194 s for the CCD camera and approximately 71 s for the sCMOS camera. This difference in imaging speed results from the long—approximately 400 ms—global exposure time used by the CCD camera, which is due to the shutter delay limit (e.g., the global exposure time of the CCD is 10 times the shutter delay time).

TABLE 1

COMPUTATIONAL MODEL RESULTS FOR EXAMPLE 1

| Description | Time | Units |
|---|---|---|
| CCD - iKon-LR | | |
| Load 3 mice | 20 | sec |
| Set Imaging Eqpt Motor Positions (Shelf, Lens, F/#, Em Filter), Turn on light | 5 | sec |
| Capture White Light Image, read-out included | 1.00 | sec |
| Calculate Scan Points - Previously Calibrated database | 3 | sec |
| ROI Selection (user dependent, doesn't count) | | |
| Set Imaging Eqpt Motor Positions for Em Imaging (Em Wheel, F/#), Laser On Em Images | 3 | sec |
| # points/mouse estimate | 50 | |
| Exposure time estimate per mouse | 0.133 | sec |
| Exposure time estimate per 3 mice (single image) | 0.40 | sec |
| Shutter Delay (Beginning and End) | 0.04 | sec |
| Readout delay per image . . . (Binning implication, CCD or CMOS) | 0.27 | |
| Auto Exposure Method? (How many exposure times required per point?) | 1.2 | x factor |
| Total Em Time | 42.6 | sec |
| Set Imaging Ept Motor Positions for Ex Imaging (Ex Wheel, F/#), Laser Pwr Ex images | 3 | sec |
| # points per moue estimate? | 50 | |
| Exposure time estimate per mouse | 0.133 | Sec |
| Exposure time estimate per 3 mice (single image) | 0.40 | Sec |
| Readout delay per image | 0.27 | Sec |
| Shutter Delay | 0.04 | Sec |
| Auto Exposure Method? (How many exposure times required per point?) | 1.2 | x factor |
| Total Ex Time | 42.6 | |
| HDR considerations | 85.3 | |
| Set Surface Scan Ept | 5 | Sec |
| Surface Scan (Spectrum used as reference) | 3 | Sec |
| Data Process (happening w Scan or after the fact) | 0 | |
| Output Image (no animal handling | 194 | sec |
| sCMOS - Zyla 5.5 | | |
| Load 3 mice | 20 | sec |
| Set Imaging Eqpt Motor Positions (Shelf, Lens, F/#, Em Filter), Turn on light | 5 | sec |
| Capture White Light Image, read-out included | 1.00 | sec |
| Calculate Scan Points - Previously Calibrated database | 3 | sec |
| ROI Selection (user dependent, doesn't count) | | |
| Set Imaging Eqpt Motor Positions for Em Imaging (Em Wheel, F/#), Laser On Em Images | 3 | sec |
| # points/mouse estimate | 50 | |
| Exposure time estimate per mouse | 0.110 | sec |
| Exposure time estimate per 3 mice (single image) | 0.33 | sec |
| Readout delay per image . . . (Binning implication, CCD or CMOS) | 0.03 | sec |
| Auto Exposure Method? (How many exposure times required per point?) | 1.2 | x factor |
| Total Em Time | 23.8 | sec |
| Set Imaging Ept Motor Positions for Ex Imaging (Ex Wheel, F/#), Laser Pwr Ex images | 3 | sec |
| # points per moue estimate? | 50 | |
| Exposure time estimate per mouse | 0.110 | sec |
| Exposure time estimate per 3 mice (single image) | 0.33 | |
| Readout delay per image | 0.03 | |
| Auto Exposure Method? (How many exposure times required per point?) | 1.2 | x factor |
| Total Ex Time | 23.8 | |
| Set Surface Scan Ept | 5 | sec |
| Surface Scan (Spectrum used as reference) | 3 | sec |
| Data Process (happening w Scan or after the fact) | 0 | |
| Output Image (no animal handling | 71 | sec |

Example 2

Example 2 is a computational model that compares the times required to obtain a tomographic image of three mice using (i) an SophiaB large format CCD camera and (ii) a Zyla 5.5 sCMOS camera. As in Example 1, the computational analysis assumes that each mouse is scanned at 50 points at an object-lane resolution of approximately 300 microns (μm). The SophiaB CCD is a CCD camera that offers relatively fast read-out (16 MHz in comparison with 5 MHz for the iKon-LR CCD camera of Example 1). Nevertheless, the SophiaB CCD camera still performs read-out non-simultaneously, and uses a CCD shutter. Accordingly, the CCD camera of Example 2 still uses a relatively lengthy global exposure time of 400 ms, which is ten times longer than its CCD shutter delay time (40 ms), as required by the CCD shutter delay limit. As with Example 1, the computation assumes HDR imaging is required. For the sCMOS camera, global exposure times of 300 ms and 30 ms are used for the long and short duration HDR images, respectively.

Table 2 shows the results of the computational model. Table 2 shows the total time for obtaining tomographic images of the three mice to be approximately 139 s for the CCD camera and approximately 71 s for the sCMOS camera. The example shows that even with a CCD camera that has a short read-out phase, the limitation on imaging speed that results from the long—approximately 400 ms—global exposure time used by the CCD camera, is significant, and imaging with the CCD camera takes approximately twice as long as with the sCMOS camera.

TABLE 2

COMPUTATIONAL MODEL RESULTS FOR EXAMPLE 2

| Description | Time | Units |
|---|---|---|
| CCD - Sophia B | | |
| Load 3 mice | 20 | sec |
| Set Imaging Eqpt Motor Positions (Shelf, Lens, F/#, Em Filter), Turn on light | 5 | sec |
| Capture White Light Image, read-out included | 1.00 | sec |
| Calculate Scan Points - Previously Calibrated database | 3 | sec |
| ROI Selection (user dependent, doesn't count) | | |
| Set Imaging Eqpt Motor Positions for Em Imaging (Em Wheel, F/#), Laser On Em Images | 3 | sec |
| # points/mouse estimate | 50 | |
| Exposure time estimate per mouse | 0.133 | sec |
| Exposure time estimate per 3 mice (single image) | 0.40 | sec |
| Shutter Delay (Beginning and End) | 0.04 | sec |
| Readout delay per image . . . (Binning implication, CCD or CMOS) | 0.05 | |
| Auto Exposure Method? (How many exposure times required per point?) | 1.2 | x factor |
| Total Em Time | 29.1 | Sec |
| Set Imaging Ept Motor Positions for Ex Imaging (Ex Wheel, F/#), Laser Pwr Ex images | 3 | sec |
| # points per moue estimate? | 50 | |
| Exposure time estimate per mouse | 0.133 | Sec |
| Exposure time estimate per 3 mice (single image) | 0.40 | Sec |
| Readout delay per image | 0.05 | Sec |
| Shutter Delay | 0.04 | Sec |
| Auto Exposure Method? (How many exposure times required per point?) | 1.2 | x factor |
| Total Ex Time | 29.1 | |
| HDR considerations | 58.2 | |

TABLE 2-continued

COMPUTATIONAL MODEL RESULTS FOR EXAMPLE 2

| Description | Time | Units |
|---|---|---|
| Set Surface Scan Ept | 5 | Sec |
| Surface Scan (Spectrum used as reference) | 3 | Sec |
| Data Process (happening w Scan or after the fact) | 0 | |
| Output Image (no animal handling | 139 | sec |
| sCMOS - Zyla 5.5 | | |
| Load 3 mice | 20 | sec |
| Set Imaging Eqpt Motor Positions (Shelf, Lens, F/#, Em Filter), Turn on light | 5 | sec |
| Capture White Light Image, read-out included | 1.00 | sec |
| Calculate Scan Points - Previously Calibrated database | 3 | sec |
| ROI Selection (user dependent, doesn't count) | | |
| Set Imaging Eqpt Motor Positions for Em Imaging (Em Wheel, F/#), Laser On Em Images | 3 | sec |
| # points/mouse estimate | 50 | |
| Exposure time estimate per mouse | 0.110 | sec |
| Exposure time estimate per 3 mice (single image) | 0.33 | sec |
| Readout delay per image . . . (Binning implication, CCD or CMOS) | 0.03 | sec |
| Auto Exposure Method? (How many exposure times required per point?) | 1.2 | x factor |
| Total Em Time | 23.8 | sec |
| Set Imaging Ept Motor Positions for Ex Imaging (Ex Wheel, F/#), Laser Pwr Ex images | 3 | sec |
| # points per moue estimate? | 50 | |
| Exposure time estimate per mouse | 0.110 | sec |
| Exposure time estimate per 3 mice (single image) | 0.33 | |
| Readout delay per image | 0.03 | |
| Auto Exposure Method? (How many exposure times required per point?) | 1.2 | x factor |
| Total Ex Time | 23.8 | |
| Set Surface Scan Ept | 5 | sec |
| Surface Scan (Spectrum used as reference) | 3 | sec |
| Data Process (happening w Scan or after the fact) | 0 | |
| Output Image (no animal handling | 71 | sec |

Example 3

Example 3 is a computational model that compares the times required to obtain a tomographic image of three mice using the two CCD cameras of Examples 1 and 2, but with global exposure times as low as 30 ms, as can be achieved using the synchronized illumination approaches described herein. The two CCD cameras are (i) the SophiaB large format CCD camera and (ii) the iKon-LR CCD camera. As in Examples 1 and 2, the computational analysis assumes that each mouse is scanned at 50 points at an object-lane resolution of approximately 300 microns (µm). The read-out rate for the SophiaB CCD is a is 16 MHz, as in Example 2, and the read-out rate of the iKon-LR CCD camera is 5 MHz, as in Example 1. As with Examples 1 and 2, the computation assumes HDR imaging is required. Accordingly, global exposure times of 300 ms and 30 ms are used for the long and short duration HDR images, respectively.

Table 3 shows the results of the computational model. Table 3 shows the total time for obtaining tomographic images of the three mice to be approximately 83 s for the SophiaB CCD camera and approximately 137 s for the iKon-LR CCD camera. The example shows that significant improvements in imaging speed can be obtained using the short global exposure times provided by the systems and methods described herein.

TABLE 3

COMPUTATIONAL MODEL RESULTS FOR EXAMPLE 3

| Description | Time | Units |
|---|---|---|
| Sophia B | | |
| Load 3 mice | 20 | sec |
| Set Imaging Eqpt Motor Positions (Shelf, Lens, F/#, Em Filter), Turn on light | 5 | sec |
| Capture White Light Image, read-out included | 1.00 | sec |
| Calculate Scan Points - Previously Calibrated database | 3 | sec |
| ROI Selection (user dependent, doesn't count) | | |
| Set Imaging Eqpt Motor Positions for Em Imaging (Em Wheel, F/#), Laser On Em Images | 3 | sec |
| # points/mouse estimate | 50 | |
| Exposure time estimate per mouse | 0.110 | sec |
| Exposure time estimate per 3 mice (single image) | 0.33 | sec |
| Shutter Delay (Beginning and End) | 0.04 | sec |
| Readout delay per image . . . (Binning implication, CCD or CMOS) | 0.05 | |
| Auto Exposure Method? (How many exposure times required per point?) | 1.2 | x factor |
| Total Em Time | 30.0 | Sec |
| Set Imaging Ept Motor Positions for Ex Imaging (Ex Wheel, F/#), Laser Pwr Ex images | 3 | sec |
| # points per moue estimate? | 50 | |
| Exposure time estimate per mouse | 0.110 | Sec |
| Exposure time estimate per 3 mice (single image) | 0.33 | Sec |
| Readout delay per image | 0.05 | Sec |
| Shutter Delay | 0.04 | Sec |
| Auto Exposure Method? (How many exposure times required per point?) | 1.2 | x factor |
| Total Ex Time | 30.0 | |
| HDR considerations | | |
| Set Surface Scan Ept | 5 | Sec |
| Surface Scan (Spectrum used as reference) | 3 | Sec |
| Data Process (happening w Scan or after the fact) | 0 | |
| Output Image (no animal handling | 83 | sec |
| iKon-LR | | |
| Load 3 mice | 20 | sec |
| Set Imaging Eqpt Motor Positions (Shelf, Lens, F/#, Em Filter), Turn on light | 5 | sec |
| Capture White Light Image, read-out included | 1.00 | sec |
| Calculate Scan Points - Previously Calibrated database | 3 | sec |
| ROI Selection (user dependent, doesn't count) | | |
| Set Imaging Eqpt Motor Positions for Em Imaging (Em Wheel, F/#), Laser On Em Images | 3 | sec |
| # points/mouse estimate | 50 | |
| Exposure time estimate per mouse | 0.110 | sec |
| Exposure time estimate per 3 mice (single image) | 0.33 | sec |
| Shutter Delay (Beginning and End) | 0.04 | |
| Readout delay per image . . . (Binning implication, CCD or CMOS) | 0.27 | sec |
| Auto Exposure Method? (How many exposure times required per point?) | 1.2 | x factor |
| Total Em Time | 57.1 | sec |
| Set Imaging Ept Motor Positions for Ex Imaging (Ex Wheel, F/#), Laser Pwr Ex images | 3 | sec |
| # points per moue estimate? | 50 | |
| Exposure time estimate per mouse | 0.110 | sec |
| Exposure time estimate per 3 mice (single image) | 0.33 | |
| Readout delay per image | 0.27 | |
| Shutter Delay | 0.04 | |
| Auto Exposure Method? (How many exposure times required per point?) | 1.2 | x factor |
| Total Ex Time | 57.1 | |
| HDR considerations | | |
| Set Surface Scan Ept | 5 | sec |
| Surface Scan (Spectrum used as reference) | 3 | sec |
| Data Process (happening w Scan or after the fact) | 0 | |
| Output Image (no animal handling | 137 | sec |

Example 4

Example 4 illustrates various CCD camera settings that can be adjusted to improve the dynamic range in HDR imaging and used in accordance with the HDR imaging approach described herein to avoid blooming artifacts in CCD HDR imaging. Example 4 also shows acquired HDR image sets that demonstrate the approach for avoiding blooming artifacts.

Table 4 shows specifications and dynamic ranges for an iKon-LR CCD camera for standard and HDR modes and a range of gain settings and binning levels. As shown in the table, the dynamic range improvement offered by HDR imaging is substantial when on-chip binning is used. In the table, the standard dynamic range is the A/D digitization saturation limit over the read noise (representing the noise floor) and the HDR dynamic range is the lower of (i) the output node capacity saturation limit or (ii) the full well capacity saturation limit over the read noise.

TABLE 4

DYNAMIC RANGE OF AN iKon-LR CCD UNDER STANDARD AND HDR IMAGING MODES

| Gain Setting | Bin | RN (DN) | Gain (e−/DN) | RN (e−) | Saturation Counts (DN) | Saturation e− | Standard Dynamic Range (bit) | HDR dynamic range (bit) |
|---|---|---|---|---|---|---|---|---|
| 1 | 1 | 3.56 | 3.8 | 13.53 | 39893 | 151593.4 | 13.45 | 13.45 |
| 1 | 8 | 3.54 | 3.8 | 13.45 | 64000 | 243200 | 14.14 | 14.86 |
| 2 | 1 | 6.19 | 1.9 | 11.76 | 62450 | 118655 | 13.30 | 13.52 |
| 2 | 8 | 6.03 | 1.9 | 11.46 | 61500 | 116850 | 13.32 | 15.09 |
| 3 | 1 | 12.21 | 0.9 | 10.99 | 59000 | 53100 | 12.24 | 13.62 |
| 3 | 8 | 11.98 | 0.9 | 10.79 | 56500 | 50850 | 12.20 | 15.18 |

Figure 10:
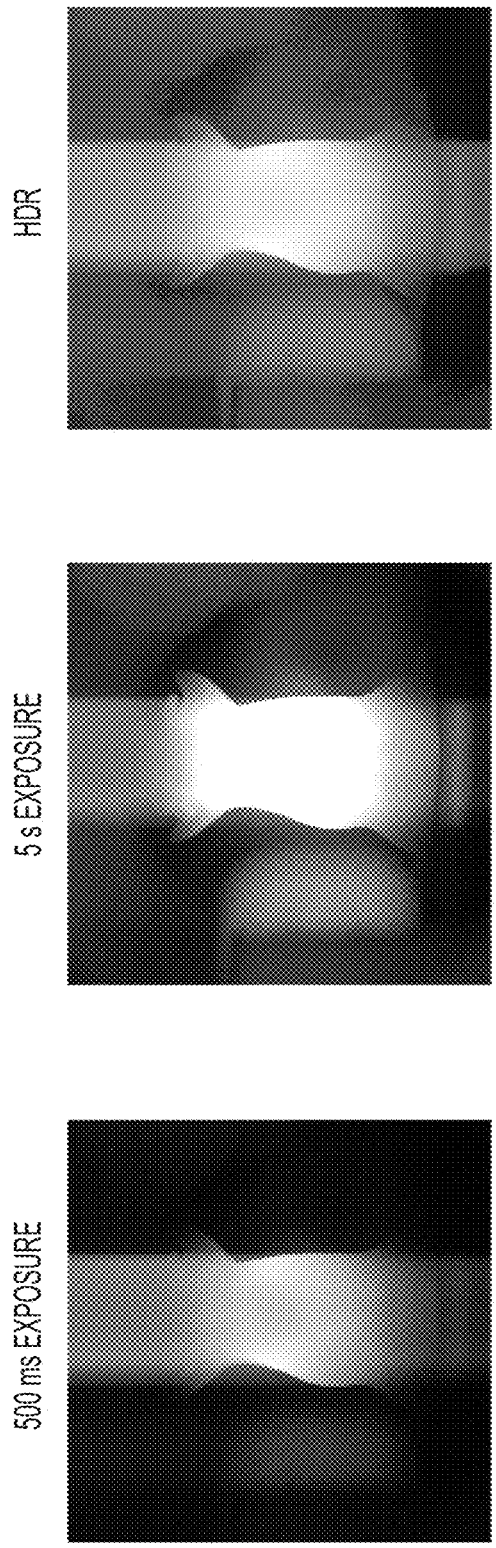
FIG. 10 is a set of images showing a short and long exposure image of a HDR image set and a HDR image, according to an illustrative embodiment.

FIG. 10 shows a short exposure image (500 ms exposure) and a long exposure image (5 s exposure) of a HDR image set, along with a displayed HDR image (HDR). The displayed HDR image represents a combination of the short and long exposure images. The long and short exposure images were acquired experimentally by detecting laser light (illumination light) transmitted through a tissue-mimicking phantom in a trans-illumination geometry. As shown, the HDR image captures both (i) the high-intensity signal distribution in the middle of the phantom and also (ii) the low-intensity signal distribution in the bottom and top portions of the phantom, and also the surrounding regions. 3 shows the results of the computational model. The high-intensity signal variations are captured in the low exposure image of the HDR image set, while the low-intensity signal variations are captured in the long duration exposure image. The exposure time, 5 s, of the long exposure image was adjusted to avoid blooming artifacts. In particular, the exposure time of the long exposure image was adjusted such that the A/D digitization saturation limit was exceeded (as shown, for a majority of the image pixels), but neither (i) the full well capacity saturation limit nor (ii) the output node capacity saturation limit of the CCD camera were exceeded.

E. Tomographic Imaging via Beam Scanning

In some embodiments, by allowing a beam of excitation light to be scanned through a plurality of locations within a scan region while maintaining small spot sizes, the approaches described above provide for rapid tomographic imaging over a wide field of view.

FIG. 11 shows an example process 1100 for imaging one or more subjects positioned across the object plane using the beam scanning approaches described herein. In some embodiments, in a first step 1110, a beam of excitation light is scanned across the scan region 116 as described above with regard to FIG. 1A and FIG. 1B. The beam of excitation light may be appropriately shaped using any of the beam shaping approaches described in the previous sections in order to maintain a desired spot size across the scan region 116.

As the beam of excitation light is directed to a particular excitation location within the scan region, it illuminates a given subject positioned in the path of the beam of excitation light at a corresponding illumination location on the surface of the subject. As discussed previously, light incident on the surface of the subject diffuses within the subject, and excites fluorescent species within the subject, causing emission of fluorescent light.

Figure 1B:
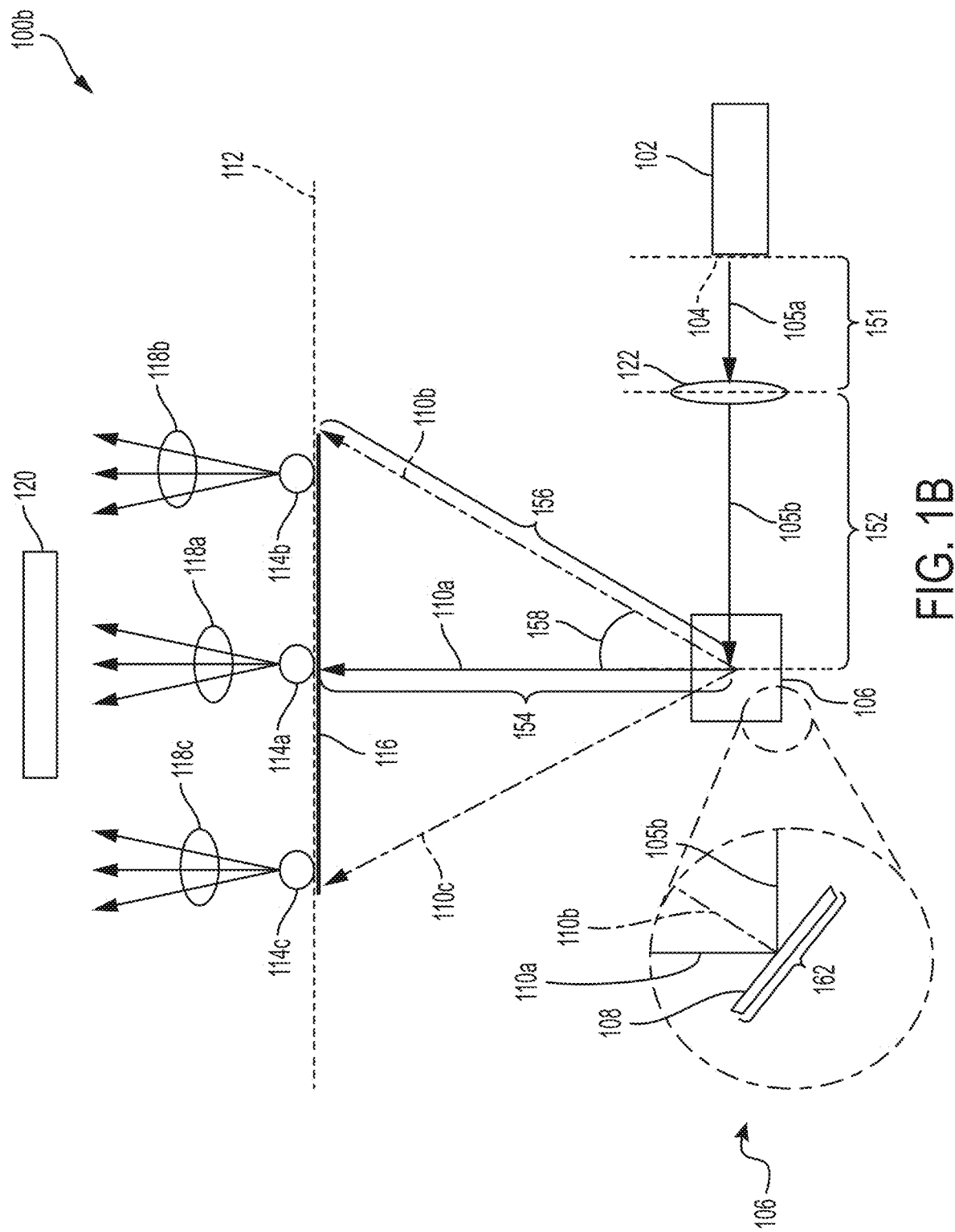
FIG. 1B is a schematic showing a layout of a system for rapidly scanning a beam of excitation light across a large field of view, including a beam shaping optic, according to an illustrative embodiment.

In some embodiments, as the beam of excitation light is directed from excitation location to excitation location across the scan region, one or more detectors detect fluorescent light emitted from within a given subject, as a result of excitation of fluorescent species within the subject (1120). The one or more detectors may be aligned in an epi-illumination geometry or in a transillumination geometry. FIG. 1A and FIG. 1B illustrate an example of the transillumination geometry, showing a detector 120 positioned at an opposite side of the object plane from the scanning optical galvanometer. Fluorescent light is typically emitted in various directions, and the portion of the emitted fluorescent light 118a, 118b, 118c from each of three subjects 114a, 114b, 114c that is detected by the detector is illustrated.

In some embodiments, the one or more detectors detect fluorescent light as the one or more subjects are illuminated. In some embodiments, a focal plane array (FPA) comprising a plurality of pixels that is aligned to image the entire scan region is used. Examples of FPA detectors include CCD cameras, CMOS cameras, and other detectors comprising a plurality of pixels. Fluorescent light incident on FPA detectors is detected by the plurality of pixels, such that a fluorescence emission image that represents the intensity distribution of the fluorescent light incident across the detector area can be recorded. In some embodiments, a bundle of fibers can be arranged to function similar to a FPA detector, and used to record a 2D emission image. Fibers of the bundle can be aligned such that their proximal (input) ends collect emitted fluorescent light at a plurality of locations. Each fiber can be aligned (e.g., attached) at is opposite, distal, end to a corresponding single element detector, which detects light that is collected by the fiber proximal end and guided along the length of the fiber to illuminate the active area of the detector. In this manner, each fiber of the bundle functions similarly to a pixel of an FPA detector, and the bundle, along with the multiple single element detectors, used to record an emission image.

In some embodiments, as the beam of excitation light is scanned, a plurality of fluorescence emission images are recorded by the one or more detectors (e.g., using an FPA; e.g., using multiple detectors of a fiber bundle).

In some embodiments, a fluorescence emission image is recorded for each discrete excitation location. Each fluorescence emission image recorded in this manner thus is associated with a distinct excitation location and represents fluorescent light emitted in response to illuminating one or the one or more subjects by directing the beam of excitation light to the associated excitation location.

In some embodiments, data corresponding to the detected fluorescent light is received and/or accessed (1130) by a processor of a computing device and used to obtain (e.g., compute) one or more tomographic images of the one or more subjects (1140). For example, tomographic images may be computed (e.g., via tomographic reconstruction techniques) using the fluorescence emission images recorded for each of the discrete excitation locations. In particular, in some embodiments, a tomographic image for each of one or more subjects positioned across the scan region can be obtained.

For example, wherein multiple subjects are imaged, each subject can be associated with a portion of the fluorescence emission images. In particular, when multiple subjects are positioned across the scan region, each subject can be associated with a different portion of the excitation locations within the scan region. For example, if three subjects are imaged, a first subject is positioned such that it is illuminated when the beam of excitation light is directed to each of a first portion of the plurality of excitation locations. Accordingly, the first subject is associated with the first portion of excitation locations. The second subject is similarly associated with a second portion of the excitation locations, and the third subject similarly associated with a third portion of the excitation locations.

Accordingly, for a given subject, the fluorescence emission images that are recorded for excitation locations associated with the subject can be identified, and used as input to tomographic reconstruction techniques in order to obtain a tomographic image of the given subject. This process can be repeated for each subject positioned across the scan region.

F. Computer System and Network Architecture

Figure 6:
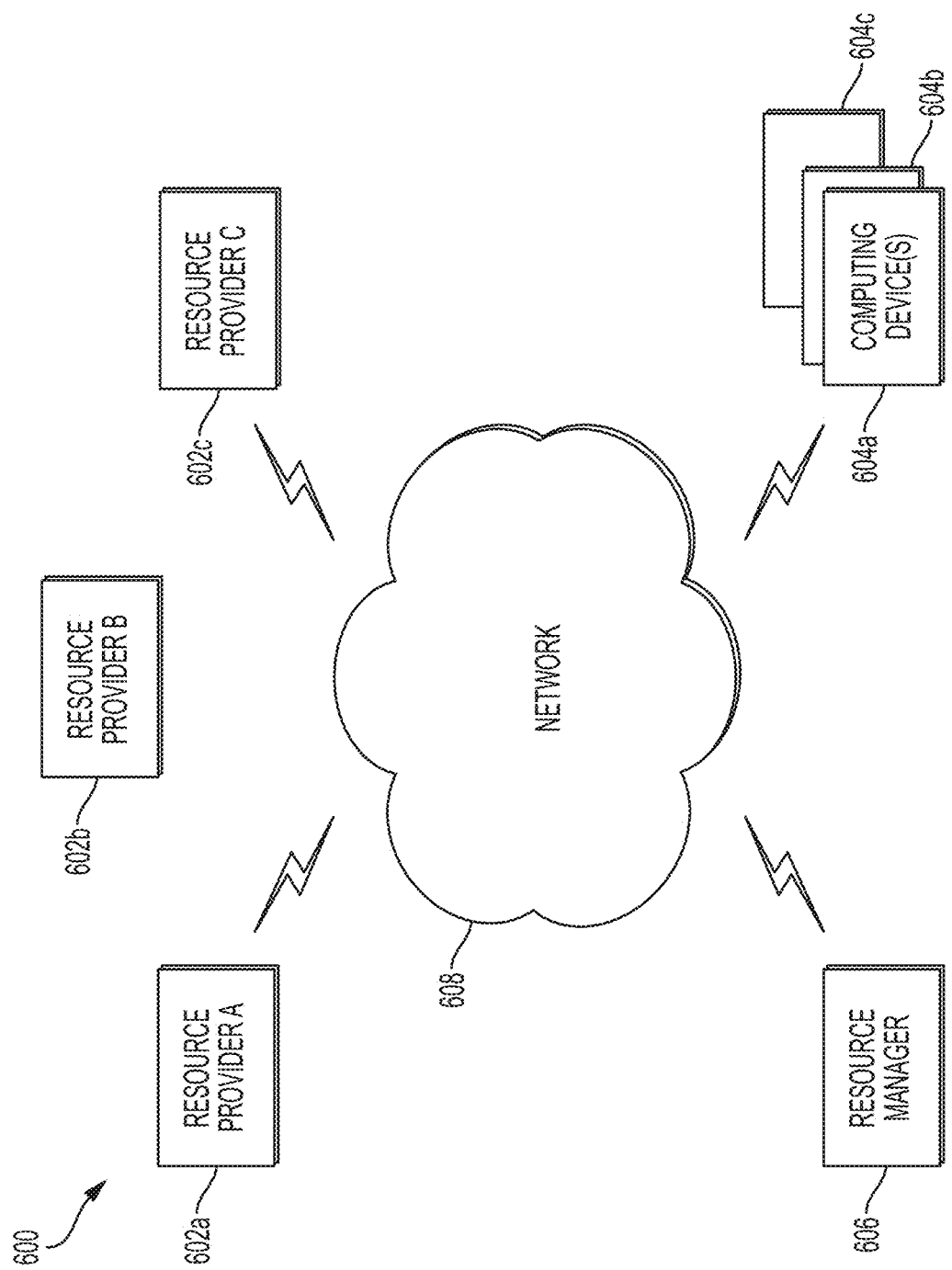
FIG. 6 is a block diagram of an exemplary cloud computing environment, used in some embodiments.

As shown in FIG. 6, an implementation of a network environment 600 for use in providing systems and methods for rapid imaging with a CCD camera by synchronizing illumination with the image acquisition sequence of the CCD camera described herein is shown and described. In brief overview, referring now to FIG. 6, a block diagram of an exemplary cloud computing environment 600 is shown and described. The cloud computing environment 600 may include one or more resource providers 602a, 602b, 602c (collectively, 602). Each resource provider 602 may include computing resources. In some implementations, computing resources may include any hardware and/or software used to process data. For example, computing resources may include hardware and/or software capable of executing algorithms, computer programs, and/or computer applications. In some implementations, exemplary computing resources may include application servers and/or databases with storage and retrieval capabilities. Each resource provider 602 may be connected to any other resource provider 602 in the cloud computing environment 600. In some implementations, the resource providers 602 may be connected over a computer network 608. Each resource provider 602 may be connected to one or more computing device 604a, 604b, 604c (collectively, 604), over the computer network 608.

The cloud computing environment 600 may include a resource manager 606. The resource manager 606 may be connected to the resource providers 602 and the computing devices 604 over the computer network 608. In some implementations, the resource manager 606 may facilitate the provision of computing resources by one or more resource providers 602 to one or more computing devices 604. The resource manager 606 may receive a request for a computing resource from a particular computing device 604. The resource manager 606 may identify one or more resource providers 602 capable of providing the computing resource requested by the computing device 604. The resource manager 606 may select a resource provider 602 to provide the computing resource. The resource manager 606 may facilitate a connection between the resource provider 602 and a particular computing device 604. In some implementations, the resource manager 606 may establish a connection between a particular resource provider 602 and a particular computing device 604. In some implementations, the resource manager 606 may redirect a particular computing device 604 to a particular resource provider 602 with the requested computing resource.

Figure 7:
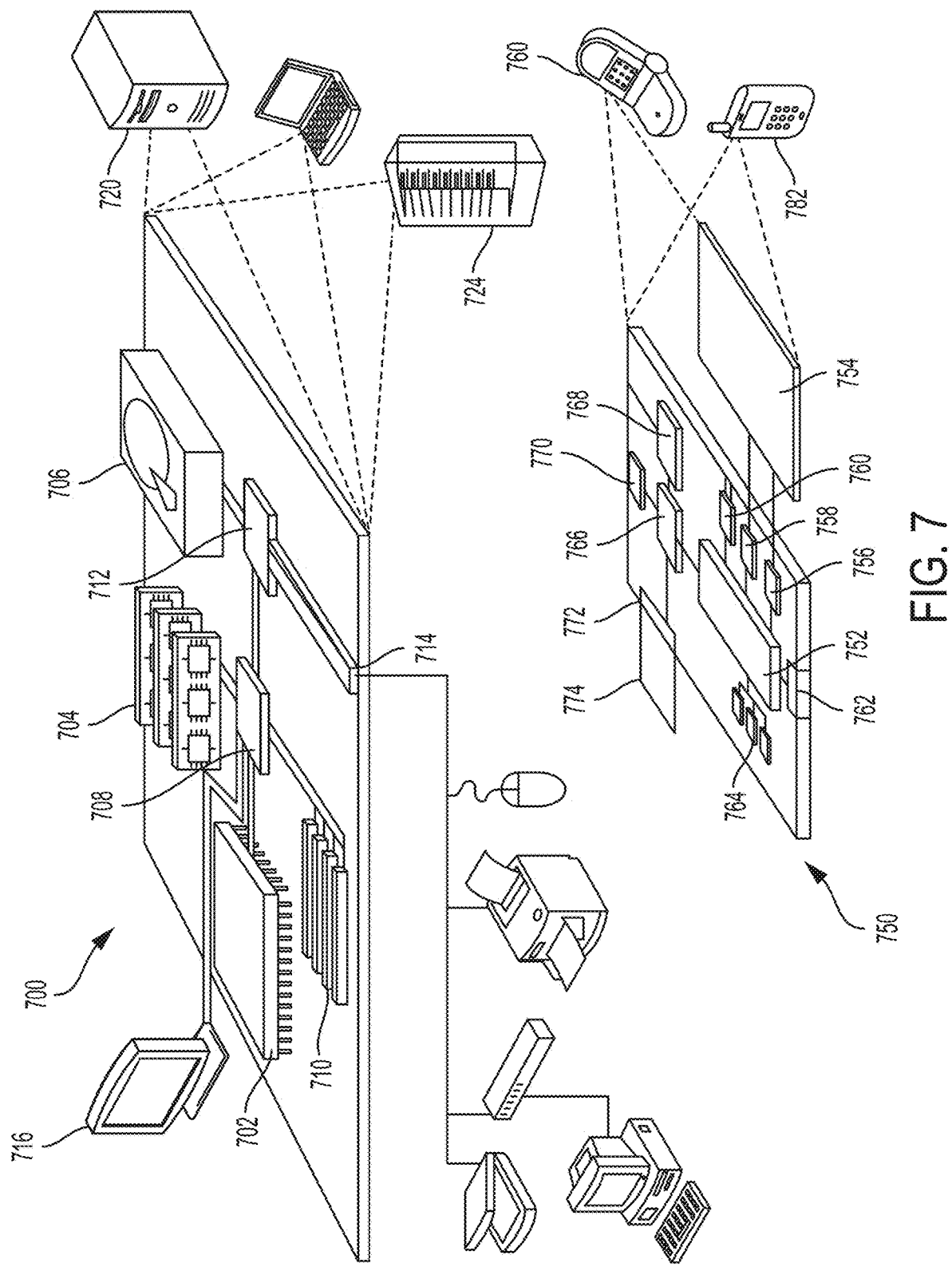
FIG. 7 is a block diagram of an example computing device and an example mobile computing device used in some embodiments.

FIG. 7 shows an example of a computing device 700 and a mobile computing device 750 that can be used to implement the techniques described in this disclosure. The computing device 700 is intended to represent various forms of digital computers, such as laptops, desktops, workstations, personal digital assistants, servers, blade servers, mainframes, and other appropriate computers. The mobile computing device 750 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 700 includes a processor 702, a memory 704, a storage device 706, a high-speed interface 708 connecting to the memory 704 and multiple high-speed expansion ports 710, and a low-speed interface 712 connecting to a low-speed expansion port 714 and the storage device 706. Each of the processor 702, the memory 704, the storage device 706, the high-speed interface 708, the high-speed expansion ports 710, and the low-speed interface 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as a display 716 coupled to the high-speed interface 708. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system). Thus, as the term is used herein, where a plurality of functions are described as being performed by "a processor", this encompasses embodiments wherein the plurality of functions are performed by any number of processors (one or more) of any number of computing devices (one or more). Furthermore, where a function is described as being performed by "a processor", this encompasses embodiments wherein the function is performed by any number of processors (one or more) of any number of computing devices (one or more) (e.g., in a distributed computing system).

The memory 704 stores information within the computing device 700. In some implementations, the memory 704 is a volatile memory unit or units. In some implementations, the memory 704 is a non-volatile memory unit or units. The memory 704 may also be another form of computer-readable medium, such as a magnetic or optical disk.

The storage device 706 is capable of providing mass storage for the computing device 700. In some implementations, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 702), perform one or more methods, such as those described above. The instructions can also be stored by one or more storage devices such as computer- or machine-readable mediums (for example, the memory 704, the storage device 706, or memory on the processor 702).

The high-speed interface 708 manages bandwidth-intensive operations for the computing device 700, while the low-speed interface 712 manages lower bandwidth-intensive operations. Such allocation of functions is an example only. In some implementations, the high-speed interface 708 is coupled to the memory 704, the display 716 (e.g., through a graphics processor or accelerator), and to the high-speed expansion ports 710, which may accept various expansion cards (not shown). In the implementation, the low-speed interface 712 is coupled to the storage device 706 and the low-speed expansion port 714. The low-speed expansion port 714, which may include various communication ports (e.g., USB, Bluetooth®, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. In addition, it may be implemented in a personal computer such as a laptop computer 722. It may also be implemented as part of a rack server system 724. Alternatively, components from the computing device 700 may be combined with other components in a mobile device (not shown), such as a mobile computing device 750. Each of such devices may contain one or more of the computing device 700 and the mobile computing device 750, and an entire system may be made up of multiple computing devices communicating with each other.

The mobile computing device 750 includes a processor 752, a memory 764, an input/output device such as a display 754, a communication interface 766, and a transceiver 768, among other components. The mobile computing device 750 may also be provided with a storage device, such as a micro-drive or other device, to provide additional storage. Each of the processor 752, the memory 764, the display 754, the communication interface 766, and the transceiver 768, are interconnected using various buses, and several of the components may be mounted on a common motherboard or in other manners as appropriate.

The processor 752 can execute instructions within the mobile computing device 750, including instructions stored in the memory 764. The processor 752 may be implemented as a chipset of chips that include separate and multiple analog and digital processors. The processor 752 may provide, for example, for coordination of the other components of the mobile computing device 750, such as control of user interfaces, applications run by the mobile computing device 750, and wireless communication by the mobile computing device 750.

The processor 752 may communicate with a user through a control interface 758 and a display interface 756 coupled to the display 754. The display 754 may be, for example, a TFT (Thin-Film-Transistor Liquid Crystal Display) display or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may provide communication with the processor 752, so as to enable near area communication of the mobile computing device 750 with other devices. The external interface 762 may provide, for example, for wired communication in some implementations, or for wireless communication in other implementations, and multiple interfaces may also be used.

The memory 764 stores information within the mobile computing device 750. The memory 764 can be implemented as one or more of a computer-readable medium or media, a volatile memory unit or units, or a non-volatile memory unit or units. An expansion memory 774 may also be provided and connected to the mobile computing device 750 through an expansion interface 772, which may include, for example, a SIMM (Single In Line Memory Module) card interface. The expansion memory 774 may provide extra storage space for the mobile computing device 750, or may also store applications or other information for the mobile computing device 750. Specifically, the expansion memory 774 may include instructions to carry out or supplement the processes described above, and may include secure information also. Thus, for example, the expansion memory 574 may be provide as a security module for the mobile computing device 750, and may be programmed with instructions that permit secure use of the mobile computing device 750. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 752), perform one or more methods, such as those described above. The instructions can also be stored by one or more storage devices, such as one or more computer- or machine-readable mediums (for example, the memory 764, the expansion memory 774, or memory on the processor 752). In some implementations, the instructions can be received in a propagated signal, for example, over the transceiver 768 or the external interface 762.

The mobile computing device 750 may communicate wirelessly through the communication interface 766, which may include digital signal processing circuitry where necessary. The communication interface 766 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 768 using a radio-frequency. In addition, short-range communication may occur, such as using a Bluetooth®, Wi-Fi™, or other such transceiver (not shown). In addition, a GPS (Global Positioning System) receiver module 770 may provide additional navigation- and location-related wireless data to the mobile computing device 750, which may be used as appropriate by applications running on the mobile computing device 750.

The mobile computing device 750 may also communicate audibly using an audio codec 760, which may receive spoken information from a user and convert it to usable digital information. The audio codec 760 may likewise generate audible sound for a user, such as through a speaker, e.g., in a handset of the mobile computing device 750. Such sound may include sound from voice telephone calls, may include recorded sound (e.g., voice messages, music files, etc.) and may also include sound generated by applications operating on the mobile computing device 750.

The mobile computing device 750 may be implemented in a number of different forms, as shown in the figure. For example, it may be implemented as a cellular telephone 780. It may also be implemented as part of a smart-phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal may refer to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In some implementations, any modules described herein can be separated, combined or incorporated into single or combined modules. Any modules depicted in the figures are not intended to limit the systems described herein to the software architectures shown therein.

Elements of different implementations described herein may be combined to form other implementations not specifically set forth above. Elements may be left out of the processes, computer programs, databases, etc. described herein without adversely affecting their operation. In addition, the logic flows depicted in the figures do not require the particular order shown, or sequential order, to achieve desirable results. Various separate elements may be combined into one or more individual elements to perform the functions described herein. In view of the structure, functions and apparatus of the systems and methods described here, in some implementations.

Throughout the description, where apparatus and systems are described as having, including, or comprising specific components, or where processes and methods are described as having, including, or comprising specific steps, it is contemplated that, additionally, there are apparatus, and systems of the present disclosure that consist essentially of, or consist of, the recited components, and that there are processes and methods according to the present disclosure that consist essentially of, or consist of, the recited processing steps.

It should be understood that the order of steps or order for performing certain action is immaterial so long as the embodiments described herein remain operable. Moreover, two or more steps or actions may be conducted simultaneously.

While embodiments described herein have been particularly shown and described with reference to specific preferred embodiments, it should be understood by those skilled in the art that various changes in form and detail may be made therein without departing from the spirit and scope of the embodiments described herein as defined by the appended claims.

What is claimed is:

1. A method for synchronizing illumination of one or more object(s) to be imaged with a global exposure phase of a charge-coupled device (CCD) camera for rapid image acquisition by the CCD camera, the method comprising:
   (a) directing a beam of illumination light emitted from an output of an illumination source to a source galvanometer mirror, wherein the source galvanometer mirror is operable to rotate through a plurality of angles;
   (b) automatically adjusting the source galvanometer mirror for alignment at a plurality of rotational angles comprising a first rotational angle and a second rotational angle, wherein, at the first rotational angle, the source galvanometer mirror is aligned to reflect the beam of illumination light to direct it to one or more object(s) to be imaged thereby illuminating the one or more object(s), and at the second rotational angle, the source galvanometer mirror is aligned to reflect the beam of illumination light to direct it away from the one or more object(s) to be imaged such that the one or more object(s) is/are not illuminated; and (c) acquiring one or more images with the CCD camera, wherein:

the CCD camera is aligned and operable to (i) detect light emitted from the one or more object(s) as a result of illumination of the one or more object(s) by the beam of illumination light and/or (ii) detect illumination light transmitted through or reflected by the one or more object(s), and acquiring each of the one or more images comprises:
(A) responsive to a first trigger signal indicating a start of a global exposure phase of the CCD camera, rotating the source galvanometer mirror to the first rotational angle such that during the global exposure phase of the CCD camera the one or more object(s) is/are illuminated with the beam of illumination light; and
(B) responsive to a second trigger signal indicating an end of the global exposure phase of the CCD camera, rotating the source galvanometer mirror to the second rotational angle such that when the CCD camera is not in the global exposure phase, the one or more object(s) is/are not illuminated with the beam of illumination light,
thereby synchronizing illumination of the one or more object(s) with the global exposure phase of the CCD camera for rapid image acquisition by the CCD camera.

2. The method of claim 1, wherein acquiring each of the one or more images in step (c) comprises providing, by a first processor of a computing device, an image acquisition signal to the CCD camera to initiate the global exposure phase of the CCD camera.

3. The method of claim 1, wherein:
automatically adjusting the source galvanometer mirror in step (b) comprises providing, by a source galvanometer controller module, a rotational signal to the source galvanometer mirror wherein variation of a value of the rotational signal varies the rotational angle of the source galvanometer mirror, such that when the rotational signal has a first rotational signal value the source galvanometer mirror is rotated to the first rotational angle and when the rotational signal has a second rotational signal value the source galvanometer mirror is rotated to the second rotational angle;

at substep (A) of step (c), the source galvanometer controller module receives the first trigger signal and, responsive to receipt of the first trigger signal, adjusts the value of the rotational signal to the first rotational signal value, thereby rotating the source galvanometer mirror to the first rotational angle; and at substep (B) of step (c), the source galvanometer controller module receives the second trigger signal and, responsive to receipt of the second trigger signal, adjusts the value of the rotational signal to the second rotational signal value, thereby rotating the source galvanometer mirror to the second rotational angle.

4. The method of claim 3, wherein:
automatically adjusting the source galvanometer mirror in step (b) comprises:
receiving, by the source galvanometer controller module, a CCD output signal from the CCD camera; and
adjusting, by the source galvanometer controller module, the value of the rotational signal based on a value of the received CCD output signal;
the first trigger signal corresponds to a first variation in the CCD output signal; and
the second trigger signal corresponds to a second variation in the CCD output signal.

5. The method of claim 1, wherein acquiring the one or more images in step (c) comprises acquiring one or more high dynamic range (HDR) image sets, each HDR image set corresponding to a specific illumination location or a set of one or more illumination locations on the one or more object(s) and comprising a short exposure image and a long exposure image, wherein, for each HDR image set:

the short exposure image is acquired by detecting emitted light and/or illumination light transmitted through or reflected by the one or more object(s) during a short duration global exposure phase of the CCD camera, the long exposure image is acquired by detecting emitted light and/or illumination light transmitted through or reflected by the one or more object(s) during a long duration global exposure phase of the CCD camera, the long duration global exposure phase of the CCD camera lasting longer than the short duration global exposure phase, and both the short exposure image and long exposure image of the given HDR image set are acquired by detecting emitted light and/or illumination light transmitted through or reflected by the one or more object(s) as a result of illumination of the one or more object(s) by the beam of illumination light at a same specific illumination location or set of illumination locations to which the HDR image set corresponds.

6. The method of claim 1, comprising:
directing the beam of illumination light to a plurality of illumination locations on the one or more object(s);
at step (c), acquiring a plurality of images with the CCD camera, each image corresponding to a particular set of one or more illumination locations of the plurality of illumination locations and representing (i) detected emitted light from the one or more object(s) as a result of illumination of the one or more object(s) at the corresponding particular set of one or more illumination location(s) and/or (ii) detected illumination light transmitted through or reflected by the one or more object(s) following illumination of the one or more object(s) at the corresponding set of one or more illumination location(s);
receiving and/or accessing, by a processor of a computing device, data corresponding to the plurality of acquired images; and
creating, by the processor, one or more tomographic image(s) of the one or more object(s) using the data corresponding to the plurality of acquired images.

7. The method of claim 6, comprising using a galvanometer optical scanner to direct the beam of illumination light to the plurality of illumination locations on the one or more object(s).

8. A method for synchronizing illumination of one or more object(s) with a global exposure phase of a CCD camera for rapid image acquisition by the CCD camera, the method comprising:
- (a) directing a beam of illumination light emitted from an output of an illumination source through a laser shutter, to the one or more object(s) to be imaged;
- (b) automatically opening and closing the laser shutter, such that when the laser shutter is open, the beam of illumination light allowed to pass through the laser shutter, thereby illuminating the one or more object(s), and when the laser shutter is closed, it blocks the beam of illumination light, thereby preventing the one or more object(s) from being illuminated with the beam of illumination light; and
- (c) acquiring one or more images with the CCD camera, wherein:
  - the CCD camera is aligned and operable to detect (i) light emitted from the one or more object(s) as a result of illumination of the one or more object(s) by the beam of illumination light and/or (ii) detect illumination light transmitted through or reflected by the one or more object(s), and
  - acquiring each of the one or more images comprises:
    - (A) responsive to a first trigger signal indicating a start of the global exposure phase of the CCD camera, opening the laser shutter such that during the global exposure phase of the CCD camera the one or more object(s) is/are illuminated with the beam of illumination light; and
    - (B) responsive to a second trigger signal indicating an end of the global exposure phase of the CCD camera, closing the laser shutter such that when the CCD camera is not in the global exposure phase the one or more object(s) is/are not illuminated with the beam of illumination light,
  - thereby synchronizing illumination of the one or more object(s) with the global exposure phase of the CCD camera for rapid image acquisition by the CCD camera.

9. The method of claim 8, wherein:
automatically opening and closing the laser shutter in step (b) comprises providing, by a laser shutter controller module, a laser shutter signal to the laser shutter wherein variation of a value of the laser shutter signal opens and closes the laser shutter, such that when the laser shutter signal has a first laser shutter signal value the laser shutter is open and when the laser shutter signal has a second laser shutter signal value the laser shutter is closed;

at substep (A) of step (c), the laser shutter controller module receives the first trigger signal and, responsive to receipt of the first trigger signal, adjusts the value of the laser shutter signal to the first laser shutter signal value, thereby opening the laser shutter; and at substep (B) of step (c), the laser shutter controller module receives the second trigger signal and, responsive to receipt of the second trigger signal, adjusts the value of the laser shutter signal to the second laser shutter signal value, thereby closing the laser shutter.

10. A system for synchronizing illumination of one or more object(s) to be imaged with a global exposure phase of a CCD camera for rapid image acquisition by the CCD camera, the system comprising:
- (a) an illumination source aligned and operable to emit a beam of illumination light from its output and direct the beam of illumination light to a source galvanometer mirror;
- (b) a source galvanometer mirror operable to rotate through a plurality of angles and aligned to: (i) at a first rotational angle, reflect the beam of illumination light to direct it to the one or more object(s), and (ii) at a second rotational angle, reflect the beam of illumination light to direct it away from the one or more object(s), such that when the source galvanometer mirror is rotated to the first rotational angle, the one or more object(s) is/are illuminated with the beam of illumination light and when the source galvanometer mirror is rotated to the second rotational angle, the one or more object(s) is/are not illuminated with the beam of illumination light; and
- (c) a CCD camera aligned and operable to acquire one or more images of the one or more object(s), by (i) detecting light emitted from the one or more object(s) as a result of illumination of the one or more object(s) by the beam of illumination light and/or (ii) detecting illumination light transmitted through or reflected by the one or more object(s);
- (d) a source galvanometer controller module operable to:
  - (A) responsive to a first trigger signal indicating a start of the global exposure phase of the CCD camera, cause rotation of the source galvanometer mirror to the first rotational angle such that during the global exposure stage of the CCD camera the one or more object(s) is/are illuminated with the beam of illumination light; and
  - (B) responsive to a second trigger signal indicating an end of the global exposure phase of the CCD camera, cause rotation of the source galvanometer mirror to the second rotational angle such that when the CCD camera is not in the global exposure phase the one or more object(s) is/are not illuminated with the beam of illumination light;
- (e) a processor; and
- (f) a memory having instructions stored thereon, wherein the instructions, when executed by the processor, cause the processor to:
  - receive and/or access data corresponding to one or more images acquired by the CCD camera; and
  - obtain one or more tomographic image(s) of the one or more object(s) using the data corresponding to the acquired images.

11. The system of claim 10, wherein the source galvanometer controller module is operable to:
provide a rotational signal to the source galvanometer mirror, wherein variation of a value of the rotational signal varies the rotational angle of the source galvanometer mirror, such that when the rotational signal has a first rotational signal value the source galvanometer mirror is rotated to the first rotational angle and when the rotational signal has a second rotational signal value the source galvanometer mirror is rotated to the second rotational angle;

receive the first trigger signal and, responsive to receipt of the first trigger signal, adjust the value of the rotational signal to the first rotational signal value, thereby causing rotation of the source galvanometer mirror to the first rotational angle; and receive the second trigger signal and, responsive to receipt of the second trigger signal, adjust the value of the rotational signal to the second rotational signal value, thereby causing rotation of the source galvanometer mirror to the second rotational angle.

12. The system of claim 11, wherein:
the source galvanometer controller module is operable to:
receive a CCD output signal from the CCD camera; and
adjust the value of the rotational signal based on a value of the received CCD output signal;
the first trigger signal corresponds to a first variation in the CCD output signal; and
the second trigger signal corresponds to a second variation in the CCD output signal.

13. The system of claim 10, comprising a source housing within which the source galvanometer mirror and illumination source are housed, and wherein the source galvanometer mirror is aligned such that: (i) at the first rotational angle, the beam of illumination light is reflected by the source galvanometer mirror, through an exit port of the source housing and (ii) at the second rotational angle, the beam of illumination light is directed to a beam dump within the source housing.

14. The system of claim 10, comprising an optical system housing within which the illumination source, the source galvanometer mirror, the one or more object(s), and the CCD camera are housed, wherein the optical system housing is substantially opaque to ambient light, thereby limiting the amount of ambient light incident on a sensor array of the CCD camera.

15. The system of claim 10, comprising:
a laser shutter positioned in a path of the beam of illumination light from the illumination source to the one or more object(s), wherein the laser shutter is operable to automatically open and close, such that when the laser shutter is open, the beam of illumination light allowed to pass through the laser shutter, thereby illuminating the one or more object(s), and when the laser shutter is closed, it blocks the beam of illumination light, thereby preventing the one or more object(s) from being illuminated with the beam of illumination light; and
a laser shutter controller module operable to:
responsive to the first trigger signal indicating the start of the global exposure phase of the CCD camera, cause opening the laser shutter at substantially the same time when rotating the source galvanometer mirror to the first rotational angle; and
responsive to the second trigger signal indicating the end of the global exposure phase of the CCD camera, cause closing the laser shutter at substantially the same time when rotating the source galvanometer mirror to the second rotational angle.

16. The system of claim 15, wherein the laser shutter controller module is operable to:
automatically open and close the laser shutter by providing a laser shutter signal to the laser shutter, wherein variation of a value of the laser shutter signal causes opening and/or closing of the laser shutter, such that when the laser shutter signal has a first laser shutter signal value the laser shutter is open and when the laser shutter signal has a second laser shutter signal value the laser shutter is closed;

receive the first trigger signal and, responsive to receipt of the first trigger signal, adjust the value of the laser shutter signal to the first laser shutter signal value, thereby opening the laser shutter; and
receive the second trigger signal and, responsive to receipt of the second trigger signal, adjust the value of the laser shutter signal to the second laser shutter signal value, thereby closing the laser shutter.

17. The system of claim 16, wherein the laser shutter controller module is operable to:
receive a CCD output signal from the CCD camera; and
adjust the value of the laser shutter signal based on the value of the received CCD output signal.

18. The system of claim 15, comprising a source housing within which the source galvanometer mirror and illumination source are housed, and wherein:
the source galvanometer mirror is aligned such that: (i) at the first rotational angle, the beam of illumination light is reflected by the source galvanometer mirror, through an exit port of the source housing and (ii) at the second rotational angle, the beam of illumination light is directed to a beam dump within the source housing, and
the laser shutter is positioned at the exit port such that when the laser shutter is closed the beam of illumination light is prevented from passing through the exit port.

19. The system of claim 10, wherein the CCD camera is operable to acquire one or more high dynamic range (HDR) image sets, each HDR image set corresponding to a specific illumination location or set of one or more illumination locations on the one or more object(s) and comprising a short exposure image and a long exposure image, wherein, for each HDR image set:
the short exposure image is acquired by detecting emitted light and/or illumination light transmitted through or reflected by the one or more object(s) during a short duration global exposure phase of the CCD camera,
the long exposure image is acquired by detecting emitted light and/or illumination light transmitted through or reflected by the one or more object(s) during a long duration global exposure phase of the CCD camera, the long duration global exposure phase of the CCD camera lasting longer than the short duration global exposure phase, and
both the short exposure image and long exposure image of the given HDR image set are acquired by detecting emitted light and/or illumination light transmitted through or reflected by the one or more object(s) as a result of illumination of the one or more object(s) by the beam of illumination light at a same specific illumination location or set of illumination locations to which the HDR image set corresponds.

20. The system of claim 10, comprising a galvanometer optical scanner positioned in a path of the beam of illumination light from the source galvanometer mirror to the one or more object(s) and operable to direct the beam of illumination light to a plurality of illumination locations on the one or more object(s), and wherein the one or more acquired images comprises a plurality of images, each corresponding to a particular set of one or more illumination locations of the plurality of illumination locations and representing (i) detected emitted light from the one or more object(s) as a result of illumination of the one or more object(s) at the corresponding particular set of one or more illumination location(s) and/or (ii) detected illumination light transmitted through or reflected by the one or more object(s) following illumination of the one or more object(s) at the corresponding particular set of one or more illumination location(s).

* * * * *